US010571346B2

(12) United States Patent
Okada et al.

(10) Patent No.: US 10,571,346 B2
(45) Date of Patent: Feb. 25, 2020

(54) FORCE SENSOR

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP); Satoshi Era, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 39 days.

(21) Appl. No.: 15/764,762

(22) PCT Filed: Jan. 9, 2018

(86) PCT No.: PCT/JP2018/000216
§ 371 (c)(1),
(2) Date: Jul. 9, 2018

(87) PCT Pub. No.: WO2019/138448
PCT Pub. Date: Jul. 18, 2019

(65) Prior Publication Data
US 2019/0212215 A1 Jul. 11, 2019

(51) Int. Cl.
*G01L 1/14* (2006.01)
*G01L 3/10* (2006.01)
(Continued)

(52) U.S. Cl.
CPC .............. *G01L 1/144* (2013.01); *G01L 3/101* (2013.01); *G01L 5/12* (2013.01); *G01L 5/165* (2013.01)

(58) Field of Classification Search
CPC . G01L 1/144; G01L 1/14; G01L 3/101; G01L 5/12; G01L 5/165; G01L 5/16; G01D 7/00
(Continued)

(56) References Cited

U.S. PATENT DOCUMENTS 4,747,313 A * 5/1988 Okada .................... G01L 5/166
73/862.043
8,621,941 B2 * 1/2014 Mei ....................... G06F 3/0338
73/862.044
(Continued)

FOREIGN PATENT DOCUMENTS

JP 5312659 A 11/1993
JP 2004-354049 A 12/2004
(Continued)

OTHER PUBLICATIONS

International Search Report (ISR) dated Mar. 13, 2018 for Application No. PCT/JP2018/000216.
(Continued)

*Primary Examiner* — Octavia Hollington
(74) *Attorney, Agent, or Firm* — Ladas and Parry LLP

(57) ABSTRACT

A force sensor includes: a deformable body having a force receiving portion and a fixed portion; a displacement body configured to generate a displacement by elastic deformation generated in the deformable body; and a detection circuit configured to detect an applied force on the basis of the displacement generated in the displacement body, in which the deformable body includes: a tilting portion arranged between the force receiving portion and the fixed portion; a first deformable portion that connects the force receiving portion and the tilting portion; and a second deformable portion that connects the fixed portion and the tilting portion, the displacement body includes a displacement portion connected to the tilting portion and separated from the fixed portion, the detection circuit includes a first displacement sensor and a second displacement sensor arranged in the displacement portion, and the detection circuit outputs a first electric signal indicating an applied force on the basis of a detection value of the first displacement sensor, and outputs a second electric signal indicating an applied force on the (Continued)

basis of a detection value of the second displacement sensor, and then determines whether force detection is performed normally on the basis of the first electric signal and the second electric signal.

36 Claims, 43 Drawing Sheets

(51) Int. Cl.
  *G01L 5/165* (2020.01)
  *G01L 5/12* (2006.01)

(58) Field of Classification Search
  USPC .................................................. 73/862.626
  See application file for complete search history.

(56) References Cited

U.S. PATENT DOCUMENTS

2004/0187602 A1   9/2004  Okada
2018/0156678 A1*  6/2018  Eilersen ................. G01G 7/06

FOREIGN PATENT DOCUMENTS

| JP | 2016050883 A | 4/2016 |
| JP | 6257017 B1 | 1/2018 |
| WO | 2016163033 A1 | 10/2016 |
| WO | 2017097304 | 6/2017 |

OTHER PUBLICATIONS

Patent Abstracts of Japan English Abstract of JP 2016050883 A.
English abstract of JP 5312659 A.
English abstract of JP 6257017 B1.

* cited by examiner

|     | C11 | C12 | C21 | C22 |
|-----|-----|-----|-----|-----|
| +Fx | + + | +   | − − | −   |
| −Fz | + + | +   | − − | −   |

FIG. 9

|  | D11 | D12 | D21 | D22 |
|---|---|---|---|---|
| +Fx | − − | + + | − | + |
| −Fz | − − | + + | − | + |

FIG.11

| | C11 | C12 | C21 | C22 |
|---|---|---|---|---|
| +Fx | + + | − − | + | − |
| −Fz | + + | − − | + | − |

| FORCE/MOMENT | FIRST TILTING PORTION 313A | D1 | D2 | SECOND TILTING PORTION 313B | D3 | D4 |
|---|---|---|---|---|---|---|
| +Fx | COUNTERCLOCKWISE | − | + | COUNTERCLOCKWISE | − | + |
| +Fy | COUNTERCLOCKWISE | − | + | CLOCKWISE | + | − |
| +Fz | CLOCKWISE | + | − | COUNTERCLOCKWISE | − | + |
| +Mx | CLOCKWISE | + | − | COUNTERCLOCKWISE | − | + |
| +My | CLOCKWISE | + | − | CLOCKWISE | + | − |
| +Mz | CLOCKWISE | + | − | CLOCKWISE | + | − |

| FORCE/MOMENT | THIRD TILTING PORTION 313C | D5 | D6 | FOURTH TILTING PORTION 313D | D7 | D8 |
|---|---|---|---|---|---|---|
| +Fx | CLOCKWISE | + | − | CLOCKWISE | + | − |
| +Fy | CLOCKWISE | + | − | COUNTERCLOCKWISE | − | + |
| +Fz | CLOCKWISE | + | − | COUNTERCLOCKWISE | − | + |
| +Mx | COUNTERCLOCKWISE | − | + | CLOCKWISE | + | − |
| +My | COUNTERCLOCKWISE | − | + | COUNTERCLOCKWISE | − | + |
| +Mz | CLOCKWISE | + | − | CLOCKWISE | + | − |

FIG.26

| FORCE/MOMENT | C11 | C12 | C21 | C22 | C31 | C32 | C41 | C42 |
|---|---|---|---|---|---|---|---|---|
| +Fx | + + | + | − − | − | + + | + | − − | − |
| +Fy | + + | + | − − | − | − − | − | + + | + |
| +Fz | − − | − | + + | + | + + | + | − − | − |
| +Mx | − − | − | + + | + | + + | + | − − | − |
| +My | − − | − | + + | + | − − | − | + + | + |
| +Mz | − − | − | + + | + | − − | − | + + | + |

| FORCE/MOMENT | C51 | C52 | C61 | C62 | C71 | C72 | C81 | C82 |
|---|---|---|---|---|---|---|---|---|
| +Fx | − − | − | + + | + | − − | − | + + | + |
| +Fy | − − | − | + + | + | + + | + | − − | − |
| +Fz | − − | − | + + | + | + + | + | − − | − |
| +Mx | + + | + | − − | − | − − | − | + + | + |
| +My | + + | + | − − | − | + + | + | − − | − |
| +Mz | − − | − | + + | + | − − | − | + + | + |

FIG.29

|  | VFx | VFy | VFz | VMx | VMy | VMz |
|---|---|---|---|---|---|---|
| Fx | 8 | 0 | 0 | 0 | −8 | 0 |
| Fy | 0 | 8 | 0 | −8 | 0 | 0 |
| Fz | 0 | 0 | 8 | 0 | 0 | 0 |
| Mx | 0 | −8 | 0 | 8 | 0 | 0 |
| My | −8 | 0 | 0 | 0 | 8 | 0 |
| Mz | 0 | 0 | 0 | 0 | 0 | 8 |

FIG.30

| FORCE/MOMENT | C11 | C12 | C31 | C32 | C51 | C52 | C71 | C72 |
|---|---|---|---|---|---|---|---|---|
| +Fz | − − | − | + + | + | − − | − | + + | + |
| +Mx | − − | − | + + | + | + + | + | − − | − |
| +My | − − | − | − − | − | + + | + | + + | + |
| +Mz | − − | − | − − | − | − − | − | − − | − |

FIG.32

|  | VFx | VMx | VMy | VMz |
|---|---|---|---|---|
| Fz | 4 | 0 | 0 | 0 |
| Mx | 0 | 4 | 0 | 0 |
| My | 0 | 0 | 4 | 0 |
| Mz | 0 | 0 | 0 | 4 |

FIG.33

| FORCE/MOMENT | C11 | C12 | C41 | C42 | C51 | C52 | C81 | C82 |
|---|---|---|---|---|---|---|---|---|
| +Fx | + + | + | − − | − | − − | − | + + | + |
| +Fy | + + | + | + + | + | − − | − | − − | − |
| +Fz | − − | − | − − | − | − − | − | − − | − |
| +Mz | − − | − | + + | + | − − | − | + + | + |

FIG.36

| FORCE/MOMENT | C11 | C12 | C21 | C22 | C31 | C32 | C41 | C42 |
|---|---|---|---|---|---|---|---|---|
| +Fx | + + | − − | + | − | + | − | + + | − − |
| +Fy | + + | − − | + | − | − | + | − − | + + |
| +Fz | − − | + + | − | + | + | − | + + | − − |
| +Mx | − − | + + | − | + | + | − | + + | − − |
| +My | − − | + + | − | + | − | + | − − | + + |
| +Mz | − − | + + | − | + | − | + | − − | + + |

| FORCE/MOMENT | C51 | C52 | C61 | C62 | C71 | C72 | C81 | C82 |
|---|---|---|---|---|---|---|---|---|
| +Fx | − − | + + | − | + | − | + | − − | + + |
| +Fy | − − | + + | − | + | + | − | + + | − − |
| +Fz | − − | + + | − | + | + | − | + + | − − |
| +Mx | + + | − − | + | − | − | + | − − | + + |
| +My | + + | − − | + | − | + | + | + + | − − |
| +Mz | − − | + + | − | + | − | + | − − | + + |

FIG.39

| FORCE/MOMENT | FIRST TILTING PORTION 713A | D11 | D12 | SECOND TILTING PORTION 713B | D21 | D22 |
|---|---|---|---|---|---|---|
| +Fx | (COUNTERCLOCKWISE) | (−) | (+) | COUNTERCLOCKWISE | − | + |
| +Fy | COUNTERCLOCKWISE | − | + | (COUNTERCLOCKWISE) | (−) | (+) |
| +Fz | CLOCKWISE | + | − | COUNTERCLOCKWISE | − | + |
| +Mx | NO TILTING | 0 | 0 | COUNTERCLOCKWISE | − | + |
| +My | CLOCKWISE | + | − | NO TILTING | 0 | 0 |
| +Mz | CLOCKWISE | + | − | CLOCKWISE | + | − |

| FORCE/MOMENT | THIRD TILTING PORTION 713C | D31 | D32 | FOURTH TILTING PORTION 713D | D41 | D42 |
|---|---|---|---|---|---|---|
| +Fx | COUNTERCLOCKWISE | − | + | (COUNTERCLOCKWISE) | (−) | (+) |
| +Fy | (CLOCKWISE) | (+) | (−) | CLOCKWISE | + | − |
| +Fz | CLOCKWISE | + | − | COUNTERCLOCKWISE | − | + |
| +Mx | CLOCKWISE | + | − | NO TILTING | 0 | 0 |
| +My | NO TILTING | 0 | 0 | CLOCKWISE | + | − |
| +Mz | CLOCKWISE | + | − | CLOCKWISE | + | − |

| FORCE/MOMENT | FIFTH TILTING PORTION 713E | D51 | D52 | SIXTH TILTING PORTION 713F | D61 | D62 |
|---|---|---|---|---|---|---|
| +Fx | (CLOCKWISE) | (+) | (−) | CLOCKWISE | + | − |
| +Fy | CLOCKWISE | + | − | (CLOCKWISE) | (+) | (−) |
| +Fz | CLOCKWISE | + | − | COUNTERCLOCKWISE | − | + |
| +Mx | NO TILTING | 0 | 0 | CLOCKWISE | + | − |
| +My | COUNTERCLOCKWISE | − | + | NO TILTING | 0 | 0 |
| +Mz | CLOCKWISE | + | − | CLOCKWISE | + | − |

| FORCE/MOMENT | SEVENTH TILTING PORTION 713G | D71 | D72 | EIGHT TILTING PORTION 713H | D81 | D82 |
|---|---|---|---|---|---|---|
| +Fx | CLOCKWISE | + | − | (CLOCKWISE) | (+) | (−) |
| +Fy | (COUNTERCLOCKWISE) | (−) | (+) | COUNTERCLOCKWISE | − | + |
| +Fz | CLOCKWISE | + | − | COUNTERCLOCKWISE | − | + |
| +Mx | COUNTERCLOCKWISE | − | + | NO TILTING | 0 | 0 |
| +My | NO TILTING | 0 | 0 | COUNTERCLOCKWISE | − | + |
| +Mz | CLOCKWISE | + | − | CLOCKWISE | + | − |

FIG.42

FORCE SENSOR

RELATED APPLICATION

This application is an application under 35 U.S.C. 371 of International Application No. PCT/JP2018/000216 filed on Jan. 9, 2018, the entire contents of which are incorporated herein by reference.

TECHNICAL FIELD

The present invention relates to a force sensor, and more particularly to a sensor having a function of outputting a force applied in a predetermined axial direction and a moment (torque) applied around a predetermined rotational axis as an electric signal.

BACKGROUND ART

There is a known force sensor having a function of outputting a force applied in a predetermined axial direction and a torque applied around a predetermined rotational axis as an electric signal (for example, Patent Literature 1). In addition to being widely used for force control of industrial robots, the force sensors are also adopted in life supporting robots in recent years, leading to demands for higher safety. The conventional capacitance type force sensor, however, has a concern that, an electronic circuit including a mechanism portion, a capacitance detection unit (force detection unit), and a microcomputer, might fail by condensation, impact, overload, or mixing of foreign matter between a pair of parallel flat plates constituting the capacitive element. In particular, due to flexibility of the force detection unit of the force sensor, overload or repeated load would produce metal fatigue. Metal fatigue might generate cracks or the like in an elastic body constituting the force detection unit, leading to breakage.

As a simple method of judging whether the force sensor is faulty, for example, there is a method of arranging a plurality of (for example, three) force sensors described in Patent Literature 1 in parallel and evaluating a difference between output signals of individual force sensors. In this method, three output signals are compared two by two, and when the difference between the output signals of the two force sensors is within a predetermined range, it is judged that the force sensor functions normally. When the difference does not exist within the predetermined range, it is judged that the force sensor is not normally functioning (faulty).

CITATION LIST

Patent Literature

Patent Literature 1: JP 2004-354049 A

This method of determining whether the force sensor functions normally or not using a plurality of force sensors, however, would increase the cost with the number of force sensors. Furthermore, the space required for installing the force sensor increases, which is a problem. It is of course possible to determine whether the force sensor functions normally by removing the force sensor attached to the robot or the like and performing a failure diagnosis. Unfortunately, removing the force sensor attached once would increase the working cost, and thus, a force sensor capable of facilitating execution of a failure diagnosis has been demanded.

Meanwhile, the applicant of the present invention invented a force sensor that is a low cost and highly sensitive electrostatic capacity type force sensor, insusceptible to a temperature change and common mode noise of the use environment, and has disclosed Japanese Patent Application No. 2017-185184. It would be extremely useful to achieve a capability of facilitating execution of a failure diagnosis even with such a force sensor.

The present invention has been made in view of the above circumstances. That is, an object of the present invention is to provide a force sensor which is capable of performing self failure diagnosis by a single low cost and highly sensitive force sensor.

SUMMARY OF INVENTION

A force sensor according to a first aspect of the present invention includes:

a deformable body having a force receiving portion and a fixed portion and configured to generate elastic deformation by a force applied to the force receiving portion, a displacement body connected to the deformable body and configured to generate displacement by elastic deformation generated in the deformable body; and a detection circuit configured to detect an applied force on the basis of the displacement generated in the displacement body, in which the deformable body includes:

a tilting portion having a longitudinal direction and arranged between the force receiving portion and the fixed portion;

a first deformable portion that connects the force receiving portion and the tilting portion; and a second deformable portion that connects the fixed portion and the tilting portion, each of the deformable portions extends in a direction intersecting with the longitudinal direction of the tilting portion, a connection site between the first deformable portion and the tilting portion is located at a position different from the position of a connection site between the second deformable portion and the tilting portion in the longitudinal direction of the tilting portion, the displacement body includes a displacement portion connected to the tilting portion and separated from the fixed portion, the detection circuit includes a first displacement sensor and a second displacement sensor arranged in the displacement portion, and the detection circuit outputs a first electric signal indicating an applied force on the basis of a detection value of the first displacement sensor, and outputs a second electric signal indicating an applied force on the basis of a detection value of the second displacement sensor, and then, determines whether force detection is performed normally on the basis of the first electric signal and the second electric signal.

The detection circuit may output a summation electric signal being a sum of the first electric signal and the second electric signal, and the detection circuit may determine whether force detection is performed normally on the basis of the summation electric signal and at least one of the first electric signal and the second electric signal.

The force sensor described above may further include a support arranged to face the displacement body and connected to the fixed portion, and each of the displacement sensors may be a capacitive element having a displacement electrode arranged in the displacement portion of the displacement body and a fixed electrode arranged on the support opposite to the displacement electrode.

The displacement portion may include a beam extending in a direction intersecting the longitudinal direction of the tilting portion.

A first measurement site may be defined in the beam, the detection circuit may include a 1-1 displacement sensor and a 1-2 displacement sensor that measure a displacement of the first measurement site, and the detection circuit may output the first electric signal on the basis of a detection value of the 1-1 displacement sensor and may output the second electric signal on the basis of a detection value of the 1-2 displacement sensor.

Alternatively, a first measurement site and a second measurement site may be defined in the beam, the detection circuit may include a 1-1 displacement sensor and a 1-2 displacement sensor that measure a displacement of the first measurement site and may include a 2-1 displacement sensor and a 2-2 displacement sensor that measure a displacement of the second measurement site, and the detection circuit may output the first electric signal on the basis of a detection value of each of the 1-1 displacement sensor and the 1-2 displacement sensor, and may output the second electric signal on the basis of a detection value of each of the 2-1 displacement sensor and the 2-2 displacement sensor.

The displacement portion may include a connecting body that connects the tilting portion of the deformable body and the beam, the first measurement site and the second measurement site of the displacement body may be defined symmetrically with respect to a connection site between the connecting body and the beam, the detection circuit may output the first electric signal on the basis of a difference between a detection value of the 1-1 displacement sensor and a detection value of the 2-2 displacement sensor, and may output the second electric signal on the basis of a difference between a detection value of the 1-2 displacement sensor and a detection value of the 2-1 displacement sensor.

The detection circuit may detect an applied force on the basis of the first electric signal, or a summation electric signal being a sum of the first electric signal and the second electric signal.

A force sensor according to a second aspect of the present invention includes:

a closed loop shaped deformable body including two force receiving portions, two fixed portions arranged alternately with the two force receiving portions along a closed loop shaped path, and four deformable elements configured to connect the force receiving portion and the fixed portion adjacent to each other along the closed loop shaped path and generate elastic deformation by one of a force and a moment applied to the force receiving portion;

four displacement bodies each connected to each of the deformable elements and configured to generate displacement by elastic deformation generated in the deformable element; and a detection circuit that detects at least one of the applied force and the moment on the basis of a displacement generated in the four displacement bodies, in which each of the four deformable elements includes:

a tilting portion having a longitudinal direction and arranged between the force receiving portion and the fixed portion;

a first deformable portion that connects the corresponding force receiving portion and the tilting portion; and a second deformable portion that connects the corresponding fixed portion and the tilting portion, the first deformable portion and the second deformable portion extend in a direction intersecting the longitudinal direction of the tilting portion, a connection site between the first deformable portion and the tilting portion is located at a position different from the position of a connection site between the second deformable portion and the tilting portion in the longitudinal direction of the tilting portion, each of the four displacement bodies includes a displacement portion connected to the corresponding tilting portion and separated from the corresponding fixed portion, the detection circuit includes at least four first displacement sensors and at least four second displacement sensors, at least one of the at least four first displacement sensors and the at least four second displacement sensors is arranged in each of the displacement portions, and the detection circuit outputs a first electric signal indicating an applied force on the basis of a detection value of each of the first displacement sensors, and outputs a second electric signal indicating an applied force on the basis of a detection value of each of the second displacement sensors, and then, determines whether force detection is performed normally on the basis of the first electric signal and the second electric signal.

The detection circuit may output a summation electric signal being a sum of the first electric signal and the second electric signal, and the detection circuit may determine whether force detection is performed normally on the basis of the summation electric signal and at least one of the first electric signal and the second electric signal.

This force sensor may further include a support arranged to face the four displacement bodies and connected to the fixed portion, and each of the displacement sensors may be a capacitive element having a displacement electrode arranged in the displacement portion of each of the displacement bodies and a fixed electrode arranged on the support opposite to each of the displacement electrodes.

Each of the four displacement bodies may include a beam extending in a direction intersecting the longitudinal direction of the corresponding tilting portion.

A first measurement site may be defined in each of the beams, the detection circuit may include a 1-1 displacement sensor and a 1-2 displacement sensor that measure a displacement of each of the first measurement sites, and the detection circuit may output the first electric signal on the basis of a detection value of each of the 1-1 displacement sensors, and may output the second electric signal on the basis of a detection value of each of the 1-2 displacement sensors.

Alternatively, a first measurement site and a second measurement site may be defined in each of the beams, the detection circuit may include a 1-1 displacement sensor and a 1-2 displacement sensor that measure a displacement of each of the first measurement sites and may include a 2-1 displacement sensor and a 2-2 displacement sensor that measure a displacement of each of the second measurement sites, and the detection circuit may output the first electric signal on the basis of each of detection values of each of the 1-1 displacement sensors and each of the 2-1 displacement sensors, and may output the second electric signal on the basis of each of detection values of each of the 1-2 displacement sensors and each of the 2-2 displacement sensors.

Each of the displacement portions may include a connecting body that connects the tilting portion of the deformable body and the beam, the first measurement site and the second measurement site of each of the displacement bodies may be defined symmetrically with respect to a connection site between the connecting body and the beam, each of the 1-1 displacement sensors, each of the 1-2 displacement sensors, each of the 2-2 displacement sensors, and each of the 2-1 displacement sensors may be arranged in this order along the longitudinal direction of the corresponding beam, and the detection circuit may output the first electric signal on the basis of a difference between a detection value of the 1-1 displacement sensor and a detection value of the 2-1 displacement sensor, and may output the second electric signal on the basis of a difference between a detection value of the 1-2 displacement sensor and a detection value of the 2-2 displacement sensor.

The detection circuit may detect the applied force on the basis of the first electric signal or a summation electric signal being a sum of the first electric signal and the second electric signal.

Moreover, the detection circuit may determine whether force detection is performed normally on the basis of one of a difference and a proportion between the summation electric signal and at least one of the first electric signal and the second electric signal.

A force sensor according to a third aspect of the present invention includes:

a deformable body having a force receiving portion and a fixed portion and configured to generate elastic deformation by a force applied to the force receiving portion, a displacement body connected to the deformable body and configured to generate displacement by elastic deformation generated in the deformable body; and a detection circuit that detects an applied force on the basis of the displacement generated in the displacement body, in which the deformable body includes:

a first tilting portion and a second tilting portion having a longitudinal direction and sequentially arranged from the force receiving portion toward the fixed portion between the force receiving portion and the fixed portion;

a force transmitting portion arranged between the first tilting portion and the second tilting portion;

a 1-1 deformable portion that connects the force receiving portion and the first tilting portion; a 1-2 deformable portion that connects the force transmitting portion and the first tilting portion; a 2-1 deformable portion that connects the force transmitting portion and the second tilting portion; and a 2-2 deformable portion that connects the fixed portion and the second tilting portion, each of the deformable portions extends in a direction intersecting with the longitudinal direction of each of the tilting portions, a connection site between the 1-1 deformable portion and the first tilting portion is located at a position different from a position of a connection site between the 1-2 deformable portion and the first tilting portion in the longitudinal direction of the first tilting portion, a connection site between the 2-1 deformable portion and the second tilting portion is located at a position different from a position of a connection site between the 2-2 deformable portion and the second tilting portion in the longitudinal direction of the second tilting portion, a spring constant of the 1-1 deformable portion and the 1-2 deformable portion is different from a spring constant of the 2-1 deformable portion and the 2-2 deformable portion, the displacement body includes a first displacement portion connected to the first tilting portion and separated from the fixed portion and includes a second displacement portion connected to the second tilting portion and separated from the fixed portion, the detection circuit includes a first displacement sensor that measures displacement of the first displacement portion and a second displacement sensor that measures displacement of the second displacement portion, and the detection circuit outputs a first electric signal indicating an applied force on the basis of a detection value of the first displacement sensor, and outputs a second electric signal indicating an applied force on the basis of a detection value of the second displacement sensor, and then, determines whether force detection is performed normally on the basis of a change in a ratio of the first electric signal to the second electric signal.

This force sensor may further include a support arranged to face the displacement body and connected to the fixed portion, and each of the displacement sensors may be a capacitive element having a displacement electrode arranged in each of the displacement portions of the displacement body and a fixed electrode arranged on the support opposite to the displacement electrode.

The first displacement portion may include a first beam extending in a direction intersecting the longitudinal direction of the first tilting portion, and the second displacement portion may include a second beam extending in a direction intersecting the longitudinal direction of the second tilting portion.

A 1-1 measurement site may be defined in the first beam, a 2-1 measurement site may be defined in the second beam, the detection circuit may include a 1-1 displacement sensor that measures a displacement of the 1-1 measurement site and a 2-1 displacement sensor that measures a displacement of the 2-1 measurement site, and the detection circuit may output the first electric signal on the basis of a detection value of the 1-1 displacement sensor and may output the second electric signal on the basis of a detection value of the 2-1 displacement sensor.

Alternatively, a 1-1 measurement site and a 1-2 measurement site may be defined in the first beam, a 2-1 measurement site and a 2-2 measurement site may be defined in the second beam, the detection circuit may include a 1-1 displacement sensor that measures a displacement of the 1-1 measurement site, a 1-2 displacement sensor that measures a displacement of the 1-2 measurement site, a 2-1 displacement sensor that measures a displacement of the 2-1 measurement site, and a 2-2 displacement sensor that measures a displacement of the 2-2 measurement site, and the detection circuit may output the first electric signal on the basis of each of detection values of the 1-1 displacement sensor and the 1-2 displacement sensor and may output the second electric signal on the basis of each of detection values of the 2-1 displacement sensor and the 2-2 displacement sensor.

The first displacement portion may include a first connecting body that connects the first tilting portion and the first beam, the second displacement portion may include a second connecting body that connects the second tilting portion and the second beam, the 1-1 measurement site and the 1-2 measurement site of the first displacement portion may be defined symmetrically with respect to a connection site between the first connecting body and the first beam, the 2-1 measurement site and the 2-2 measurement site of the second displacement portion may be defined symmetrically with respect to a connection site between the second connecting body and the second beam, and the detection circuit may output the first electric signal on the basis of a difference between a detection value of the 1-1 displacement sensor and a detection value of the 1-2 displacement sensor, and may output the second electric signal on the basis of a difference between a detection value of the 24 displacement sensor and a detection value of the 2-2 displacement sensor.

A force sensor according to a fourth aspect of the present invention includes:

a closed loop shaped deformable body including two force receiving portions, two fixed portions arranged alternately with the two force receiving portions along a closed loop shaped path, and four deformable elements configured to connect the force receiving portion and the fixed portion adjacent to each other along the closed loop shaped path and generate elastic deformation by one of a force and a moment applied to the force receiving portion;

a displacement body connected to each of the deformable elements and configured to generate displacement by elastic deformation generated in the deformable element; and a detection circuit that detects at least one of an applied force and a moment on the basis of the displacement generated in the displacement body, in which each of the four deformable elements includes:

a first tilting portion and a second tilting portion having a longitudinal direction and sequentially arranged from the force receiving portion toward the fixed portion between the force receiving portion and the fixed portion;

a force transmitting portion arranged between the first tilting portion and the second tilting portion;

a 1-1 deformable portion that connects the first tilting portion and the corresponding force receiving portion; a 1-2 deformable portion that connects the force transmitting portion and the first tilting portion; a 2-1 deformable portion that connects the force transmitting portion and the second tilting portion; and a 2-2 deformable portion that connects the second tilting portion and the corresponding fixed portion and, each of the 1-1 deformable portion, the 1-2 deformable portion, the 2-1 deformable portion, and the 2-2 deformable portion extends in a direction intersecting with the longitudinal direction of each of the tilting portions, a connection site between the 1-1 deformable portion and the first tilting portion is located at a position different from a position of a connection site between the 1-2 deformable portion and the first tilting portion in the longitudinal direction of the first tilting portion, a connection site between the 2-1 deformable portion and the second tilting portion is located at a position different from a position of a connection site between the 2-2 deformable portion and the second tilting portion in the longitudinal direction of the second tilting portion, a spring constant of the 1-1 deformable portion and the 1-2 deformable portion is different from a spring constant of the 2-1 deformable portion and the 2-2 deformable portion, each of the displacement bodies includes a first displacement portion connected to the corresponding first tilting portion and separated from each of the fixed portions and includes a second displacement portion connected to the corresponding second tilting portion and separated from each of the fixed portions, the detection circuit includes at least four first displacement sensors that measure a displacement of each of the first displacement portions and at least four second displacement sensors that measure a displacement of each of the second displacement portions, and the detection circuit outputs a first electric signal indicating an applied force on the basis of a detection value of each of the first displacement sensors, outputs a second electric signal indicating an applied force on the basis of a detection value of each of the second displacement sensors, and determines whether force detection is performed normally on the basis of a change in a ratio of the first electric signal to the second electric signal.

This force sensor may further include a support arranged to face the first displacement portion and the second displacement portion, and is connected to the fixed portion, and each of the displacement sensors may be a capacitive element having a displacement electrode arranged in each of the displacement portions of the displacement body and a fixed electrode arranged on the support opposite to the displacement electrode.

The first displacement portion may include a first beam extending in a direction intersecting the longitudinal direction of the corresponding first tilting portion, and the second displacement portion may include a second beam extending in a direction intersecting the longitudinal direction of the corresponding second tilting portion.

A 1-1 measurement site may be defined in each of the first beams, a 2-1 measurement site may be defined in each of the second beams, the detection circuit may include a 1-1 displacement sensor that measures a displacement of each of the 1-1 measurement sites and a 2-1 displacement sensor that measures a displacement of each of the 2-1 measurement sites, and the detection circuit may output the first electric signal on the basis of a detection value of each of the 14 displacement sensors and may output the second electric signal on the basis of a detection value of each of the 2-1 displacement sensors.

Alternatively, a 1-1 measurement site and a 1-2 measurement site may be defined in each of the first beams, a 2-1 measurement site and a 2-2 measurement site may be defined in each of the second beams, the detection circuit may include a 1-1 displacement sensor that measures a displacement of each of the 1-1 measurement sites, a 1-2 displacement sensor that measures a displacement of each of the 1-2 measurement sites, a 2-1 displacement sensor that measures a displacement of each of the 2-1 measurement sites, and a 2-2 displacement sensor that measures a displacement of each of the 2-2 measurement sites, and the detection circuit may output the first electric signal on the basis of each of detection values of each of the 1-1 displacement sensors and each of the 1-2 displacement sensors, and may output the second electric signal on the basis of each of detection values of each of the 2-1 displacement sensors and each of the 2-2 displacement sensors.

Each of the first displacement portions may include a first connecting body that connects the first tilting portion and the first beam, each of the second displacement portions may include a second connecting body that connects the second tilting portion and the second beam, the 1-1 measurement site and the 1-2 measurement site of the first displacement portion may be defined symmetrically with respect to a connection site between the first connecting body and the first beam, the 2-1 measurement site and the 2-2 measurement site of the second displacement portion may be defined symmetrically with respect to a connection site between the second connecting body and the second beam, and the detection circuit may output the first electric signal on the basis of a difference between a detection value of the 1-1 displacement sensor and a detection value of the 1-2 displacement sensor, and may output the second electric signal on the basis of a difference between a detection value of the 2-1 displacement sensor and a detection value of the 2-2 displacement sensor.

The detection circuit may store a ratio of the first electric signal to the second electric signal in a state where the force detection is performed normally as a reference ratio, and may determine whether the force detection is performed normally on the basis of a difference between the ratio of the first electric signal to the second electric signal and the reference ratio.

In each of the force sensors described above, the relative movement of the force receiving portion with respect to the fixed portion may be limited to a position within a predetermined range.

Alternatively, the relative movement of the force receiving portion with respect to at least one of the fixed portion and the support may be limited to a position within a predetermined range.

A force sensor according to a fifth aspect of the present invention includes:

a deformable body having a force receiving portion and a fixed portion and configured to generate elastic deformation by a force applied to the force receiving portion;

a displacement body connected to the deformable body and configured to generate displacement by elastic deformation generated in the deformable body;

a detection circuit configured to detect an applied force on the basis of the displacement generated in the displacement body; and a support connected to the fixed portion, in which the deformable body includes:

a tilting portion having a longitudinal direction and arranged between the force receiving portion and the fixed portion;

a first deformable portion that connects the force receiving portion and the tilting portion; and a second deformable portion that connects the fixed portion and the tilting portion, each of the deformable portions extends in a direction intersecting with the longitudinal direction of the tilting portion, a connection site between the first deformable portion and the tilting portion is located at a position different from the position of a connection site between the second deformable portion and the tilting portion in the longitudinal direction of the tilting portion, the displacement body includes a displacement portion connected to the tilting portion and separated from the fixed portion, and the relative movement of the force receiving portion with respect to at least one of the fixed portion and the support is limited to a position within a predetermined range.

The above force sensor may further include a support connected to the fixed portion, and the predetermined range may be defined by a separation distance between the support and the force receiving portion.

The force sensor described above may further include a stopper connected to at least one of the fixed portion and the support of the deformable body and configured to limit the relative movement of the force receiving portion with respect to at least one of the fixed portion and the support to a position within the predetermined range.

The force receiving portion may include one of a recess and a through hole, and at least a portion of the stopper may be located inside of one of the recess and the through hole.

BRIEF DESCRIPTION OF DRAWINGS

FIG. 9 is a table illustrating a variation of an electrostatic capacitance value of each of capacitive elements when forces +Fx and −Fz are applied to the force sensor of FIG. 7.

FIG. 11 is a table summarizing displacements in the Z-axis direction generated in each of measurement sites when the force +Fx in the positive direction on the X-axis and the force −Fz in the negative direction on the Z-axis are applied to the force receiving portion.

FIG. 26 is a table listing displacements generated in each of measurement sites of the basic structure of FIG. 17 when a force in each of axial directions and a moment in each of axial directions on the XYZ three-dimensional coordinate system are applied to the force receiving portion.

FIG. 29 is a table listing an increase or decrease in electrostatic capacitance values of capacitive elements of the force sensor illustrated in FIG. 27 when a force in each of the axial directions and a moment around each of the axes in the XYZ three-dimensional coordinate system are applied.

FIG. 30 is a table listing a cross-axis sensitivity of a force in each of axial directions and a moment around each of axes in the force sensor illustrated in FIG. 27.

FIG. 32 is a table illustrating variations of the electrostatic capacitance value of each of capacitive elements when four force and moment components are applied to the force sensor illustrated in FIG. 31.

FIG. 33 is a table listing a cross-axis sensitivity of a force in each of axial directions and a moment around each of axes in the force sensor illustrated in FIG. 31.

FIG. 36 is a table illustrating a list of variations of electrostatic capacitance value of each of capacitive elements when four force and moment components Fx, Fy, Fz, and Mz are applied to the force sensor illustrated in FIG. 35.

FIG. 39 is a table listing an increase or decrease in electrostatic capacitance values of capacitive elements of the force sensor illustrated in FIG. 38 when a force in each of the axial directions and a moment around each of the axes in the XYZ three-dimensional coordinate system are applied.

FIG. 42 is a table listing a direction of tilting generated in each of tilting portions and displacements generated in each of displacement portions of the force sensor of FIG. 41 when forces and moments Fx to Mz in each of axial directions on the XYZ three-dimensional coordinate system are applied to the force receiving portion.

DESCRIPTION OF EMBODIMENTS

<<<§ 1. Force Sensor According to First Embodiment of Present Invention>>>

<1-1. Structure of Basic Structure>

A force sensor according to a first embodiment of the present invention will be described with reference to the accompanying drawings.

Figure 1:
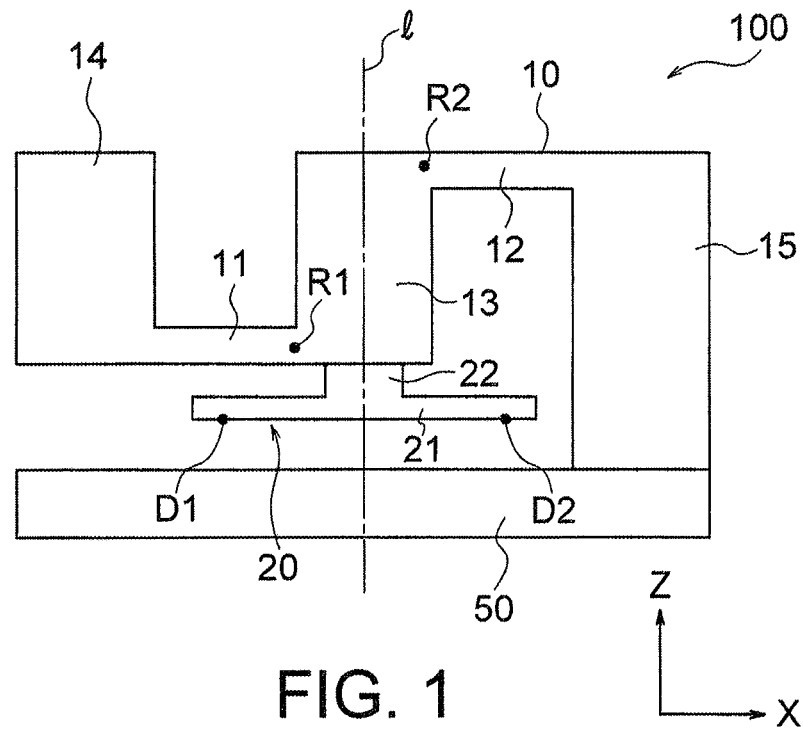
FIG. 1 is a schematic front view illustrating a basic structure of a force sensor according to a first embodiment of the present invention.
Figure 2:
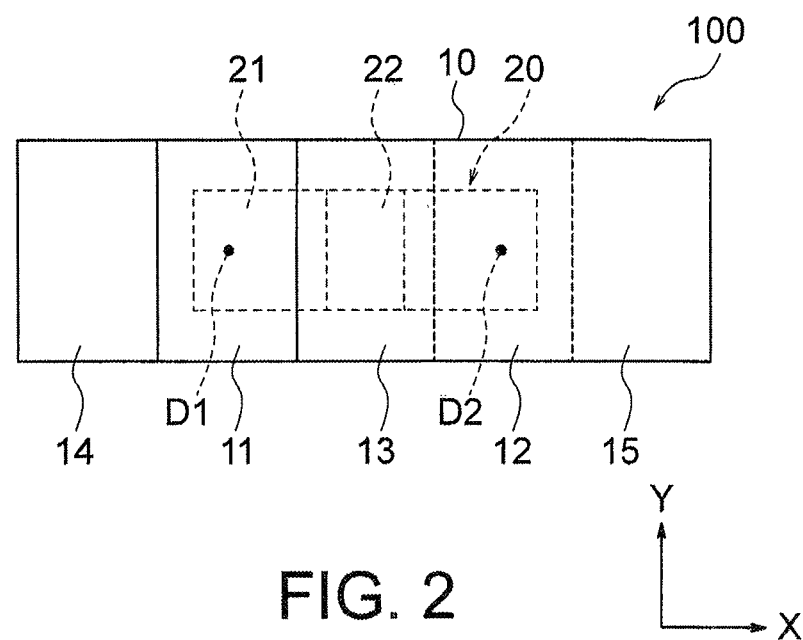
FIG. 2 is a schematic top view of FIG. 1.

FIG. 1 is a schematic front view illustrating a basic structure 100 of a force sensor according to one embodiment of the present invention, and FIG. 2 is a schematic top view of the structure. Herein, the following description will be provided with definition of an XYZ three-dimensional coordinate system as illustrated in FIGS. 1 and 2.

As illustrated in FIGS. 1 and 2, the basic structure 100 includes a deformable body 10 having a force receiving portion 14 and a fixed portion 15 and configured to generate elastic deformation by a force applied to the force receiving portion 14, and includes a displacement body 20 connected to the deformable body 10 and configured to generate displacement by elastic deformation generated in the deformable body 10. The force receiving portion 14 is a site that receives a force to be detected. The fixed portion 15 is a site that is not displaced in the XYZ three-dimensional coordinate system even when the force is applied to the force receiving portion 14.

In the present embodiment, as illustrated in FIGS. 1 and 2, the deformable body 10 includes: a tilting portion 13 having a longitudinal direction I parallel to the Z-axis and arranged between the force receiving portion 14 and the fixed portion 15; a first deformable portion 11 that connects a force receiving portion P and the tilting portion 13; and a second deformable portion 12 that connects the fixed portion 15 and the tilting portion 13. As illustrated in the drawing, the first deformable portion 11 extends in a direction intersecting the longitudinal direction I on one side (left side in FIGS. 1 and 2) of the tilting portion 13. In contrast, the second deformable portion 12 extends in a direction intersecting the longitudinal direction I on the other side (right side in FIGS. 1 and 2) of the tilting portion 13. In the illustrated example, the direction intersecting the longitudinal direction I is the X-axis direction.

Furthermore, a connection site R1 between the first deformable portion 11 and the tilting portion 13 is located at a position different from the position of a connection site R2 between the second deformable portion 12 and the tilting portion 13 in the longitudinal direction I of the tilting portion 13. Specifically, the connection site R1 is located in the vicinity of a Z-axis negative side end portion (lower end portion in FIG. 1) of the tilting portion 13, while the connection site R2 is located in the vicinity of a Z-axis positive side end portion (upper end portion in FIG. 1) of the tilting portion 13.

As illustrated in FIGS. 1 and 2, the force receiving portion 14 and the fixed portion 15 both extend in parallel with the Z-axis. The upper end portions of the force receiving portion 14, the tilting portion 13 and the fixed portion 15 have the same Z-coordinate. Moreover, the lower end portions of the force receiving portion 14 and the tilting portion 13 also have the same Z-coordinate. The lower end of the force receiving portion 14 and the lower end of the tilting portion 13 are connected with each other by the first deformable portion 11 extending in parallel with the X-axis. The upper end of the tilting portion 13 and the upper end of the fixed portion 15 are connected with each other by the second deformable portion 12 extending in parallel with the X-axis. Furthermore, the lower end of the fixed portion 15 is connected to a support 50 arranged opposite to the tilting portion 13 at a predetermined interval.

As illustrated in FIGS. 1 and 2, the displacement body 20 includes a beam 21 connected to the tilting portion 13 via a connecting body 22 attached to the lower end of the tilting portion 13. The beam 21 extends in a direction orthogonal to the longitudinal direction I of the tilting portion 13 and has a symmetrical shape when viewed in the Y-axis direction. The beam 21 is separated from the fixed portion 15 and the force receiving portion 14 of the deformable body 10 so as to avoid disturbing the tilting (pivoting) of the beam 21 by the fixed portion 15 and the force receiving portion 14. In the beam 21, a first measurement site D1 and a second measurement site D2 are defined symmetrically with respect to the connection site between the beam 21 and the connecting body 22. As will be described below, the capacitive elements are arranged at the first measurement site D1 and the second measurement site D2, so as to detect the force applied to the force receiving portion 14.

<1-2. Application of Basic Structure>

Next, application of the basic structure 100 as described above will be described.

Figure 3:
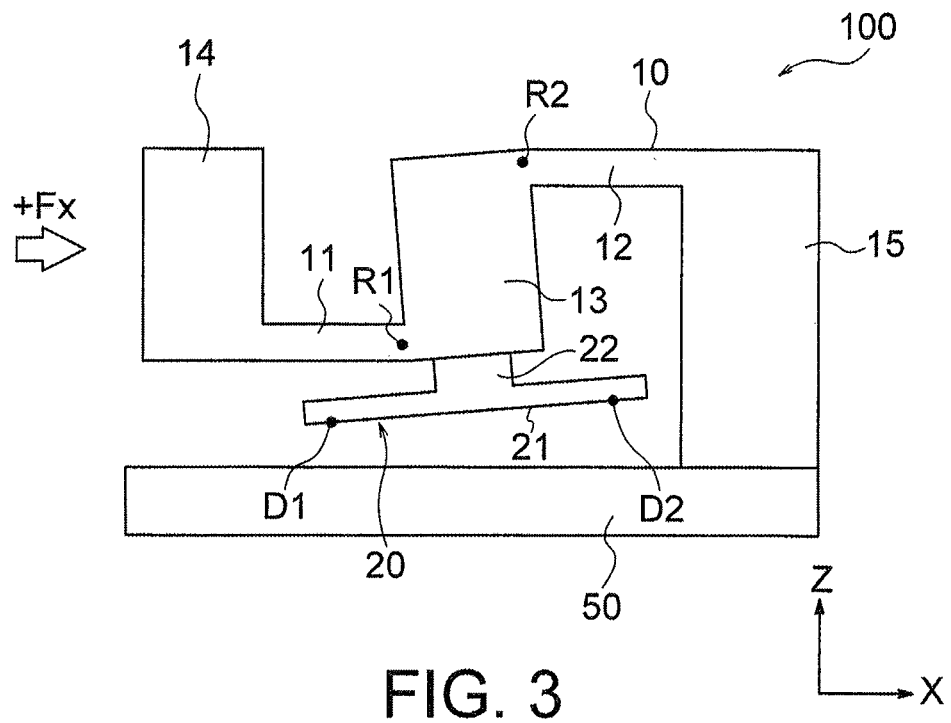
FIG. 3 is a schematic front view illustrating a deformed state of a basic structure when a force +Fx in the positive direction on the X-axis is applied to a force receiving portion.
Figure 4:
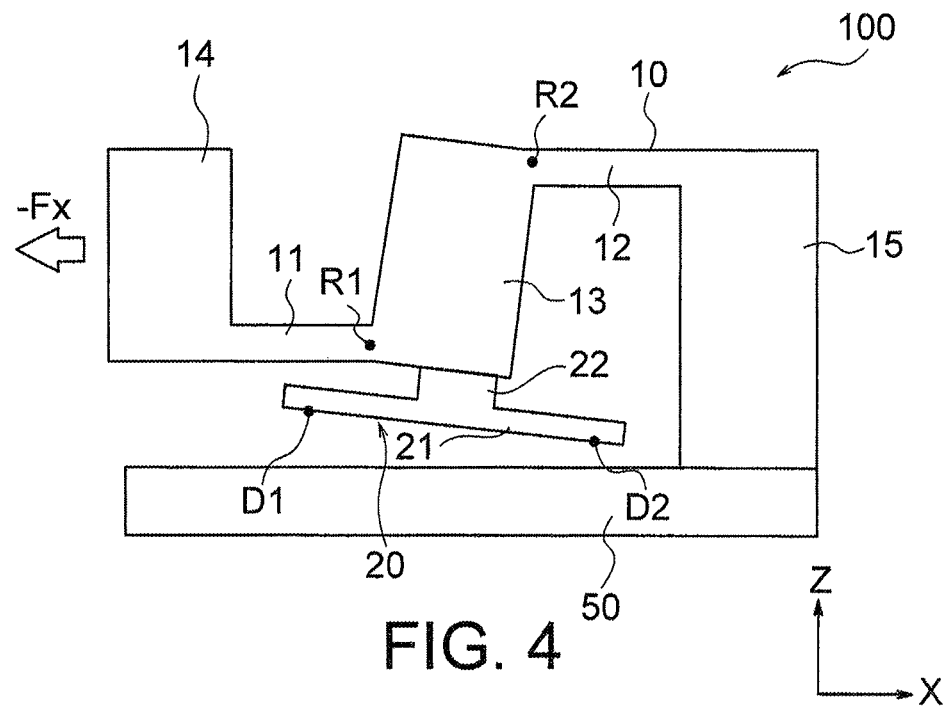
FIG. 4 is a schematic front view illustrating a deformed state of a basic structure when a force −Fx in the negative direction on the X-axis is applied to the force receiving portion.
Figure 5:
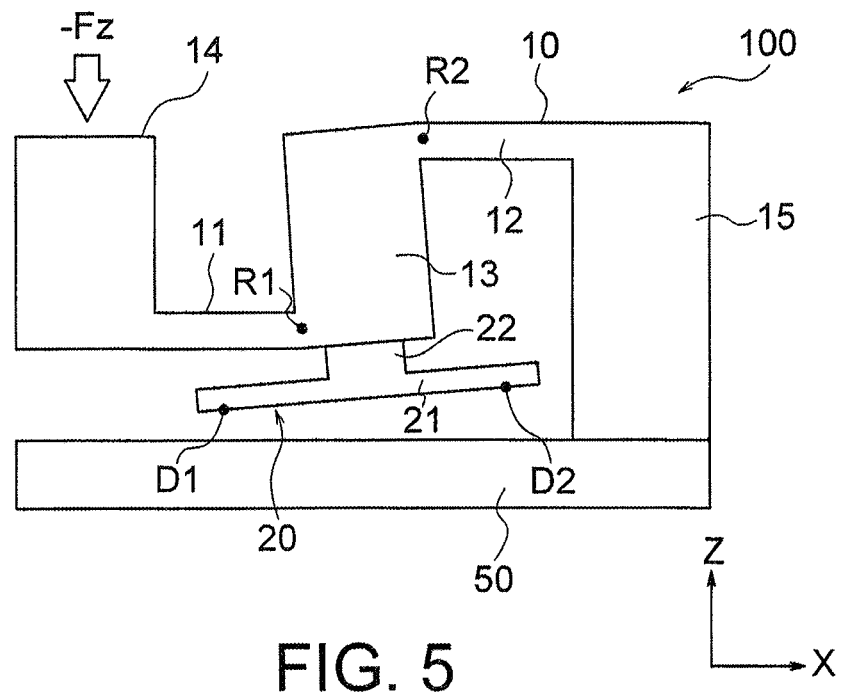
FIG. 5 is a schematic front view illustrating a deformed state of a basic structure when a force −Fz in the negative direction on the Z-axis is applied to the force receiving portion.
Figure 6:
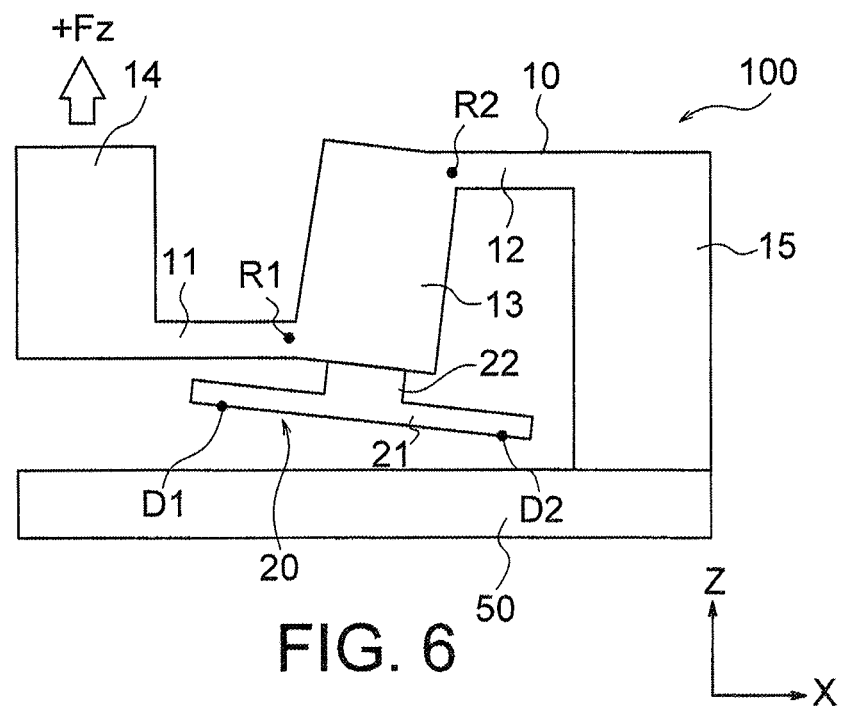
FIG. 6 is a schematic front view illustrating a deformed state of a basic structure when a force +Fz in the positive direction on the Z-axis is applied to the force receiving portion.

FIG. 3 is a schematic front view illustrating a deformed state of the basic structure 100 when the force +Fx in the positive direction on the X-axis is applied to the force receiving portion 14. FIG. 4 is a schematic front view illustrating a deformed state of the basic structure 100 when the force −Fx in the negative direction on the X-axis is applied to the force receiving portion 14. FIG. 5 is a schematic front view illustrating a deformed state of the basic structure 100 when the force −Fz in the negative direction on the Z-axis is applied to the force receiving portion 14. FIG. 6 is a schematic front view illustrating a deformed state of the basic structure 100 when the force +Fz in the positive direction on the Z-axis is applied to the force receiving portion 14.

(1-2-1. Case where Force +Fx is Applied)

When the force +Fx in the positive direction on the X-axis is applied to the force receiving portion 14, a force in the positive direction on the X-axis (right direction in FIG. 3) is applied to a connection site R1 in the vicinity of the lower end of the tilting portion 13, while a force in the negative direction on the X-axis (left direction in FIG. 3) is applied to a connection site R2 in the vicinity of the upper end of the tilting portion 13 as a reaction to the applied force +Fx. With application of these forces, the tilting portion 13 tilts counterclockwise as illustrated in FIG. 3. Furthermore, both the first deformable portion 11 and the second deformable portion 12 are compressively deformed by the application of the applied force +Fx, leading to a slight displacement of the tilting portion 13 as a whole in the positive direction on the X-axis.

Due to such tilting of the tilting portion 13, as illustrated in FIG. 3, the beam 21 connected to the lower end of the tilting portion 13 also tilts counterclockwise. With this configuration, the first measurement site D1 of the beam 21 is displaced in a direction (downward in FIG. 3) of decreasing the separation distance from the support 50, while the second measurement site D2 is displaced in a direction (upward in FIG. 3) of increasing the separation distance from the support 50.

(1-2-2. Case where Force −Fx is Applied)

Next, when the force −Fx in the negative direction on the X-axis is applied to the force receiving portion 14, a force in the negative direction on the X-axis (left direction in FIG. 4) is applied to the connection site R1 in the vicinity of the lower end of the tilting portion 13, while a force in the positive direction on the X-axis (right direction in FIG. 4) is applied to the connection site R2 in the vicinity of the upper end of the tilting portion 13 as a reaction to the applied force −Fx. With application of these forces, the tilting portion 13 tilts clockwise as illustrated in FIG. 4. Furthermore, both the first deformable portion 11 and the second deformable portion 12 are tensile-deformed by the application of the applied force −Fx, leading to a slight displacement of the tilting portion 13 as a whole in the negative direction on the X-axis.

Due to such tilting of the tilting portion 13, as illustrated in FIG. 4, the beam 21 connected to the lower end of the tilting portion 13 also tilts clockwise. With this configuration, the first measurement site D1 of the beam 21 is displaced in a direction (upward in FIG. 4) of increasing the separation distance from the support 50, while the second measurement site D2 is displaced in a direction (downward in FIG. 4) of decreasing the separation distance from the support 50.

(1-2-3. Case where Force −Fz is Applied)

Next, when the force −Fz in the negative direction on the Z-axis is applied to the force receiving portion 14, a force in the negative direction on the Z-axis (downward in FIG. 5) is applied to the connection site R1 at a lower left end of the tilting portion 13, while a force in the positive direction on the Z-axis (upward in FIG. 5) is applied to the connection site R2 at an upper right end of the tilting portion 13 as a reaction to the applied force −Fz. With application of these forces, the tilting portion 13 tilts counterclockwise as illustrated in FIG. 5. Furthermore, due to the application of the applied force −Fz, the tilting portion 13 is pulled down in the negative direction on the Z-axis via the first deformable portion 11, leading to a slight displacement of displacing the tilting portion 13 as a whole in the negative direction on the Z-axis.

Due to the tilting of the tilting portion 13, as illustrated in FIG. 5, the beam 21 connected to the lower end of the tilting portion 13 also tilts counterclockwise. With this configuration, the first measurement site D1 of the beam 21 is displaced in a direction (downward in FIG. 5) of decreasing the separation distance from the support 50, while the second measurement site D2 is displaced in a direction (upward in FIG. 5) of increasing the separation distance from the support 50.

Note that depending on the length of the beam 21, the displacement of the second measurement site D2 in the positive direction on the Z-axis is smaller than the displacement of the entire beam 21 in the negative direction on the Z-axis, leading to the decrease in the separation distance from the support 50 also in the case of the second measurement site D2. Still, it is assumed that the beam 21 has a sufficient length, and such a situation would not occur.

(1-2-4. Case where Force +Fz is Applied)

Next, when the force +Fz in the positive direction on the Z-axis is applied to the force receiving portion 14, a force in the positive direction on the Z-axis (upward in FIG. 6) is applied to the connection site R1 at a lower left end of the tilting portion 13, while a force in the negative direction on the Z-axis (downward in FIG. 6) is applied to the connection site R2 at an upper right end of the tilting portion 13 as a reaction to the applied force +Fz. With the application of these forces, as illustrated in FIG. 6, the tilting portion 13 tilts clockwise. Of course, due to the application of the applied force +Fz, the tilting portion 13 is pulled up in the positive direction on the Z-axis via the first deformable portion 11, leading to a slight displacement of the tilting portion 13 as a whole in the positive direction on the Z-axis.

Due to such tilting of the tilting portion 13, as illustrated in FIG. 6, the beam 21 connected to the lower end of the tilting portion 13 also tilts clockwise. With this configuration, the first measurement site D1 of the beam 21 is displaced in a direction (upward in FIG. 6) of increasing the separation distance from the support 50, while the second measurement site D2 is displaced in a direction (downward in FIG. 6) of decreasing the separation distance from the support 50.

Note that depending on the length of the beam 21, the displacement of the second measurement site D2 in the negative direction on the Z-axis is smaller than the displacement of the entire beam 21 in the positive direction on the Z-axis, leading to the increase in the separation distance from the support 50 also in the case of the second measurement site D2. Still, it is assumed that the beam 21 has a sufficient length, and such a situation would not occur.

In any of the above cases, the displacement generated in the first measurement site D1 and the second measurement site D2 is larger than the displacement generated at the lower end of the tilting portion 13. That is, due to the presence of the beam 21, the displacement generated at the lower end portion of the tilting portion 13 is amplified and taken out as the displacement in the Z-axis direction in each of the measurement sites D1 and D2 of the beam 21.

<1-3. Configuration of Force Sensor>

Next, a configuration of a force sensor 100c having the basic structure 100 described in 1-1 and 1-2 will be described.

Figure 7:
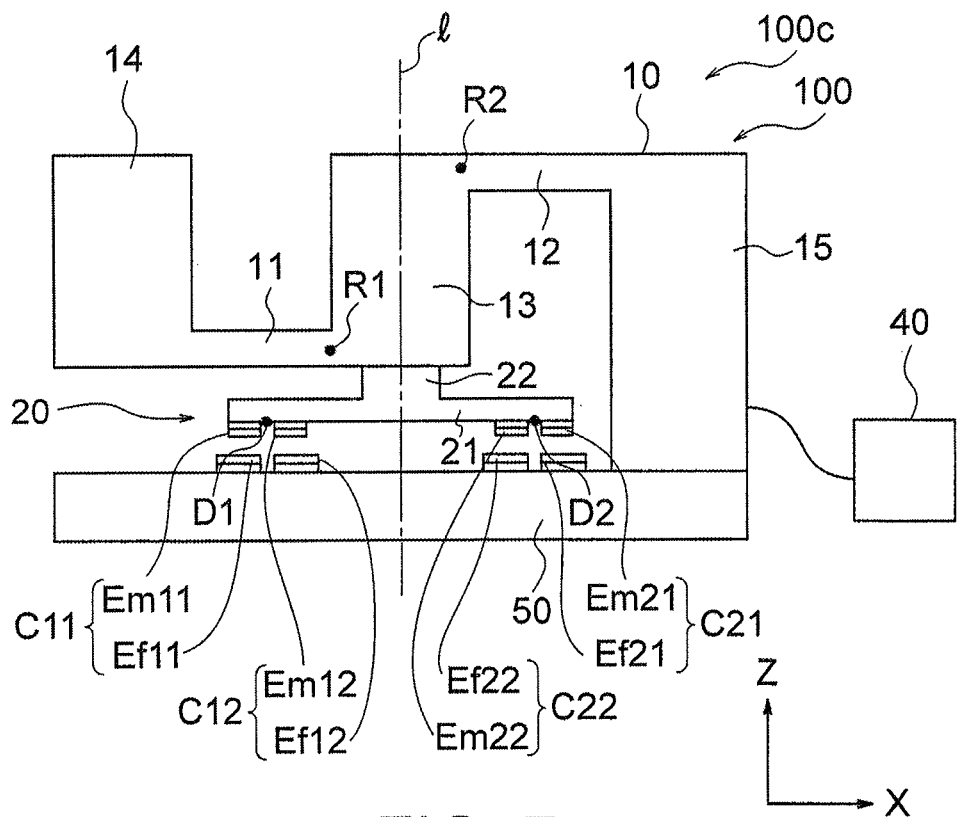
FIG. 7 is a schematic front view illustrating an example of a force sensor that adopts the basic structure illustrated in FIG. 1.
Figure 8:
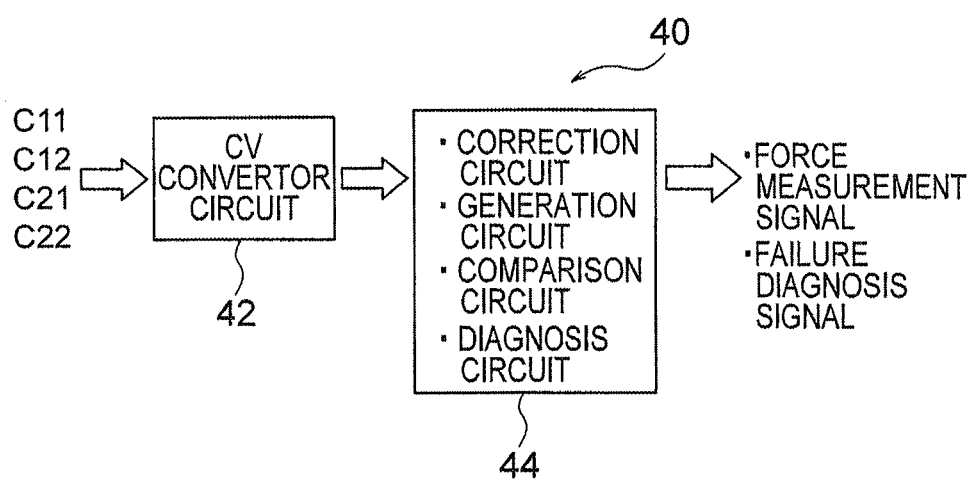
FIG. 8 is a block diagram of a detection circuit adopted in the force sensor of the present embodiment.

FIG. 7 is a schematic front view illustrating, an example of the force sensor 100c adopting the basic structure 100 illustrated in FIG. 1. FIG. 8 is a block diagram of a detection circuit 40 adopted in the force sensor 100c of the present embodiment.

As illustrated in FIG. 7, the force sensor 100c includes the above-described basic structure 100, and the detection circuit 40 that detects an applied force on the basis of the displacement generated in each of the first measurement site D1 and the second measurement site D2 of the beam 21 of the basic structure 100. As illustrated in FIG. 7, the detection circuit 40 of the present embodiment is connected to capacitive elements C11 to C22, specifically, a 1-1 capacitive element C11 and a 1-2 capacitive element C12 arranged at the first measurement site D1, and a 2-1 capacitive element C21 and a 2-2 capacitive element C22 arranged at the second measurement site D2. The detection circuit 40 has functions to measure and output the applied force on the basis of a variation amount of the electrostatic capacitance value of each of the capacitive elements C11 to C22. As illustrated in the drawing, the 1-1 capacitive element C11 and the 2-1 capacitive element C21 are arranged symmetrically with respect to the connection site between the beam 21 and the connecting body 22, while the 1-2 capacitive element C12 and the 2-2 capacitive element C22 are arranged between the 1-1 capacitive element C11 and the 2-1 capacitive element C21, symmetrically with respect to the connection site.

As illustrated in FIG. 7, the 1-1 capacitive element C11 includes a 1-1 displacement electrode Em11 arranged on the first measurement site D1 of the beam 21 via an insulator, and includes an a 1-1 fixed electrode Ef11 arranged on the support 50 via an insulator so as to face the 1-1 displacement electrode Em11. The 1-2 capacitive element C12 includes a 1-2 displacement electrode Em12 arranged on the first measurement site D1 of the beam 21, adjacent to the 1-1 capacitive element C11 via an insulator, and includes a 1-2 fixed electrode Ef12 arranged on the support 50 via an insulator so as to face the 1-2 displacement electrode Em12. Note that one of the 1-1 displacement electrode Em11 and the 1-2 displacement electrode Em12, and the 1-1 fixed electrode Ef11 and the 1-2 fixed electrode Ef12 may be formed with a common electrode.

Furthermore, as illustrated in FIG. 7, the 2-1 capacitive element C21 includes a 2-1 displacement electrode Em21 arranged on the second measurement site D2 of the beam 21 via an insulator, and includes a 2-1 fixed electrode Ef21 arranged on the support 50 via an insulator so as to face the 2-1 displacement electrode Em21. The 2-2 capacitive element C22 includes a 2-2 displacement electrode Em22 arranged on the second measurement site D2 of the beam 21, adjacent to the 2-1 capacitive element C21 via an insulator, and includes a 2-2 fixed electrode Ef22 arranged on the support 50 via an insulator so as to face the 2-2 displacement electrode Em22. Note that one of the 2-1 displacement electrode Em21 and the 2-2 displacement electrode Em22, and the 2-1 fixed electrode Ef21 and the 2-2 fixed electrode Ef22 may be formed with a common electrode.

Moreover, as illustrated in FIG. 8, the detection circuit 40 includes a C/V converter 42 for converting the electric signals corresponding to the electrostatic capacitance values of the capacitive elements C11 to C22 into corresponding voltage values, and includes a microcomputer 44 for calculating the forces Fx and Fz applied to the force sensor 100c on the basis of the voltage value supplied from the C/V converter 42. The microcomputer 44 includes a correction circuit for correcting a voltage value provided from the C/V converter 42 on the basis of characteristics (area, inter-plate distance, arranged position, or the like) of the capacitive elements C11 to C22, a generation circuit that performs a predetermined difference calculation on a voltage value supplied from the C/V converter 42 to generate a plurality of electric signals (electric signals corresponding to Fx1 to Fx3 and Fz1 to Fz3 to be described below) corresponding to the forces Fx and Fz, a comparison circuit for comparing these electric signals with each other, and a diagnosis circuit for diagnosing whether the force sensor 100c functions normally on the basis of a comparison result by the comparison circuit.

Although not specifically illustrated in FIG. 7, the capacitive elements C11 to C22 are connected to the C/V converter 42 by a predetermined circuit. With the microcomputer 44 connected to the C/V converter 42, the applied force can be measured on the basis of the variation amount of the electrostatic capacitance value of each of the capacitive elements C11 to C22.

<1-4. Application of Force Sensor>

Figure 9:
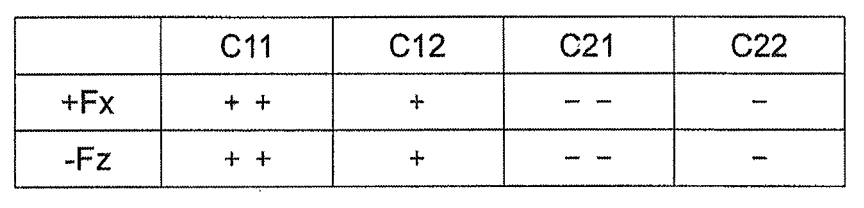

Next, application of the force sensor 100c described in 1-3 will be described. FIG. 9 is a table illustrating variations in electrostatic capacitance values of the capacitive elements C11 to C22 when the forces Fx and Fz are applied to the force sensor 100c. In this table, "+" represents that the electrostatic capacitance value increases, and "++" represents that the electrostatic capacitance value widely increases. In addition, "−" represents that the electrostatic capacitance value decreases, and "−−" represents that the electrostatic capacitance value widely decreases.

(1-4-1. Case where Force Fx is Applied)

As observed from the behavior of the beam 21 described with reference to FIG. 3 in 1-2, when a force +Fx in the positive direction on the X-axis is applied to the force receiving portion 14 of the force sensor 100c, the separation distance between the displacement electrodes Em11 and Em12 and the corresponding fixed electrodes Ef11 and Ef12, respectively decreases in the 1-1 capacitive element C11 and the 1-2 capacitive element C12. In contrast, the separation distance between the displacement electrodes Em21 and Em22 and the corresponding fixed electrodes Ef21 and Ef22 respectively increases in the 2-1 capacitive element C21 and the 2-2 capacitive element C22. This increases the electrostatic capacitance values of the 1-1 capacitive element C11 and the 1-2 capacitive element C12 and decreases the electrostatic capacitance values of the 2-1 capacitive element C21 and the 2-2 capacitive element C22. In consideration of a distance from the connection site between the tilting portion 13 and the beam 21, that is, from the center of tilting of the beam 21 to each of the capacitive elements C11 to C22, the variation amount of the electrostatic capacitance values of the 1-1 capacitive element C11 and the 2-1 capacitive element C21 is larger than the variation amount of the electrostatic capacitance values of the 1-2 capacitive element C12 and the 2-2 capacitive element C22.

The above results are summarized in the field of Fz in FIG. 9.

In the present embodiment, the 1-1 capacitive element C11 and the 2-1 capacitive element C21 are arranged at equal distances from the center of tilting of the beam 21, while the 1-2 capacitive element C12 and the 2-2 capacitive element C22 are arranged at equal distances from the center of tilting of the beam 21. Therefore, the magnitude ($|\Delta C11|$) of the variation of the electrostatic capacitance value of the 1-1 capacitive element C11 is equal to the magnitude ($|\Delta C21|$) of the variation of the electrostatic capacitance value of the 2-1 capacitive element C21. Furthermore, the magnitude ($|\Delta C12|$) of the variation of the electrostatic capacitance value of the 1-2 capacitive element C12 is equal to the magnitude ($|\Delta C22|$) of the variation of the electrostatic capacitance value of the 2-2 capacitive element C22. Accordingly, when $|\Delta C11|=|\Delta C21|=\Delta C1$, and $|\Delta C12|=|\Delta C22|=\Delta C2$, then each of electrostatic capacitance values C11a to C22a of the 1-1 to 2-2 capacitive elements C11 to C11 to C22 when the force +Fx is applied will be expressed by the following [Expression 1]. In [Expression 1], C11 to C22 respectively represent electrostatic capacitance values of the capacitive elements C11 to C22 when no force is applied. This notation method is similarly used in each of formulae to follow.

$C11a=C11+\Delta C1$ $C12a=C12+\Delta C2$ $C21a=C21-\Delta C1$ $C22a=C22-\Delta C2$     [Expression 1]

The microcomputer 44 measures the applied force +Fx by any of +Fx1 to +Fx3 expressed in the following [Expression 2] on the basis of the variation of the electrostatic capacitance value like this. The numerals "1" to "3" at the end are signs to distinguish on the basis of which of the capacitive elements the value of +Fx is measured. Of course, when the force sensor 100c functions normally, +Fx1 to +Fx3 are substantially equal values. In addition, while the force and the electrostatic capacitance value are connected by "=" in [Expression 2], the force +Fx is measured after performing predetermined conversion in practice since the values represent different physical quantities. This notation is not limited to [Expression 2], and will be used in common for each of the following expressions.

$+Fx1=C11-C21$ $+Fx2=C12-C22$ $+Fx3=+Fx1+Fx2=(C11+C12)-(C21+C22)$     [Expression 2]

Note that when the force −Fx in the negative direction on the X-axis is applied to the force receiving portion 14 of the force sensor 100c, the electrostatic capacitance values of the 1-1 capacitive element C11 and the 1-2 capacitive element C12 decrease, and the electrostatic capacitance values of the 2-1 capacitive element C21 and the 2-2 capacitive element C22 increase, as can be observed from the behavior of the beam 21 described with reference to FIG. 4 in 1-2. Therefore, in order to measure the applied force −Fx, it is sufficient to invert all the signs in [Expression 2]. Consequently, regardless of whether the direction of the force Fx in the X-axis direction is positive or negative, the force Fx can be measured by the same expression as [Expression 2].

In measuring the force Fx, from the viewpoint of S/N, it is preferable to use the expression of Fx1 based on the capacitive elements C11 and C21 being located distant from the longitudinal direction I of the tilting portion 13 and having relatively large variation amount of the electrostatic capacitance value, or use the expression of Fx3 based on all the capacitive elements C11 to C22.

(1-4-2. Case where Force Fz is Applied)

Next, when a force −Fz in the negative direction on the Z-axis is applied to the force receiving portion 14 of the force sensor 100c, each of the separation distances between the displacement electrodes Em11, Em12 and the corresponding fixed electrodes Ef11 and Ef12 decreases in the 1-1 capacitive element C11 and the 1-2 capacitive element C12, while each of the separation distances between the displacement electrodes Em21 and Em22 and the corresponding fixed electrodes Ef21 and Ef22 increases in the 2-1 capacitive element C21 and the 2-2 capacitive element C22, as can be observed from the behavior of the beam 21 described with reference to FIG. 5 in 1-2. This increases the electrostatic capacitance values of the 1-1 capacitive element C11 and the 1-2 capacitive element C12 and decreases the electrostatic capacitance values of the 2-1 capacitive element C21 and the 2-2 capacitive element C22. Moreover, similarly to the case where the force Fx is applied, the variation amount of the electrostatic capacitance value of the 1-1 capacitive element C11 and the 2-1 capacitive element C21 is larger than the variation amount of the that of the electrostatic capacitance value of the 1-2 capacitive element C12 and the 2-2 capacitive element C22. The above results are summarized in the field of Fz in FIG. 9.

More specifically, the displacement generated at the first measurement site D1 when the force −Fz is applied is a sum of the displacement of the tilting portion 13 in the negative direction on the Z-axis as a whole and the displacement in the negative direction on the Z-axis due to the tilting of the beam 21, while the displacement generated in the second measurement site D2 is a sum of the displacement of the tilting portion 13 and the displacement in the positive direction on the Z-axis due to the tilting of the beam 21. That is, in more specific description of the variation of the electrostatic capacitance value of each of the capacitive elements C11 to C22, the overall displacement of the tilting portion 13 in the negative direction on the Z-axis is added to the displacement generated in the first measurement site D1 due to the tilting of the beam 21 in the 1-1 capacitive element C11 and the 1-2 capacitive element C12, leading to a great decrease in each of the separation distances between the displacement electrodes Em11 and Em12 and the fixed electrodes Ef11 and Ef12. In contrast, the displacement generated in the second measurement site D2 due to the tilting of the beam 21 is canceled out by the overall displacement of the tilting portion 13 in the negative direction on the Z-axis in the 2-1 capacitive element C21 and the 2-2 capacitive element C22, leading to a slight increase in each of the separation distances between the displacement electrodes Em21 and Em22 and the fixed electrodes Ef21 and Ef22.

Still, since the length of the beam 21 is assumed to be sufficiently large for the sake of simplicity, it is possible to disregard the overall displacement of the tilting portion 13 in the Z-axis direction. Accordingly, the microcomputer 44 measures the applied force −Fz by the following [Expression 3].

$-Fz1=C11-C21$ $-Fz2=C12-C22$ $-Fz3=(-Fz1)+(-Fz2)=(C11+C12)-(C21+C22)$     [Expression 3]

Note that when the force +Fz in the positive direction on the Z-axis is applied to the force receiving portion 14 of the force sensor 100c, the electrostatic capacitance values of the 1-1 capacitive element C11 and the 1-2 capacitive element C12 decrease, and the electrostatic capacitance values of the 2-1 capacitive element C21 and the 2-2 capacitive element C22 increase, as can be observed from the behavior of the beam 21 described with reference to FIG. 6 in 1-2. Accordingly, in order to measure the applied force +Fz, it is sufficient to invert all the signs in [Expression 3]. Consequently, regardless of whether the direction of the force Fz in the Z-axis direction is positive or negative, the force Fz can be measured by the same expression as [Expression 3].

Here, in comparison of [Expression 2] and [Expression 3], it is observed that the right sides of +Fx and −Fz are the same. This makes it difficult for the force sensor 100c according to the present embodiment to distinguish whether the applied force is +Fx or −Fz. That is, the force sensor 100c has difficulty in distinguishing the direction of the applied force. For this reason, the force sensor 100c can be suitably used in an environment where the applied force is restricted to one of the directions of the X-axis direction and the Z-axis direction.

In measuring the force Fz, from the viewpoint of S/N, it is preferable to use the expression of Fz1 based on the capacitive elements C11 and C21 being located distant from the longitudinal direction I of the tilting portion 13 and having relatively large variation amount of the electrostatic capacitance value, or use the expression of Fz3 based on all the capacitive elements C11 to C22.

<1-5. Failure Diagnosis>

The detection circuit 40 according to the present embodiment has a function of determining whether the force sensor 100c functions normally. Now, the function of this failure diagnosis will be described.

The microcomputer 44 of the detection circuit 40 according to the present embodiment outputs: a first electric signal T1 based on a difference between the variation amount of the electrostatic capacitance value of the 1-1 capacitive element C11 and the variation amount of the electrostatic capacitance value of the 1-2 capacitive element C12; a second electric signal T2 based on a difference between the variation amount of the electrostatic capacitance value of the 2-1 capacitive element C21 and the variation amount of the electrostatic capacitance value of the 2-2 capacitive element C22; and a summation electric signal T3 being a sum of the first electric signal T1 and the second electric signal T2. That is, the first electric signal T1 is an electric signal indicating the forces Fx1 and Fz1, the second electric signal T2 is an electric signal indicating the above-described Fx2 and Fz2, and the summation electric signal is the above-described force Fx3 and Fz3. The first electric signal T1, the second electric signal T2 and the summation electric signal T3 can be written down as the following [Expression 4].

$$T1=C11-C21$$

$$T2=C12-C22$$

$$T3=T1+T2=(C11+C12)-(C21+C22)$$ [Expression 4]

Meanwhile, as illustrated in FIG. 9, the variation amount of the electrostatic capacitance value of the 1-1 capacitive element C11 and the 2-1 capacitive element C21 is larger than the variation amount of the electrostatic capacitance value of the 1-2 capacitive element C12 and the 2-2 capacitive element C22. Therefore, output levels of the first electric signal T1 and the second electric signal T2 can be equalized by multiplying the second electric signal T2 by a predetermined correction coefficient k using the correction circuit of the microcomputer 44.

Then, the comparison circuit included in the microcomputer 44 compares these two electric signals T1 and k·T2. This comparison is performed on the basis of a difference between the signals T1 and k·T2 (for example: T1−k·T2), or the proportion of individual signals T1 and k·T2 (for example: T1/(k·T2). Then, when the difference or proportion between T1 and k·T2 falls within a predetermined range as a result of the comparison of the two electric signals T1 and k·T2, the diagnosis circuit of the microcomputer 44 determines that the force sensor 100c functions normally. In contrast, when the difference or ratio between T1 and k·T2 does not fall within the predetermined range, the diagnosis circuit of the microcomputer 44 determines that the force sensor 100c is not functioning normally (failed), and outputs the determination result as a failure diagnosis signal. With this detection circuit 40, it is possible to detect an abnormality such as breakage of an electrode included in the capacitive elements C11 to C22, short circuit, and mixing of foreign matter by the single force sensor 100c.

Of course, it is possible to diagnose the failure of the force sensor 100c by performing AD conversion of the variation amount of the electrostatic capacitance value of each of the capacitive elements C11 to C22 to compare the electrostatic capacitance values by the microcomputer 44.

According to the present embodiment as described above, it is possible to diagnose the failure of the force sensor 100c by comparison of the first electric signal T1 based on the variation amount of the electrostatic capacitance value of the 1-1 capacitive element C11 and the 2-1 capacitive element C21, with the second electric signal T2 based on the variation amount of the electrostatic capacitance value of the 1-2 capacitive element C12 and the 2-2 capacitive element C22. Alternatively, it would be of course possible to diagnose a failure of the force sensor 100c by comparing the above-described summation electric signal T3 with one of the first electric signal T1 and the second electric signal T2. Furthermore, the measurement sites D1 and D2 are displaced by the tilting of the tilting portion 13, making it possible to effectively amplify the tilting generated in the tilting portion 13 in the force sensor 100c. From the above, according to the present embodiment, it is possible to provide a low-cost and highly sensitive force sensor 100c capable of performing self failure diagnosis by the single force sensor 100c.

Furthermore, according to the present embodiment, the detection circuit 40 measures the applied forces Fx and Fz by the difference between the electrostatic capacitance values as expressed in [Expression 2] and [Expression 3], making it possible to provide the force sensor 100c insusceptible to the influence of a temperature change and common mode noise in the use environment.

The first measurement site D1 and the second measurement site D2 of the displacement body 20 are arranged symmetrically on the beam 21 with respect to the connection site between the connecting body 22 and the beam 21. For this reason, the displacement generated at the first measurement site D1 and the displacement generated at the second measurement site D2 are of the same magnitude and have different signs, making it possible to detect the applied force by a simple calculation.

In addition, since the detection circuit 40 detects the applied force on the basis of the first electric signal T1 or the summation electric signal T3, it is possible to detect a force superior in S/N.

<1-6. Modification>

Figure 58:
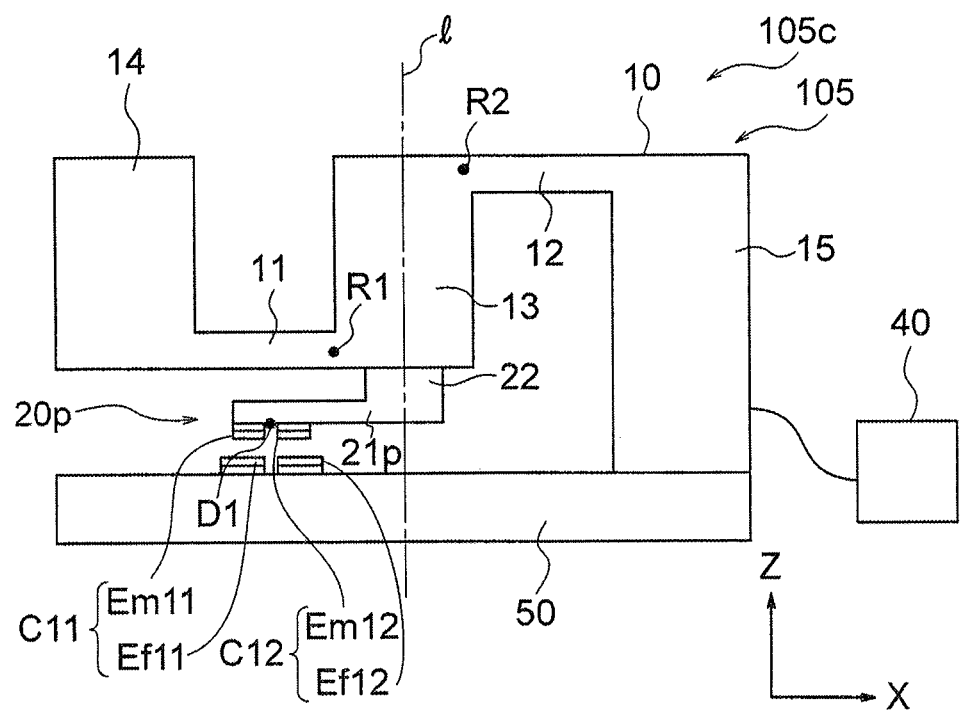
FIG. 58 is a schematic front view of a force sensor according to a modification of FIG. 7, in which the displacement body has a cantilever beam structure.

Note that while the above force sensor 100c has a configuration in which the displacement body 20 has a structure of a doubly supported beam, the displacement body 20 may have a cantilever beam structure instead. This example is illustrated in FIG. 58. FIG. 58 is a schematic front view of a force sensor 105c according to a modification of FIG. 7, in which the displacement body 20 has a cantilever beam structure. In the example illustrated in FIG. 58, a displacement body 20p has a cantilever beam structure (reference sign 21p) in which a portion of the beam 21 of the force sensor 100c on the side where the second measurement site D2 is defined is missing. Since the other configuration is the same as the force sensor 100c illustrated in FIG. 7, FIG. 58 uses the same reference signs as in FIG. 7 for the configuration common to the force sensor 100c, and a detailed description thereof will be omitted here.

With this force sensor 105c, with the setting C21=C22=0 in the above-described [Expression 2] to [Expression 4], the force applied to the force sensor 105c can be detected to further perform failure diagnosis of the force sensor 105c. Note that the force sensor 105c illustrated in FIG. 58 has a difficulty in detecting the applied forces Fx and Fz by the difference between the electrostatic capacitance values of the capacitive elements. For this reason, it is necessary to pay attention to the fact that the force sensor 105c is susceptible to the influence of a temperature change and common mode noise in the use environment.

<<<§ 2. Force Sensor According to Second Embodiment of Present Invention>>>

<2-1. Structure of Basic Structure>

Figure 10:
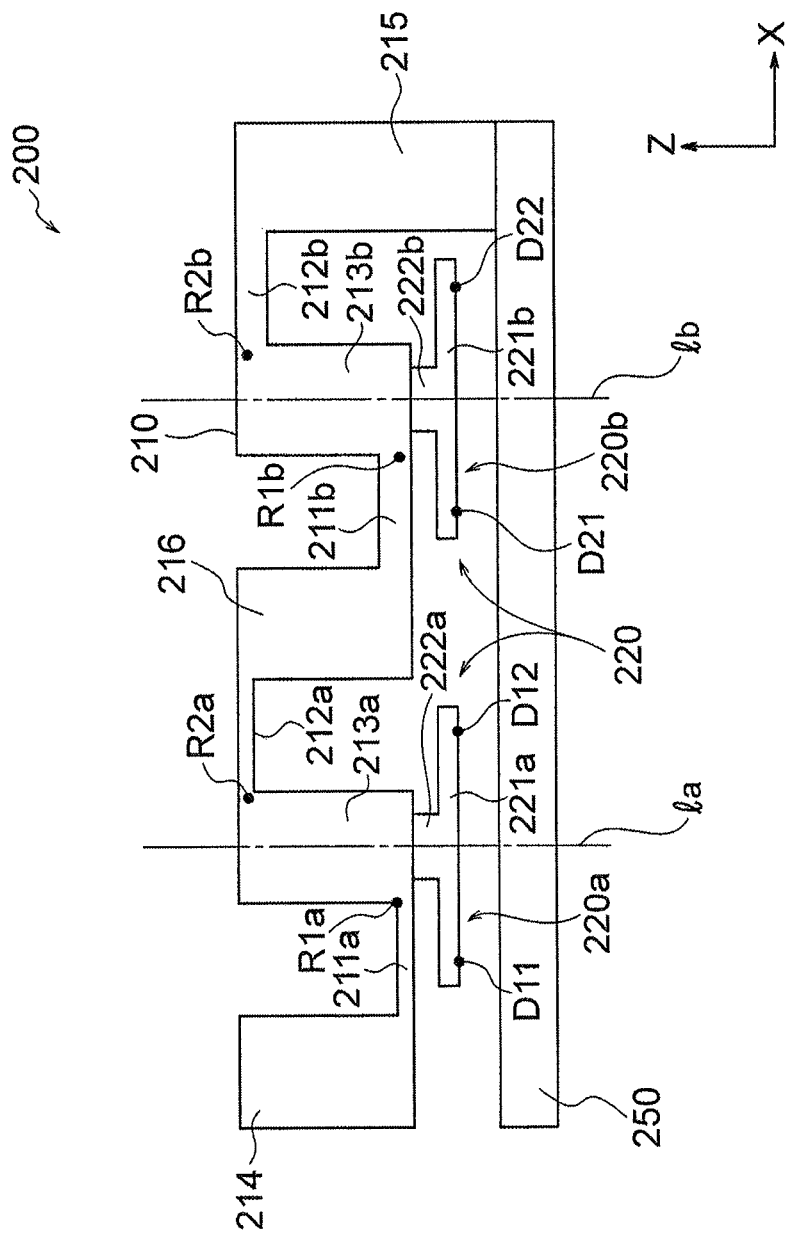
FIG. 10 is a schematic front view illustrating a basic structure of a force sensor according to a second embodiment of the present invention.

FIG. 10 is a schematic front view illustrating a basic structure 200 of a force sensor 200c according to a second embodiment of the present invention. Here again, the following description will be provided with definition of the XYZ three-dimensional coordinate system similarly to FIG. 1.

As illustrated in FIG. 10, the basic structure 200 of the present embodiment includes a deformable body 210 having a force receiving portion 214 and a fixed portion 215 and generating elastic deformation by a force applied to the force receiving portion 214. The deformable body 210 includes a first tilting portion 213a and a second tilting portion 213b having longitudinal directions Ia and Ib and sequentially arranged between the force receiving portion 214 and the fixed portion 215, from the force receiving portion 214 toward the fixed portion 215, and includes a force transmitting portion 216 arranged between the first tilting portion 213a and the second tilting portion 213b. The force receiving portion 214 and the first tilting portion 213a are connected by a 1-1 deformable portion 211a, while the force transmitting portion 216 and the first tilting portion 213a are connected by a 1-2 deformable portion 212a. Furthermore, the force transmitting portion 216 and the second tilting portion 213b are connected by a 2-1 deformable portion 211b, while the fixed portion 215 and the second tilting portion 213b are connected by a 2-2 deformable portion 212b.

Each of the deformable portions 211a and 212b extends in a direction intersecting with the longitudinal direction Ia and Ib of each of the tilting portions 213a and 213b. A connection site R1a between the 1-1 deformable portion 211a and the first tilting portion 213a is located at a position different from the position of a connection site R2a between the 1-2 deformable portion 212a and the first tilting portion 213a in the longitudinal direction Ia of the first tilting portion 213a. Furthermore, a connection site R1b between the 2-1 deformable portion 211b and the second tilting portion 213b is located at a position different from the position of a connection site R2b between the 2-2 deformable portion 212b and the second tilting portion 213b in the longitudinal direction Ib of the second tilting portion 213b.

Moreover, the deformable body 210 has a configuration in which the spring constant of the 1-1 deformable portion 211a and the 1-2 deformable portion 212a is different from the spring constant of the 2-1 deformable portion 211b and the 2-2 deformable portion 212b. In the present embodiment, as illustrated in FIG. 10, the 1-1 deformable portion 211a and the 1-2 deformable portion 212a are formed to be thinner than the 2-1 deformable portion 211b and the 2-2 deformable portion 212b. With this configuration, the spring constant of the 1-1 deformable portion 211a and the 1-2 deformable portion 212a is smaller than the spring constant of the 2-1 deformable portion 211b and the 2-2 deformable portion 212b.

As illustrated in FIG. 10, the displacement bodies 220a and 220b include a first displacement portion separated from the fixed portion 215 and displaced by the tilting of the first tilting portion 213a, and include a second displacement portion separated from the fixed portion 215 and displaced by the tilting of the second tilting portion 213b. In the present embodiment, the first displacement portion is configured as a first beam 221a extending in a direction intersecting the longitudinal direction Ia of the first tilting portion 213a, while the second displacement portion is configured as a second beam 221b extending in a direction intersecting the longitudinal direction Ib of the second tilting portion 213b. As illustrated in FIG. 10, a 1-1 measurement site D11 and a 1-2 measurement site D12 are defined on the first beam 221a, while a 2-1 measurement site D21 and a 2-2 measurement site D22 are defined on the second beam 221b.

Specifically, the first displacement body 220a includes a first connecting body 222a that connects the first tilting portion 213a of the deformable body 210 to the first beam 221a, while the second displacement body 220b includes a second connecting body 222b that connects the second tilting portion 213b of the deformable body 210 to the second beam 221b. The 1-1 measurement site D11 and the 1-2 measurement site D12 of the first beam 221a are arranged symmetrically with respect to a connection site between the first connecting body 222a and the first beam 221a. Furthermore, the 2-1 measurement site D21 and the 2-2 measurement site D22 of the second beam 221b are arranged symmetrically with respect to a connection site between the second connecting body 222b and the second beam 221b. As will be described below, displacement sensors are arranged at these measurement sites D11 to D22, and the force applied to the force receiving portion 214 is detected using this displacement sensor.

In other words, the basic structure 200 of the present embodiment has a configuration including two basic structures 100 illustrated in FIG. 1, in which the fixed portion 15 of one basic structure 100 and the force receiving portion 14 of the other basic structure 100 are arranged in series so as to overlap each other.

<2-2. Application of Basic Structure>

Next, application of the basic structure 200 illustrated in FIG. 10 will be described.

When a force Fx in the X-axis direction is applied to the force receiving portion 214, the force Fx is transmitted to the force transmitting portion 216 via the 1-1 deformable portion 211a, the first tilting portion 213a, and the 1-2 deformable portion 212a. That is, the force Fx in the X-axis direction is applied also to the force transmitting portion 216. When the force Fz in the Z-axis direction is applied to the force receiving portion 214, the force Fz is similarly transmitted to the force transmitting portion 216. That is, the force Fz in the Z-axis direction is applied also to the force transmitting portion 216.

Accordingly, the displacement in the Z-axis direction generated in the 1-1 measurement site D11 and the 2-1 measurement site D12 when the force +Fx in the positive direction on the X-axis is applied to the force receiving portion 214 has a direction same as the direction of the displacement in the Z-axis direction generated in the first measurement site D1 and the second measurement site D2 when the force +Fx in the positive direction on the X-axis is applied to the force receiving portion 14 of the first embodiment. This also holds for the displacement in the Z-axis direction generated in the 2-1 measurement site D21 and the 2-2 measurement site D22.

Note that the spring constant of the 1-1 deformable portion 211a and the 1-2 deformable portion 212a is smaller than the spring constant of the 2-1 deformable portion 211b and the 2-2 deformable portion 212b as described above, and thus, the displacement in the Z-axis direction generated in the 1-1 measurement site D11 and the 2-1 measurement site D12 is larger than the displacement in the Z-axis direction generated in the 2-1 measurement site D21 and the 2-2 measurement site D22.

Furthermore, the displacement in the Z-axis direction generated in the 1-1 measurement site D11 and the 2-1 measurement site D12 when the force −Fz in the negative direction on the Z-axis is applied to the force receiving portion 214 has a direction same as the direction of the displacement in the Z-axis direction generated in the first measurement site D1 and the second measurement site D2 when the force −Fx in the negative direction on the Z-axis is applied to the force receiving portion 14 of the first embodiment. This also holds for the displacement in the Z-axis direction generated in the 2-1 measurement site D21 and the 2-2 measurement site D22. Note that as can be observed from FIG. 10, when the force Fz in the Z-axis direction is applied to the force receiving portion 214, the first tilting portion 213a is displaced in the Z-axis direction due to flexural deformation generated in each of the 1-2 deformable portion 212a, the 2-1 deformable portion 211b and the 2-2 deformable portion 212b. In contrast, in the first embodiment, when the force Fz in the Z-axis direction is applied to the force receiving portion 14, the tilting portion 13 is displaced in the Z-axis direction by the flexural deformation generated in the second deformable portion 12 alone.

Accordingly, in the basic structure 200 according to the present embodiment, the influence of the displacement of the first tilting portion 213a in the Z-axis direction to the displacement of the 1-1 measurement site D11 and the 2-1 measurement site D12 in the Z-axis direction when the force Fz in the Z-axis direction is applied to the force receiving portion 214 is greater than in the first embodiment. Still, since the length of each of the beams 221a and 221b is assumed to be sufficiently large for the sake of simplicity, it is possible to disregard the overall displacement of the tilting portions 213a and 213b in the Z-axis direction.

Figure 11:
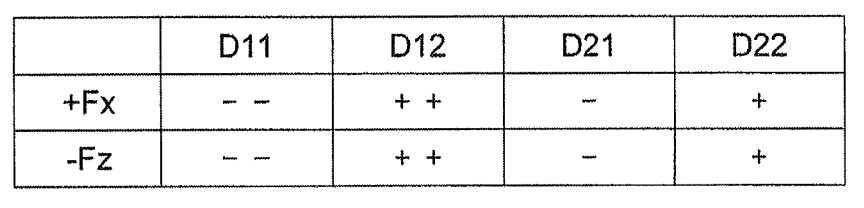

The results of the above discussion are summarized in FIG. 11. FIG. 11 is a table summarizing displacements in the Z-axis direction generated in each of the measurement sites D11 to D22 when the force +Fx in the positive direction on the X-axis and the force −Fz in the negative direction on the Z-axis are applied to the force receiving portion 214. In FIG. 11, "+" represents displacement in the positive direction on the Z-axis, and "++" represents large displacement in the positive direction on the Z-axis. Furthermore, "−" represents displacement in the negative direction on the Z-axis, and "−−" represents large displacement in the negative direction on the Z-axis. Note that in a case where the direction of the applied force is reversed, the positive and negative signs are reversed.

<2-3. Configuration of Force Sensor>

Figure 12:
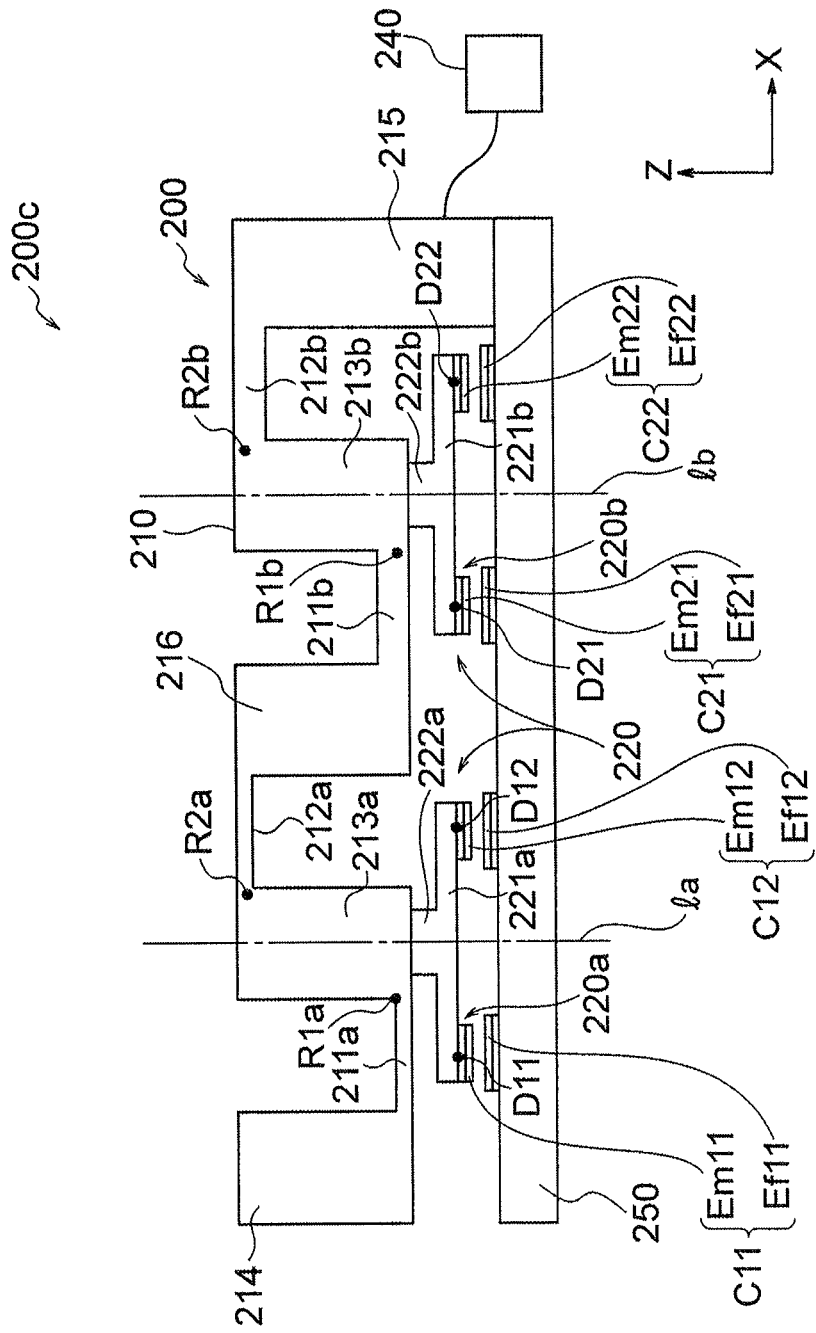
FIG. 12 is a schematic front view illustrating an example of a force sensor that adopts the basic structure illustrated in FIG. 10.
Figures 13, 14:
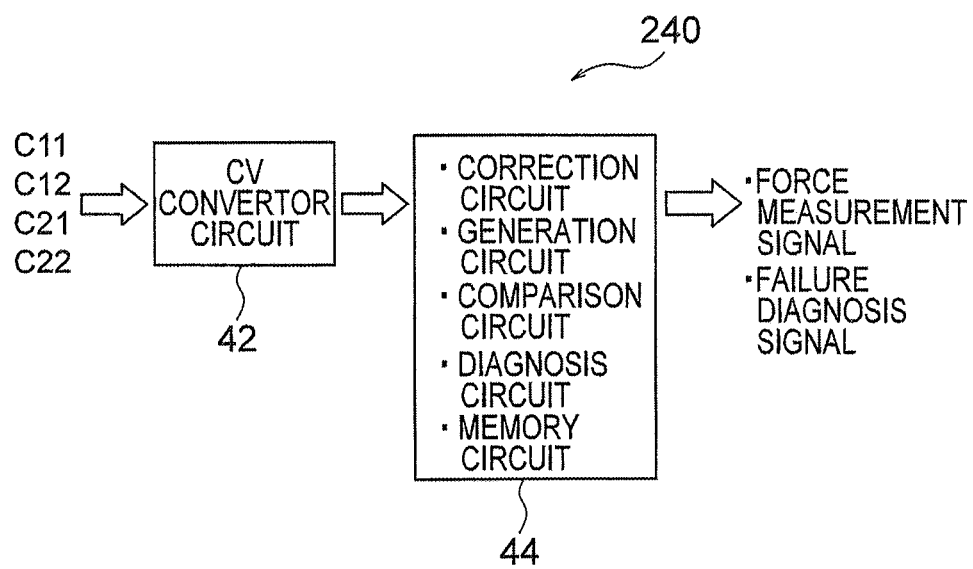
FIG. 13 is a block diagram of a detection circuit adopted in the force sensor in FIG. 12.
FIG. 14 is a table illustrating a variation of an electrostatic capacitance value of each of capacitive elements when forces +Fx and −Fz are applied to the force sensor of FIG. 12.

Next, a configuration of a force sensor 200c having the basic structure 200 described in 1-2 and 1-3 will be described. FIG. 12 is a schematic front view illustrating an example of the force sensor 200c adopting the basic structure 200 illustrated in FIG. 10. FIG. 13 is a block diagram of a detection circuit 240 adopted in the force sensor 200c in FIG. 12.

As illustrated in FIG. 12, the force sensor 200c includes the above-described basic structure 200, and the detection circuit 240 that detects an applied force on the basis of the displacement generated in each of the four measurement sites D11 to D22 defined in each of the beams 221a and 221b of the basic structure 200. As illustrated in FIG. 12, the detection circuit 240 of the present embodiment includes, as displacement sensor, the 1-1 capacitive element C11 arranged at the 1-1 measurement site D11, the 1-2 capacitive element C12 arranged at the 1-2 measurement site D12, the 2-1 capacitive element C21 arranged at the 2-1 measurement site D21, and the 2-2 capacitive element C22 arranged at the 2-2 measurement site D22.

Furthermore, as will be described below, the detection circuit 240 is connected to the capacitive elements C11 to C22, and has a function of measuring and outputting the applied force on the basis of the variation amount of the electrostatic capacitance value of the capacitive elements C11 to C22. As illustrated in the drawing, the 1-1 capacitive element C11 and the 1-2 capacitive element C12 are arranged symmetrically with respect to the connection site between the first beam 221a and the first connecting body 222a, while the 2-1 capacitive element C21 and the 2-2 capacitive element C22 are arranged symmetrically with respect to the connection site between the second beam 221b and the second connecting body 222b.

As illustrated in FIG. 12, the 1-1 capacitive element C11 includes the 1-1 displacement electrode Em11 arranged on the 1-1 measurement site D11 of the first beam 221a via an insulator, and includes the 1-1 fixed electrode Ef11 arranged on a support 250 via an insulator so as to face the 1-1 displacement electrode Em11. The 1-2 capacitive element C12 includes the 1-2 displacement electrode Em12 arranged on the 1-2 measurement site D12 of the first beam 221a via an insulator, and includes the 1-2 fixed electrode Ef12 arranged on the support 250 via an insulator so as to face the 1-2 displacement electrode Em12. Note that one of the 1-1 displacement electrode Em11 and the 1-2 displacement electrode Em12, and the 1-1 fixed electrode Ef11 and the 1-2 fixed electrode Ef12 may be formed with a common electrode.

Furthermore, as illustrated in FIG. 12, the 2-1 capacitive element C21 includes the 2-1 displacement electrode Em21 arranged on the 2-1 measurement site D21 of the second beam 221b via an insulator, and includes the 2-1 fixed electrode Ef21 arranged on the support 250 via an insulator so as to face the 2-1 displacement electrode Em21. The 2-2 capacitive element C22 includes the 2-2 displacement electrode Em22 arranged on the 2-2 measurement site D22 of the second beam 221b via an insulator, and includes the 2-2 fixed electrode Ef22 arranged on the support 250 via an insulator so as to face the 2-2 displacement electrode Em22. Note that one of the 2-1 displacement electrode Em21 and the 2-2 displacement electrode Em22, and the 2-1 fixed electrode Ef21 and the 2-2 fixed electrode Ef22 may be formed with a common electrode.

As illustrated in FIG. 13, the detection circuit 240 includes the C/V converter 42 and the microcomputer 44 similarly to the detection circuit 40 of the first embodiment. Note that the microcomputer 44 of the present embodiment is different from the one in the first embodiment in that it includes a memory circuit that stores a ratio of the first electric signal T1 (=C11−C12) that is a difference between the electrostatic capacitance values of the 1-1 capacitive element C11 and the 1-2 capacitive element C12 to the second electric signal T2 (=C21−C22) that is a difference between the electrostatic capacitance values of the capacitance values of the 2-1 capacitive element C21 and the 2-2 capacitive element C22 when force detection is performed normally, as a reference ration Rs.

Although not specifically illustrated in FIG. 12, the capacitive elements C11 to C22 are connected to the C/V converter 42 by a predetermined circuit. With the microcomputer 44 connected to the C/V converter 42, the applied force can be measured on the basis of the variation amount of the electrostatic capacitance value of each of the capacitive elements C11 to C22.

<2-4. Application of Force Sensor>

Next, FIG. 14 is a table illustrating variations of electrostatic capacitance values of the capacitive elements C11 to C22 when the forces +Fx and −Fz are applied to the force sensor 200c in FIG. 12. Variation of the electrostatic capacitance values of the capacitive elements C11 to C22 illustrated in FIG. 14 are clearly observed from the table of FIG. 11. Note that "+" represents that the electrostatic capacitance value increases, and "++" represents that the electrostatic capacitance value widely increases in FIG. 14. In addition, "−" represents that the electrostatic capacitance value decreases, and "−−" represents that the electrostatic capacitance value widely decreases.

The signs (increase or decrease) of the variation of the electrostatic capacitance value of each of the capacitive elements C11 to C22 when the forces +Fx and −Fz are applied to the force receiving portion 214 of the force sensor 200c are same as the signs of each of the capacitive elements C11 to C22 when the forces +Fx and −Fz are applied to the force receiving portion 14 of the force sensor 100c in the first embodiment (refer to FIG. 9). Of course, the similar holds for cases in which the forces −Fx and +Fz in reverse direction are applied. Accordingly, each of the forces +Fx and −Fz applied to the force sensor 200c can be calculated by the above-described [Expression 2] and [Expression 3].

In measuring the forces Fx and Fz, from the viewpoint of S/N, it is preferable to use the first electric signal T1 (refer to [Expression 4]) based on the capacitive elements C11 and C21 having a large relative variation of electrostatic capacitance values or the summation electric signal T3 (refer to [Expression 4]) based on all the capacitive elements C11 to C22.

<2-5. Failure Diagnosis>

The detection circuit 240 according to the present embodiment has a function of determining whether the force sensor 200c functions normally. Now, the function of this failure diagnosis will be described.

When the forces Fx and Fz are repeatedly applied to the force receiving portion 214 of the force sensor 200c, metal fatigue is generated in the deformable body 210. Metal fatigue remarkably emerges at the 1-1 deformable portion 211a and the 1-2 deformable portion 212a where the elastic deformation by the forces Fx and Fz is relatively large. When this metal fatigue is accumulated, the strengths of the 1-1 deformable portion 211a and the 1-2 deformable portion 212a decrease, and ultimately the deformable body 210 breaks. When metal fatigue accumulates in a metal material, the metal material would soften. Accordingly, the spring constant of each of the 1-1 deformable portion 211a and the 1-2 deformable portion 212a decreases. That is, in the deformable body 210 of the present embodiment, metal fatigue accumulated in the 1-1 deformable portion 211a and the 1-2 deformable portion 212a leads to a great deformation in the deformable portions 211a and 212a are deformed largely by the forces Fx and Fz. Accordingly, the sensitivity of the first electric signal T1 provided by the 1-1 capacitive element C11 and the 1-2 capacitive element C12 affected by the 1-1 deformable portion 211a and the 1-2 deformable portion 212a is increased.

Of course, metal fatigue also emerges in the 2-1 deformable portion 211b and the 2-2 deformable portion 212b. It is, however, conceivable that, due to the difference between the spring constant of the 1-1 deformable portion 211a/1-2 deformable portion 212a and the spring constant of the 2-1 deformable portion 211b/2-2 deformable portion 212b, the metal fatigue generated in the 2-1 deformable portion 211b/2-2 deformable portion 212b is smaller than metal fatigue generated in the 1-1 deformable portion 211a/1-2 deformable portion 212a.

Figure 15:
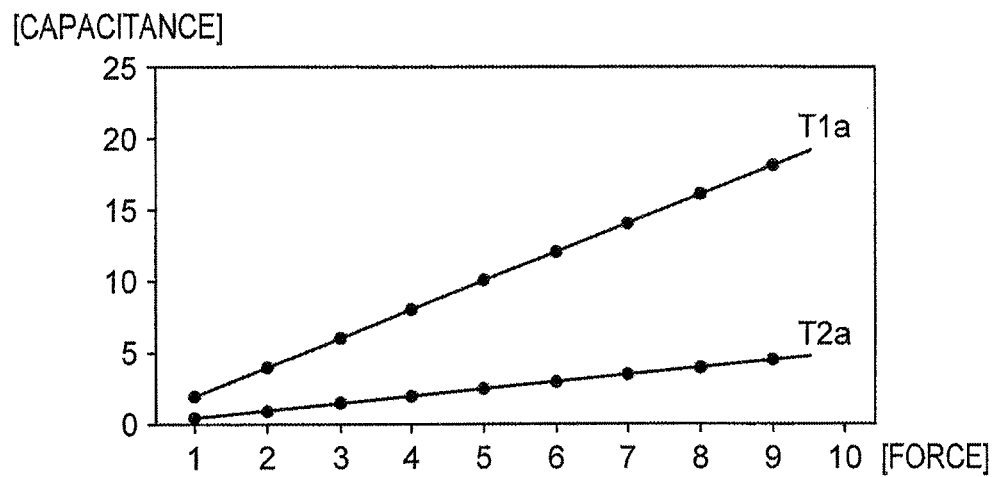
FIG. 15 is a graph illustrating a relationship between the force +Fx in the positive direction on the X-axis applied to the force receiving portion and electric signals T1 and T2 when metal fatigue is not generated in the deformable body of the force sensor of FIG. 12.

Here, FIG. 15 is a graph illustrating a relationship between the force +Fx in the positive direction on the X-axis applied to the force receiving portion 214 and the electric signals T1 and T2 when metal fatigue is not generated in the deformable body 210 of the force sensor 200c in FIG. 12. In FIG. 15, a sign T1a indicates a graph of the first electric signal T1, and a sign T2a indicates a graph of the second electric signal T2. Accordingly, in each of figures, the gradient of the straight line illustrating each of the electric signals T1a and T2a indicates the detection sensitivity of the force sensor 200c. The difference in each of the gradients (sensitivities) of the graph is attributed to the difference between the spring constant of the 1-1 deformable portion 211a/1-2 deformable portion 212a and the spring constant of the 2-1 deformable portion 211b/2-2 deformable portion 212b.

As illustrated in FIG. 15, when metal fatigue is not generated in the deformable body 210 of the force sensor 200c, the first electric signal T1 and the second electric signal T2 are proportional to the force +Fx. A gradient m1a of the graph illustrating the first electric signal T1 is two and a gradient m2a of the graph illustrating the second electric signal T2 is 0.5. That is, the gradient ratio (m1a/m2a) is four. This value is the reference ratio Rs (=T1a/T2a).

Figure 16:
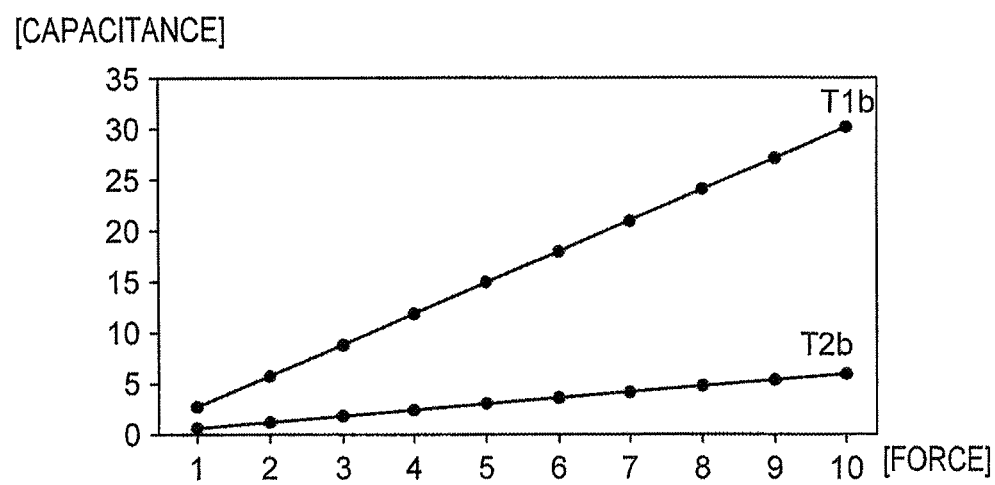
FIG. 16 is a graph illustrating a relationship between the force +Fx in the positive direction on the X-axis applied to the force receiving portion and electric signals T1 and T2 when metal fatigue is generated in the deformable body of the force sensor of FIG. 12.

Next, FIG. 16 is a graph illustrating a relationship between the force +Fx in the positive direction on the X-axis applied to the force receiving portion 214 and the electric signals T1 and T2 when metal fatigue is generated in the deformable body 210 of the force sensor 200c in FIG. 12. In FIG. 16, a sign T1b indicates a graph of the first electric signal T1, and a sign T2b indicates a graph of the second electric signal T2.

As illustrated in FIG. 16, when metal fatigue is generated in the deformable body 210 of the force sensor 200c, the gradient m1b of the graph illustrating the first electric signal T1 increases to three (sensitivity increased by 50%), while the gradient m2b of the graph illustrating the second electric signal T2 increases to 0.6 (sensitivity increased by 20%). Accordingly, the metal fatigue generated in each of the 2-1 deformable portion 211b and the 2-2 deformable portion 212b is surely smaller than the case of the 1-1 deformable portion 211a and the 1-2 deformable portion 212a. In FIG. 16, the ratio (m1b/m2b) of the gradient of each of the graphs is five.

Note here that the degree of emergence of metal fatigue is different between the case of the 1-1 deformable portion 211a and the 1-2 deformable portion 212a and the case of the 2-1 deformable portion 211b and the 2-2 deformable portion 212b. That is, the ratio of the first electric signal T1a to the second electric signal T2a (T1a/T2a=reference ratio Rs) is four before emergence of metal fatigue, while the ratio of the first electric signal T1b to the second electric signal T2*b* (T1*b*/T2*b*) increases to five after emergence of metal fatigue. In the present embodiment, the failure diagnosis of the force sensor 200*c* is performed utilizing this difference.

In other words, characteristics of accumulation and emergence of metal fatigue are different between the case of the 1-1 deformable portion 211*a* and the 1-2 deformable portion 212*a* and the case of the 2-1 deformable portion 211*b* and the 2-2 deformable portion 212*b*, leading to a gradual change in the ratio of the first electric signal T1 to the second electric signal T2 with repetitive load. Then, when repeated load is further applied to the force sensor 200*c*, the deformable body 210 would ultimately break at either of the 1-1 deformable portion 211*a* and the 1-2 deformable portion 212*a*, leading to a failure in appropriate force detection.

From the above description, it is possible to determine whether the force sensor 200*c* functions normally by performing measurement of the forces Fx and Fz using the second electric signal T2 associated with the deformable portions 211*b* and 212*b* having relatively large spring constants, and by evaluating whether the difference between the ratio of the first electric signal T1 to the second electric signal T2 at the measurement and the ratio of the first electric signal T1*a* to the second electric signal T2*a* in the initial state in which metal fatigue has not emerged is within a predetermined range. Of course, the forces Fx and Fz may be measured on the basis of the first electric signal T1. In this case, since the capacitive elements C11 and C12 that supply the first electric signal T1 are respectively associated with the deformable portions 211*a* and 212*a* having relatively small spring constants, it is possible to perform force measurement with high sensitivity to the applied forces Fx and Fz and excellent S/N. Alternatively, the applied forces Fx and Fz may be measured by the sum of the first electric signal T1 and the second electric signal T2.

A procedure for performing failure diagnosis is as follows. That is, the comparison circuit of the microcomputer 44 compares the ratio of the first electric signal T1*a* to the second electric signal T2*a* (T1*a*/T2*a*) in the initial state stored in the memory circuit, with the ratio of the current first electric signal T1 to the current second electric signal T2. The comparison result is supplied to the diagnosis circuit of the microcomputer 44. The diagnosis circuit determines whether the provided comparison result is within a predetermined range. When the difference between the ratio of the initial state (T1*a*/T2*a*) and the current ratio (T1/T2) is within the predetermined range as a result of the diagnosis, the microcomputer 44 determines that the force sensor 200*c* functions normally and outputs the values of the measured forces Fx and Fz. In contrast, when the difference is not within the predetermined range, the microcomputer 44 determines that the force sensor 200*c* is not functioning normally (failed), and outputs a failure diagnosis signal.

According to the present embodiment as described above, the failure diagnosis of the force sensor 200*c* is performed on the basis of the change in the ratio of the first electric signal T1 based on the variation amount of the electrostatic capacitance value of the 1-1 capacitive element C11 and the 2-1 capacitive element C21 to the second electric signal T2 based on the variation amount of the electrostatic capacitance value of the 1-2 capacitive element C12 and the 2-2 capacitive element C22. This failure diagnosis can diagnose a failure of the force sensor 200*c* due to metal fatigue generated in the deformable body 210 in addition to abnormality generated in the electrodes of the capacitive elements C11 to C22. Furthermore, the measurement sites D11 to D22 are displaced by the tilting of the tilting portions 213*a* and 213*b*, making it possible to effectively amplify the tilting generated in the tilting portions 213*a* and 213*b* in the force sensor 200*c*. That is, according to the present embodiment, it is possible to provide a low-cost and highly sensitive force sensor 200*c* capable of performing self failure diagnosis by the single force sensor 200*c*.

Moreover, also in the present embodiment, the detection circuit 240 measures the applied forces Fx and Fz by the difference between the electrostatic capacitance values, making it possible to provide the force sensor 200*c* insusceptible to the influence of a temperature change and common mode noise in the use environment.

In addition, the 1-1 measurement site D11 and the 1-2 measurement site D12 of the displacement body 20 are arranged at the first beam 221*a* symmetrically with respect to the connection site between the first connecting body 222*a* and the first beam 221*a*, while the 2-1 measurement site D21 and the 2-2 measurement site D22 are arranged at the second beam 221*b* symmetrically with respect to the connection site between the second connecting body 222*b* and the second beam 221*b*. With this symmetrical arrangement, the applied force can be detected by a simple calculation.

<2.6. Modification>

Figure 59:
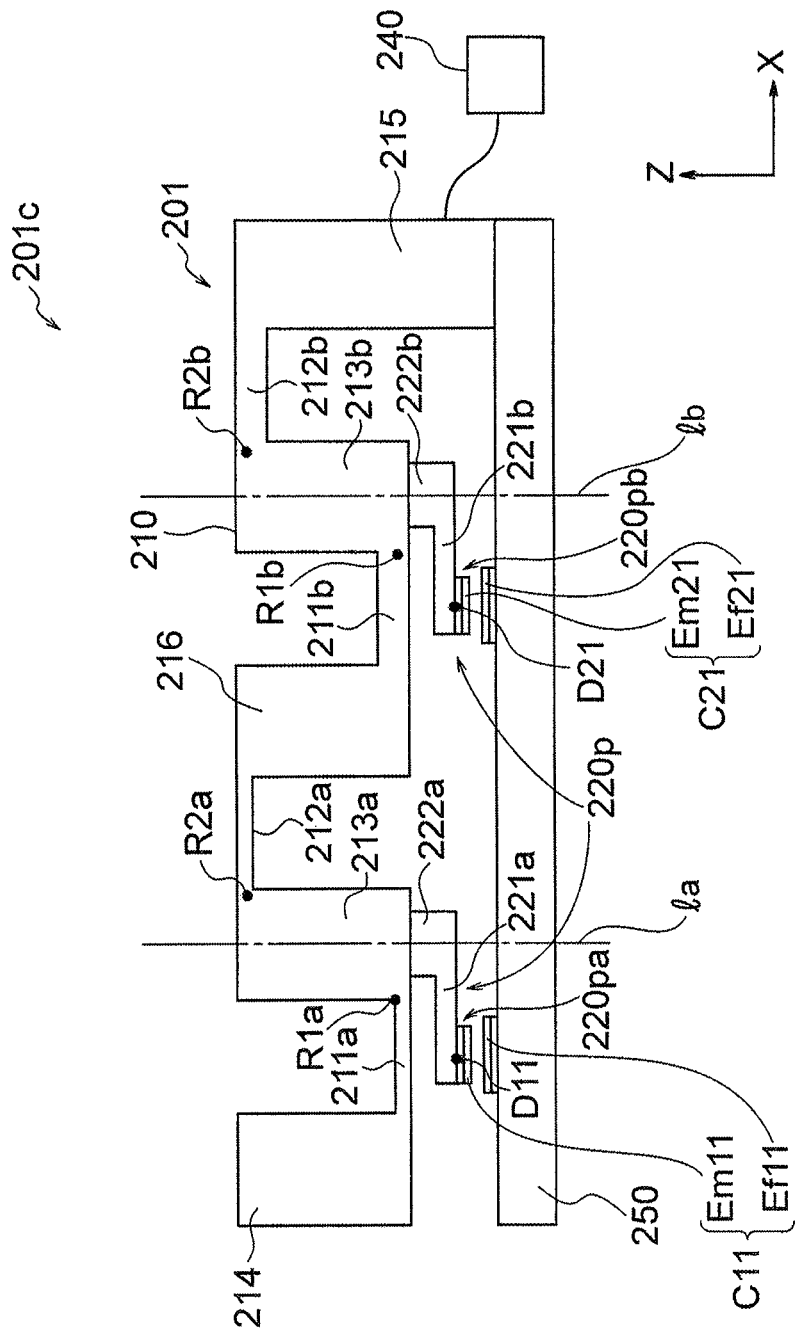
FIG. 59 is a schematic front view of a force sensor according to a modification of FIG. 12, in which the displacement body has a cantilever beam structure.

Note that while the above force sensor 200*c* has a configuration in which the displacement body 220 has a structure of a doubly supported beam, the displacement body 220 may have a cantilever beam structure instead. This example is illustrated in FIG. 59. FIG. 59 is a schematic front view of a force sensor 201*c* according to a modification of FIG. 12, in which the displacement body 220 has a cantilever beam structure. In the example illustrated in FIG. 59, a first displacement body 220*pa* has a cantilever beam structure (reference sign 221*pa*) in which a portion of the first beam 221*a* of the force sensor 200*c* on the side where the 1-2 measurement site D12 is defined is missing. Furthermore, a second displacement body 220*pb* has a cantilever beam structure (reference sign 221*pb*) in which a portion of the second beam 221*b* of the force sensor 200*c* on the side where the 2-2 measurement site D22 is defined is missing. Since the other configuration is the same as the force sensor 200*c* illustrated in FIG. 12, FIG. 59 uses the same reference signs as in FIG. 12 for the configuration common to the force sensor 200*c*, and a detailed description thereof will be, omitted here.

With this force sensor 201*c*, with the setting C21=C22=0 in the above-described [Expression 2] to [Expression 4], the force applied to the force sensor 201*c* can be detected to further perform failure diagnosis of the force sensor 201*c* on the basis of description of 2-4. and 2-5. Note that the force sensor 201*c* illustrated in FIG. 59 has a difficulty in detecting the applied forces Fx and Fz by the difference between the electrostatic capacitance values of the capacitive elements. For this reason, it is necessary to pay attention to the fact that the force sensor 201*c* is susceptible to the influence of a temperature change and common mode noise in the use environment.

<<<§ 3. Force Sensor According to Third Embodiment of Present Invention>>>

Next, a force sensor 300*c* according to a third embodiment of the present invention will be described.

<3-1. Structure of Basic Structure>

Figure 17:
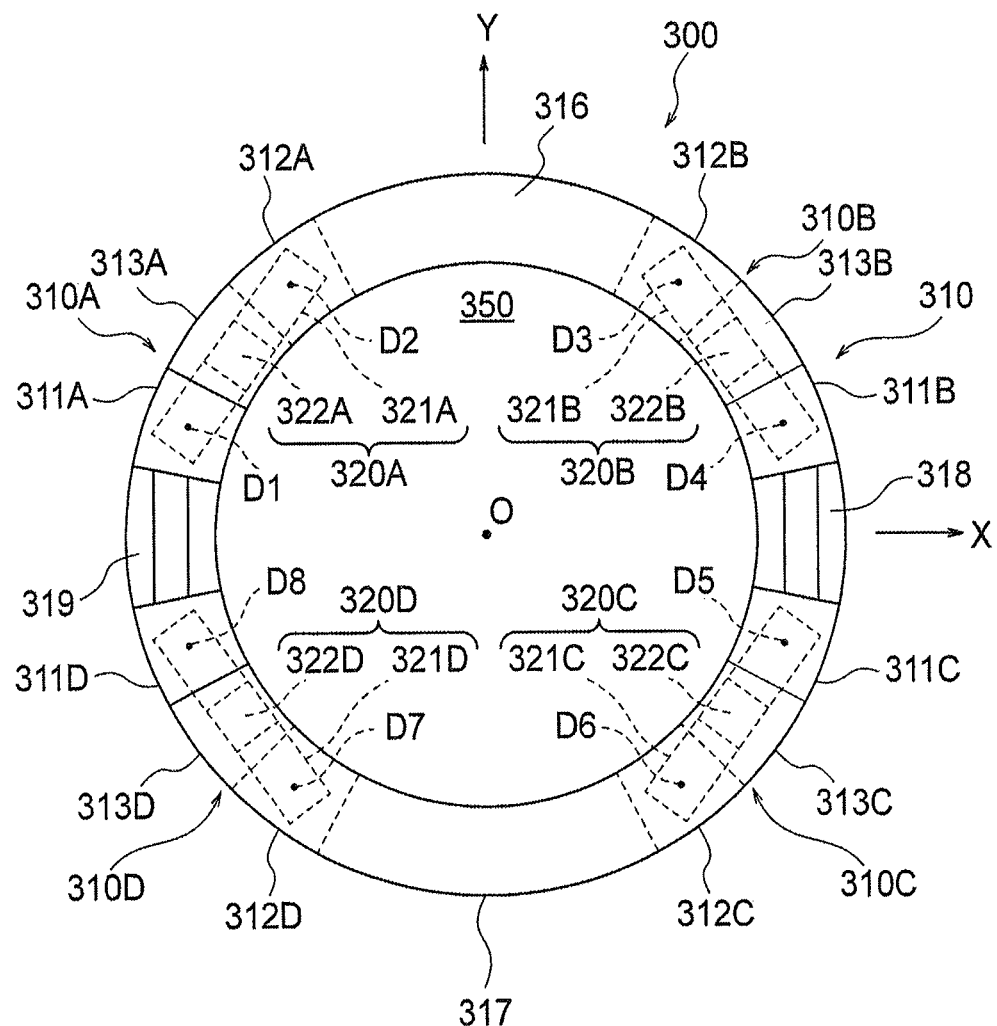
FIG. 17 is a schematic top view illustrating a basic structure of a force sensor according to a third embodiment of the present invention.
Figure 18:
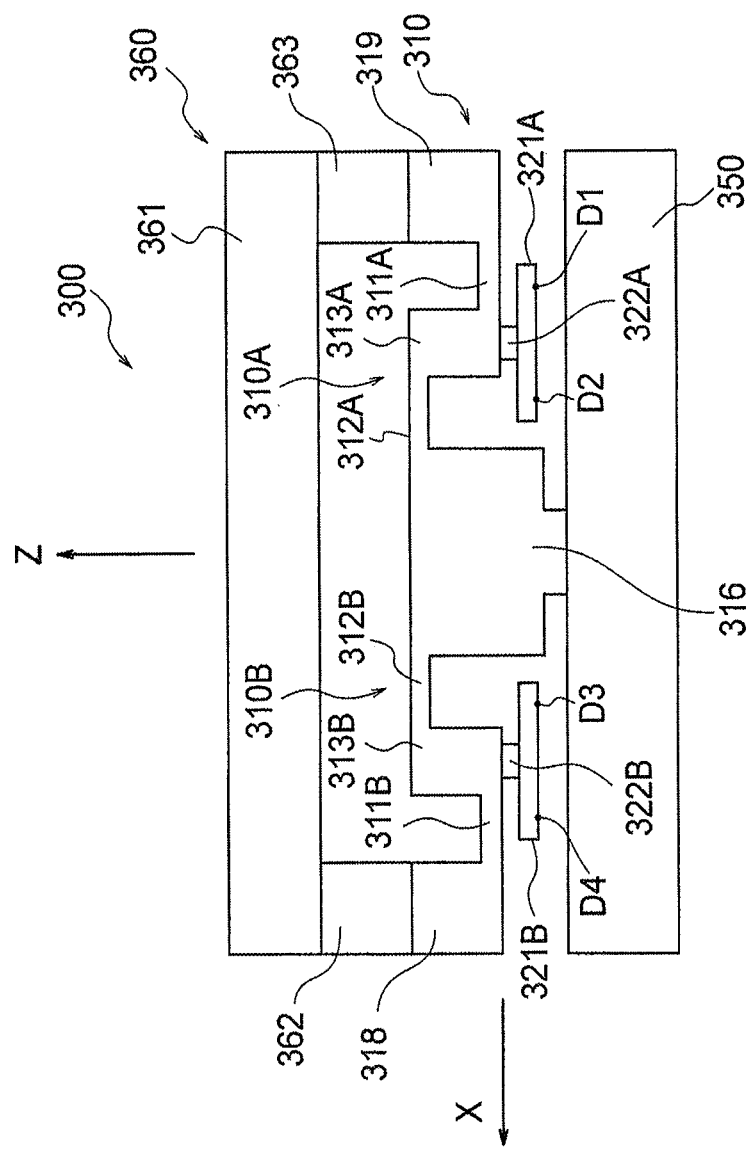
FIG. 18 is a schematic front view illustrating a basic structure viewed from the positive side on the Y-axis in FIG. 17.
Figure 19:
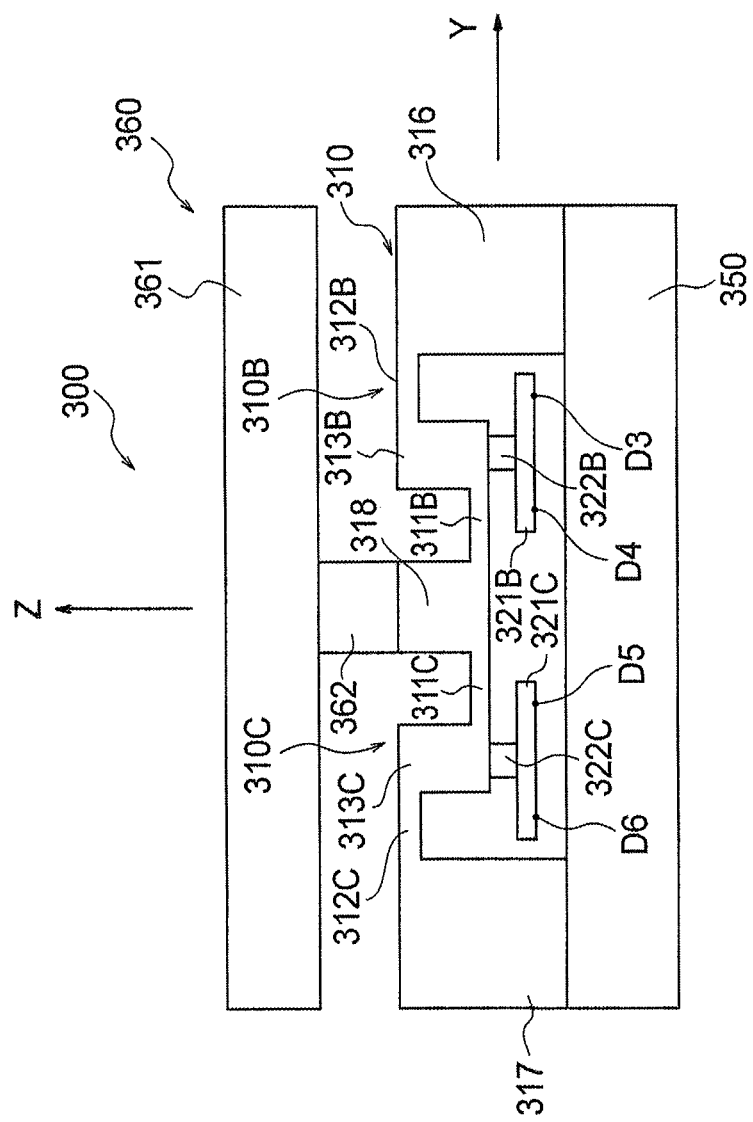
FIG. 19 is a schematic front view illustrating a basic structure viewed from the positive side on the X-axis in FIG. 17.

FIG. 17 is a schematic top view illustrating a basic structure 300 of the force sensor 300*c* according to the third embodiment of the present invention. FIG. 18 is a schematic front view illustrating the basic structure 300 viewed from the positive side on the Y-axis in FIG. 17. FIG. 19 is a schematic side view illustrating the basic structure 300 viewed from the positive side on the X-axis in FIG. 17. Herein, the following description will be provided with definition of an XYZ three-dimensional coordinate system as illustrated in FIGS. 17 to 19. In FIG. 17, for the sake of convenience of description, illustration of a force receiving body 360 is omitted.

As illustrated in FIGS. 17 to 19, the basic structure 300 is a closed loop shaped deformable body, including: two force receiving portions 318 and 319; two fixed portions 316 and 317 arranged alternately with the two force receiving portions 318 and 319 along a closed loop path; and one of the four deformable elements 310A to 310D are arranged at each of the four gaps, the four gaps being sandwiched between the force receiving portions 318 and 319 and the fixed portions 316 and 317 adjacent to each other along the closed loop shaped path, and configured to generate elastic deformation by one of a force and a moment applied to the force receiving portions 318 and 319. The basic structure 300 further includes four displacement bodies 320A to 320D connected to the deformable elements 310A to 310D and configured to generate displacement by elastic deformation generated in the deformable elements 310A to 310D.

In the present embodiment, as illustrated in FIG. 17, the one force receiving portion 318 is arranged on the positive X-axis and the other force receiving portion 319 is arranged on the negative X-axis, symmetrically with respect to an origin O. In addition, the one fixed portion 316 is arranged on the positive Y-axis and the other fixed portion 317 is arranged on the negative Y-axis, symmetrically with respect to the origin O. In the present embodiment, the closed loop shaped deformable body including the force receiving portions 318 and 319 and the fixed portions 316 and 317 is configured as a circular annular deformable body 310 about the origin O as a center.

As illustrated in FIGS. 17 to 19, the first deformable element 310A arranged in the second quadrant of the XY plane when viewed in the Z-axis direction is arcuately arranged between the force receiving portion 319 arranged on the negative side on the X-axis and the fixed portion 316 arranged on the positive side on the Y-axis. The first deformable element 310A includes: a first tilting portion 313A defining the Z-axis direction (depth direction in FIG. 17) as the longitudinal direction, a 1-1 deformable portion 311A that connects the force receiving portion 319 with the first tilting portion 313A; and a 1-2 deformable portion 312A that connects the fixed portion 316 with the first tilting portion 313A. As illustrated in FIG. 18, the 1-1 deformable portion 311A extends in parallel with the XY plane, so as to be connected to the first tilting portion 313A at an end portion (lower end) of the first tilting portion 313A on the negative side on the Z-axis. The 1-2 deformable portion 312A extends in parallel with the XY plane, so as to be connected to the first tilting portion 313A at an end portion (upper end) of the first tilting portion 313A on the positive side on the Z-axis.

The second deformable element 310B arranged in the first quadrant of the XY plane when viewed in the Z-axis direction is arcuately arranged between the force receiving portion 318 arranged on the positive side on the X-axis and the fixed portion 316 arranged on the positive side on the Y-axis.

The second deformable element 310B includes: a second tilting portion 313B defining the Z-axis direction (depth direction in FIG. 17) as the longitudinal direction, a 2-1 deformable portion 311B that connects the force receiving portion 318 with the second tilting portion 313B; and a 2-2 deformable portion 312B that connects the fixed portion 316 with the second tilting portion 313B. As illustrated in FIG. 18, the 2-1 deformable portion 311B extends in parallel with the XY plane, so as to be connected to the second tilting portion 313B at an end portion (lower end) of the second tilting portion 313B on the negative side on the Z-axis. The 2-2 deformable portion 312B extends in parallel with the XY plane, so as to be connected to the second tilting portion 313B at an end portion (upper end) of the second tilting portion 313B on the positive side on the Z-axis.

Furthermore, although not illustrated in detail, the fourth deformable element 310D and the third deformable element 310C respectively arranged in the third quadrant and the fourth quadrant of the XY plane correspond to the configuration of the second deformable element 310B and the first deformable element 310A described above when a portion on the positive side on the Y-axis (upper half of the annular deformable body 310 in FIG. 17) of the annular deformable body 310 is rotated 180° about the origin. Therefore, a detailed description thereof will be omitted here. In FIG. 17 to FIG. 19, "C" is attached at the end of the sign for the component of the third deformable element 310C, while "D" is attached at the end of the sign for the component of the fourth deformable element 310D.

Furthermore, each of the lower end portions of the individual fixed portions 316 and 317 of the basic structure 300 is connected to a support 350 arranged to face each of first to fourth beams 321A to 321D described below at a predetermined interval.

As illustrated in FIGS. 17 to 19, each of the four displacement bodies 320A to 320D is connected to a lower end (end portion on the negative side on the Z-axis) of each of the tilting portions 313A to 313D of the first to fourth deformable elements 310A to 310D, one for each of the positions. The displacement bodies 320A to 320D include displacement portions to be displaced by the tilting of the corresponding tilting portions 313A to 313D, respectively. As illustrated in FIGS. 17 to 19, the displacement portions are the first to fourth beams 321A to 321D respectively attached to the lower ends of the individual tilting portions 313A to 313D via the connecting bodies 322A to 322D.

These beams 321A to 322D extend in a direction orthogonal to the longitudinal direction (Z-axis direction) of the corresponding tilting portions 313A to 313D, and all of them has a symmetrical shape when viewed in the radial direction of the annular deformable body 310. All of the beams 321A to 322D is separated from the fixed portions 316 and 317 and the force receiving portions 318 and 319, so as to avoid disturbing the tilting (pivoting) of the beams 321A to 322D. In the first beam 321A, the first measurement site D1 and the second measurement site D2 are defined symmetrically with respect to the connection site between the first beam 321A and the first connecting body 322A. Similarly, in the second beam 321B, a third measurement site D3 and a fourth measurement site D4 are defined symmetrically with respect to the connection site between the second beam 321B and the second connecting body 322B. In the third beam 321C, a fifth measurement site D5 and a sixth measurement site D6 are defined symmetrically with respect to the connection site between the third beam 321C and the third connecting body 322C. In the fourth beam 321D, a seventh measurement site D7 and an eighth measurement site D8 are defined symmetrically with respect to the connection site between the fourth beam 321D and the fourth connecting body 322D. As will be described below, the capacitive elements are arranged at the first to eighth measurement sites D1 to D8, two for each of the sites, so as to detect the force and moment applied to the force receiving portions 318 and 319. Eventually, the basic structure 300 has a configuration in which four basic structures 100 described in § 1 are arranged in an annular shape, as the first to fourth deformable elements 310A to 310D.

Furthermore, as illustrated in FIGS. 18 and 19, a force receiving body 360 for receiving a force to be detected is arranged on the positive side on the Z-axis of the annular deformable body 310. The force receiving body 360 includes a force receiving body main body 361 having an annular shape overlapping with the annular deformable body 310 when viewed in the Z axial direction, and includes force receiving portion connecting bodies 362 and 363 provided at a site facing the force receiving portions 318 and 319 of the annular deformable body 310, among the force receiving body main body 361. These force receiving portion connecting bodies 362 and 363 are connected to the corresponding force receiving portions 318 and 319, leading to transmission of the force and moment applied to the force receiving body main body 361 to the individual force receiving portions 318 and 319.

<3-2. Application of Basic Structure>

Next, application of the basic structure 300 described above will be described.

(3-2-1. Case where Force +Fx is Applied)

Figure 20:
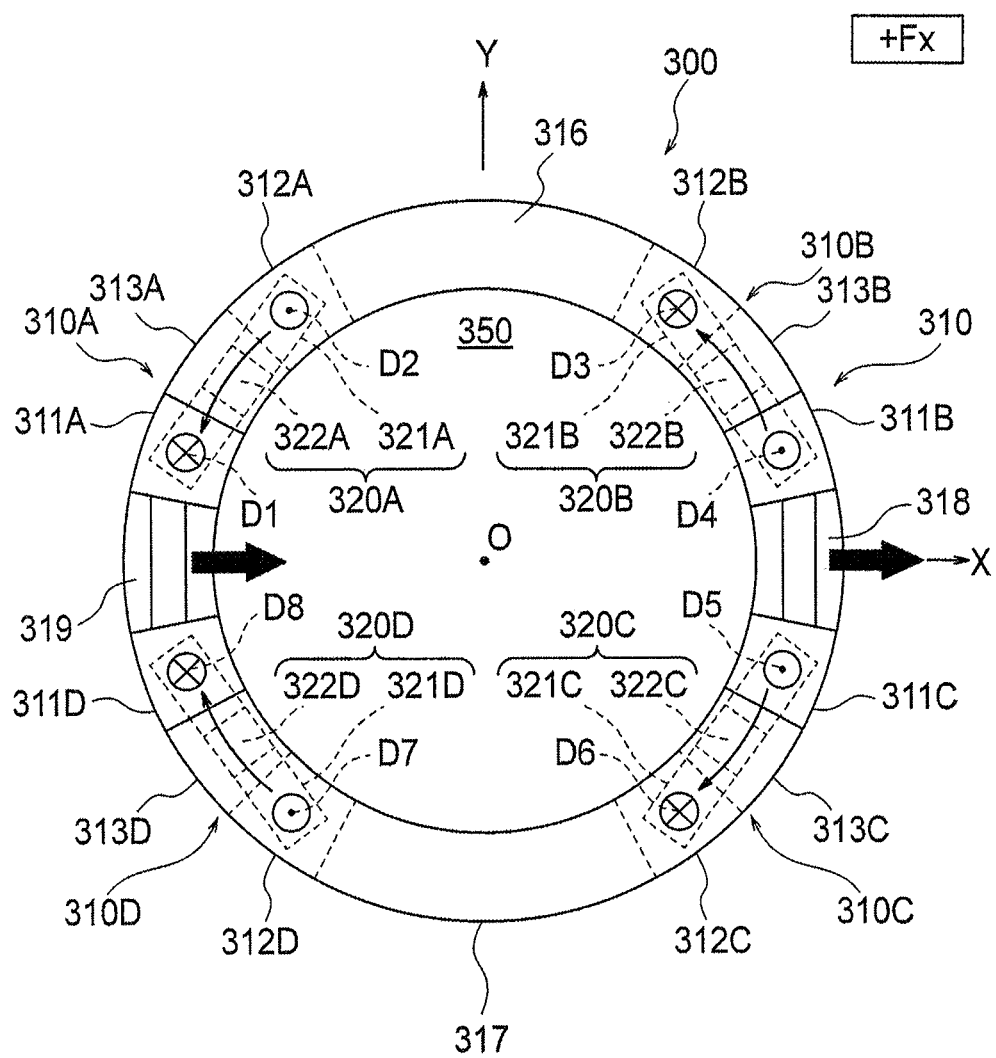
FIG. 20 is a diagram for illustrating the displacement generated at each of displacement bodies of the basic structure illustrated in FIG. 17 when the force +Fx in the positive direction on the X-axis is applied to the force receiving portion.

FIG. 20 is a diagram for illustrating the displacement generated at each of the displacement bodies 320A to 320D of the basic structure 300 illustrated in FIG. 17 when the force +Fx in the positive direction on the X-axis is applied to the force receiving portions 318 and 319. In FIG. 20, the forces applied to the force receiving portions 318 and 319 are indicated by thick solid arrows. Moreover, when a force is applied, the tilting generated in the tilting portions 313A to 313D of the deformable elements 310A to 310D is indicated by arcuate thin arrows. The arrow represents the direction of tilting (clockwise or counterclockwise) of each of the tilting portions 313A to 313D when observed from the origin O. Furthermore, the displacement in the Z-axis direction generated at each of the measurement sites D1 to D8 of the beams 321A to 321D of the displacement bodies 320A to 320D by the tilting of the tilting portions 313A to 313D is represented by a symbol of a circled dot and a symbol of a circled x. The symbol of a circled dot indicates a displacement from the back side to the front side (displacement in the positive direction on the Z-axis), while the symbol of a circled x indicates a displacement from the front side to the back side (displacement in the negative direction on the Z-axis). Note that such a representation method is common to each of the embodiments described below. Note that the forces applied to the force receiving portions 318 and 319 are indicated by the symbol of the circled dot and the symbol of the circled x depending on the orientation. These symbols have the same meanings described above.

When a force +Fx in the positive direction on the X-axis is applied to the force receiving portions 318 and 319 via the force receiving body 360, the force receiving portions 318 and 319 are displaced in the positive direction on the X-axis as illustrated in FIG. 20. As a result, the first deformable element 310A receives application of a compressive force as illustrated in FIG. 3. In this case, since the first tilting portion 313A tilts counterclockwise, the first beam 321A also tilts counterclockwise. As a result, the first measurement site D1 is displaced in the negative direction on the Z-axis, and the second measurement site D2 is displaced in the positive direction on the Z-axis.

The second deformable element 310B receives application of a tensile force as illustrated in FIG. 4 by displacement of the force receiving portion 318 in the positive direction on the X-axis. In this case, since the second tilting portion 313B tilts counterclockwise, the second beam 321B also tilts counterclockwise. As a result, the third measurement site D3 is displaced in the negative direction on the Z-axis, and the fourth measurement site D4 is displaced in the positive direction on the Z-axis.

The third deformable element 310C receives application of a tensile force as illustrated in FIG. 4 by displacement of the force receiving portion 318 in the positive direction on the X-axis. In this case, since the third tilting portion 313C tilts clockwise, the third beam 321C also tilts clockwise. As a result, the fifth measurement site D5 is displaced in the positive direction on the Z-axis, and the sixth measurement site D6 is displaced in the negative direction on the Z-axis.

Furthermore, the fourth deformable element 310D receives application of a compressive force as illustrated in FIG. 3 by displacement of the force receiving portion 319 in the positive direction on the X-axis. In this case, since the fourth tilting portion 313D tilts clockwise, the fourth beam 321D also tilts clockwise. As a result, the seventh measurement site D7 is displaced in the positive direction on the Z-axis and the eighth measurement site D8 is displaced in the negative direction on the Z-axis.

Figure 21:
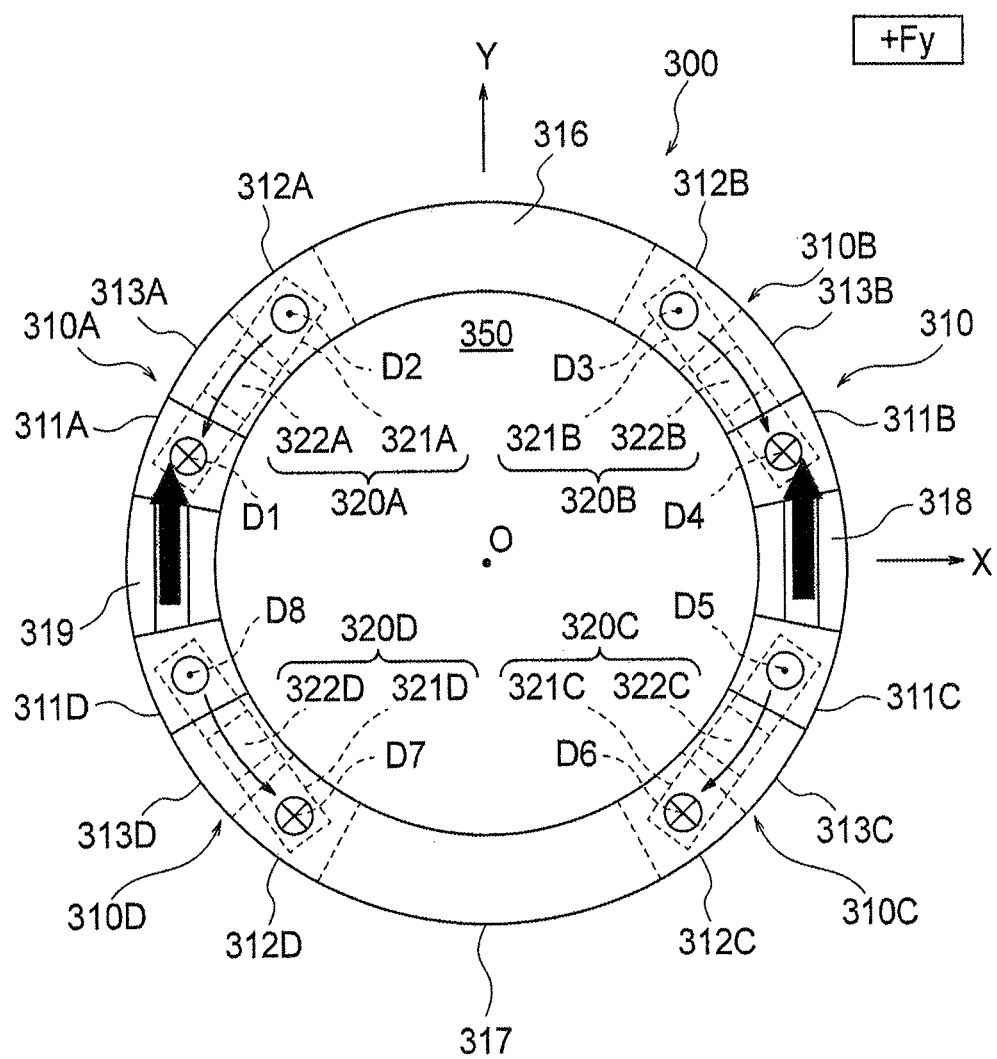
FIG. 21 is a diagram for illustrating the displacement generated at each of displacement bodies of the basic structure illustrated in FIG. 17 when the force +Fy in the positive direction on the Y-axis is applied to the force receiving portion.

(3-2-2. Case where Force +Fy is Applied),

Next, FIG. 21 is a diagram for illustrating the displacement generated at each of the displacement bodies 320A to 320D of the basic structure 300 illustrated in FIG. 17 when the force +Fy in the positive direction on the Y-axis is applied to the force receiving portions 318 and 319.

When a force +Fy in the positive direction on the Y-axis is applied to the force receiving portions 318 and 319 via the force receiving body 360, the force receiving portions 318 and 319 are displaced in the positive direction on the Y-axis as illustrated in FIG. 21. As a result, the first deformable element 310A receives application of a compressive force as illustrated in FIG. 3. In this case, as described above, since the first tilting portion 313A and the first beam 321A tilt counterclockwise, the first measurement site D1 is displaced in the negative direction on the Z-axis, the second measurement site D2 is displaced in the positive direction on the Z-axis.

The second deformable element 310B receives application of a compressive force as illustrated in FIG. 3 by displacement of the force receiving portion 318 in the positive direction on the Y-axis. In this case, since the second tilting portion 313B and the second beam 321B tilt clockwise, the third measurement site D3 is displaced in the positive direction on the Z-axis and the fourth measurement site D4 is displaced in the negative direction on the Z-axis.

The third deformable element 310C receives application of a tensile force as illustrated in FIG. 4 by displacement of the force receiving portion 318 in the positive direction on the Y-axis. In this case, since the third tilting portion 313C and the third beam 321C tilt clockwise, the fifth measurement site D5 is displaced in the positive direction on the Z-axis and the sixth measurement site D6 is displaced in the negative direction on the Z-axis.

The fourth deformable element 310D receives application of a tensile force as illustrated in FIG. 4 by displacement of the force receiving portion 319 in the positive direction on the Y-axis. In this case, since the fourth tilting portion 313D and the fourth beam 321D tilt counterclockwise, the seventh measurement site D7 is displaced in the negative direction on the Z-axis and the eighth measurement site D8 is displaced in the positive direction on the Z-axis.

(3-2-3. Case where Force +Fz is Applied)

Figure 22:
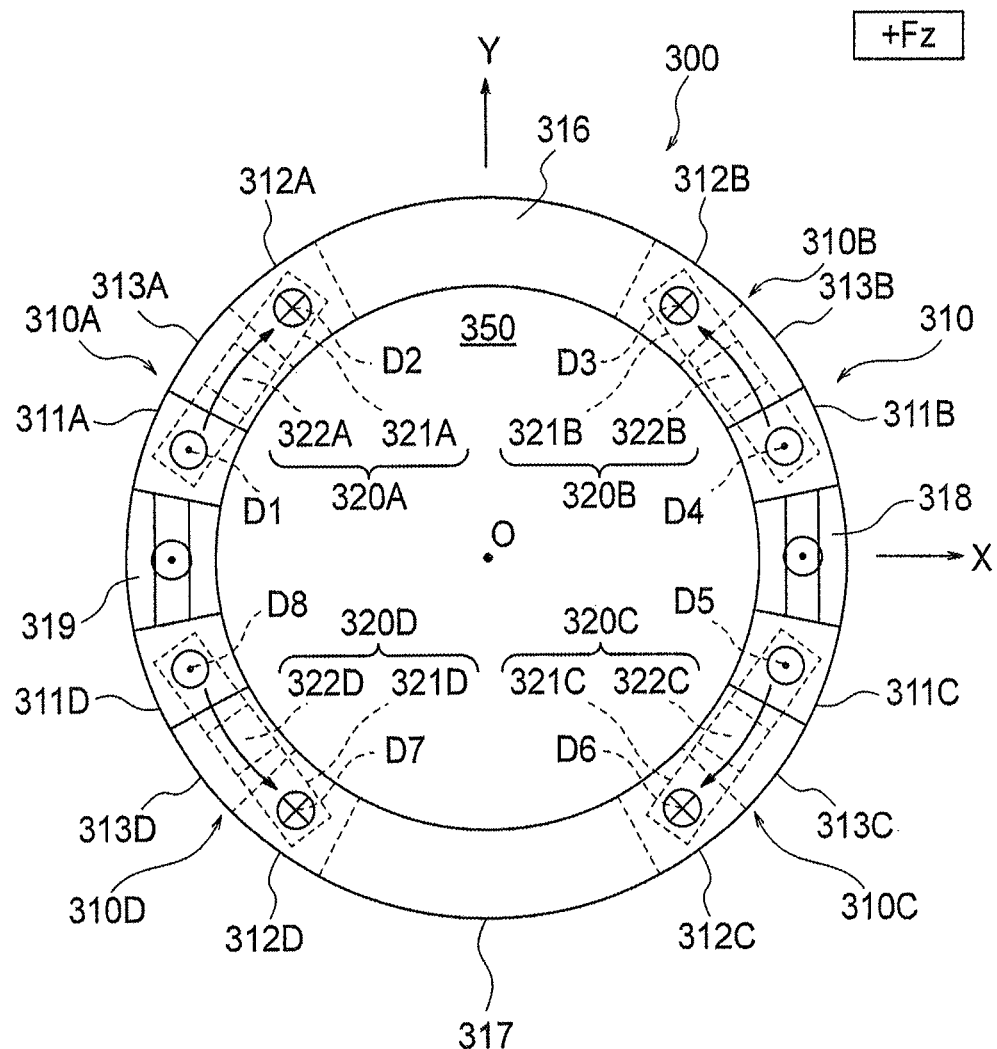
FIG. 22 is a diagram for illustrating the displacement generated at each of displacement bodies of the basic structure illustrated in FIG. 17 when the force +Fz in the positive direction on the Z-axis is applied to the force receiving portion.

Next, FIG. 22 is a diagram for illustrating the displacement generated at each of the displacement bodies 320A to 320D of the basic structure 300 illustrated in FIG. 17 when the force +Fz in the positive direction on the Z-axis is applied to the force receiving portions 318 and 319.

When a force +Fz in the positive direction on the Z-axis is applied to the force receiving portions 318 and 319 via the force receiving body 360, the force receiving portions 318 and 319 are displaced in the positive direction on the Z-axis as illustrated in FIG. 22. This applies an upward force as illustrated in FIG. 6 to each of the first to fourth deformable elements 310A to 310D. In this case, since the first tilting portion 313A and the third tilting portion 313C tilt clockwise, the first beam 321A and the third beam 321C also tilt clockwise. As a result, the first measurement site D1 and the fifth measurement site D5 are displaced in the positive direction on the Z-axis, while the second measurement site D2 and the sixth measurement site D6 are displaced in the negative direction on the Z-axis.

In contrast, since the second tilting portion 313B and the fourth tilting portion 313D tilt counterclockwise, the second beam 321B and the fourth beam 321D also tilt counterclockwise. As a result, the third measurement site D3 and the seventh measurement site D7 are displaced in the negative direction on the Z-axis, while the fourth measurement site D4 and the eighth measurement site D8 are displaced in the positive direction on the Z-axis.

(3-2-4. Case where Moment +Mx is Applied)

Figure 23:
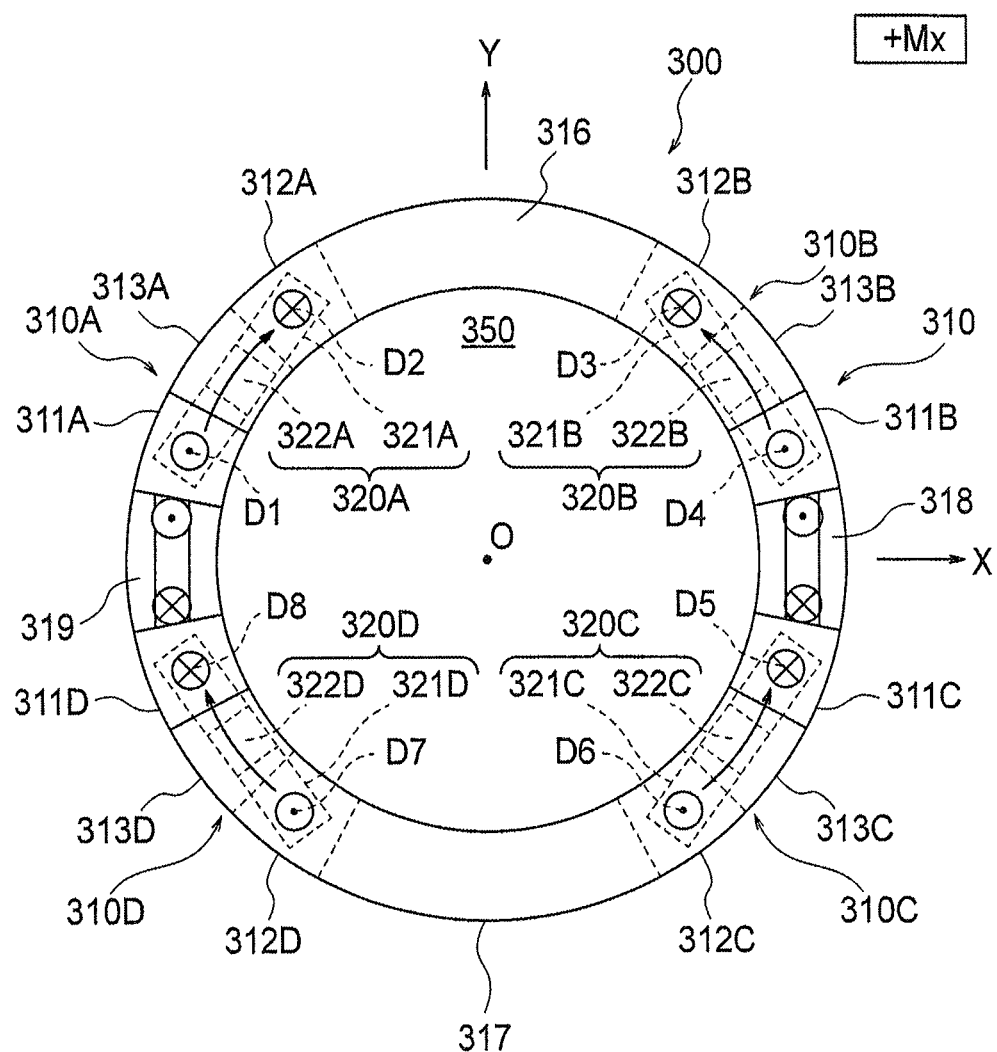
FIG. 23 is a diagram for illustrating the displacement generated at each of displacement bodies of the basic structure illustrated in FIG. 17 when a moment +Mx around the positive X-axis is applied to the force receiving portion.

Next, FIG. 23 is a diagram for illustrating displacement generated at each of the displacement bodies 320A to 320D of the basic structure 300 in FIG. 17 when a moment +Mx around the positive X-axis is applied to the force receiving portions 318 and 319. In the present application, the direction of rotation of a right screw when the right screw is advanced in the positive direction of a predetermined coordinate axis is defined as a positive moment around the coordinate axis.

When the moment +Mx around the positive X-axis is applied to the force receiving portions 318 and 319 via the force receiving body 360, the site of each of the force receiving portions 318 and 319 on the positive side on the Y-axis (upper side in FIG. 23) is displaced in the positive direction on the Z-axis (the front side), while site on the negative side Y-axis (lower side in FIG. 23) is displaced in the negative direction on the Z-axis (back side). That is, forces are applied to the first deformable element 310A and the second deformable element 310B in the same direction as the case of FIG. 22. Therefore, as described in 3-2-3, the first measurement site D1 is displaced in the positive direction on the Z-axis, the second measurement site D2 is displaced in the negative direction on the Z-axis, the third measurement site D3 is displaced in the negative direction on the Z-axis, and the fourth measurement site D4 is displaced in the positive direction on the Z-axis.

In contrast, the third deformable element 310C receives a downward force from the force receiving portion 319 as illustrated in FIG. 5. In this case, since the third tilting portion 313C tilts counterclockwise, the third beam 321C also tilts counterclockwise. As a result, the fifth measurement site D5 is displaced in the negative direction on the Z-axis, and the sixth measurement site D6 is displaced in the positive direction on the Z-axis.

The fourth deformable element 310D receives a downward force from the force receiving portion 318 as illustrated in FIG. 5. In this case, since the fourth tilting portion 313D tilts clockwise, the fourth beam 321D also tilts clockwise. As a result, the seventh measurement site D7 is displaced in the positive direction on the Z-axis, and the eighth measurement site D8 is displaced in the positive direction on the Z-axis.

(3-2-5. Case where Moment +My is Applied)

Figure 24:
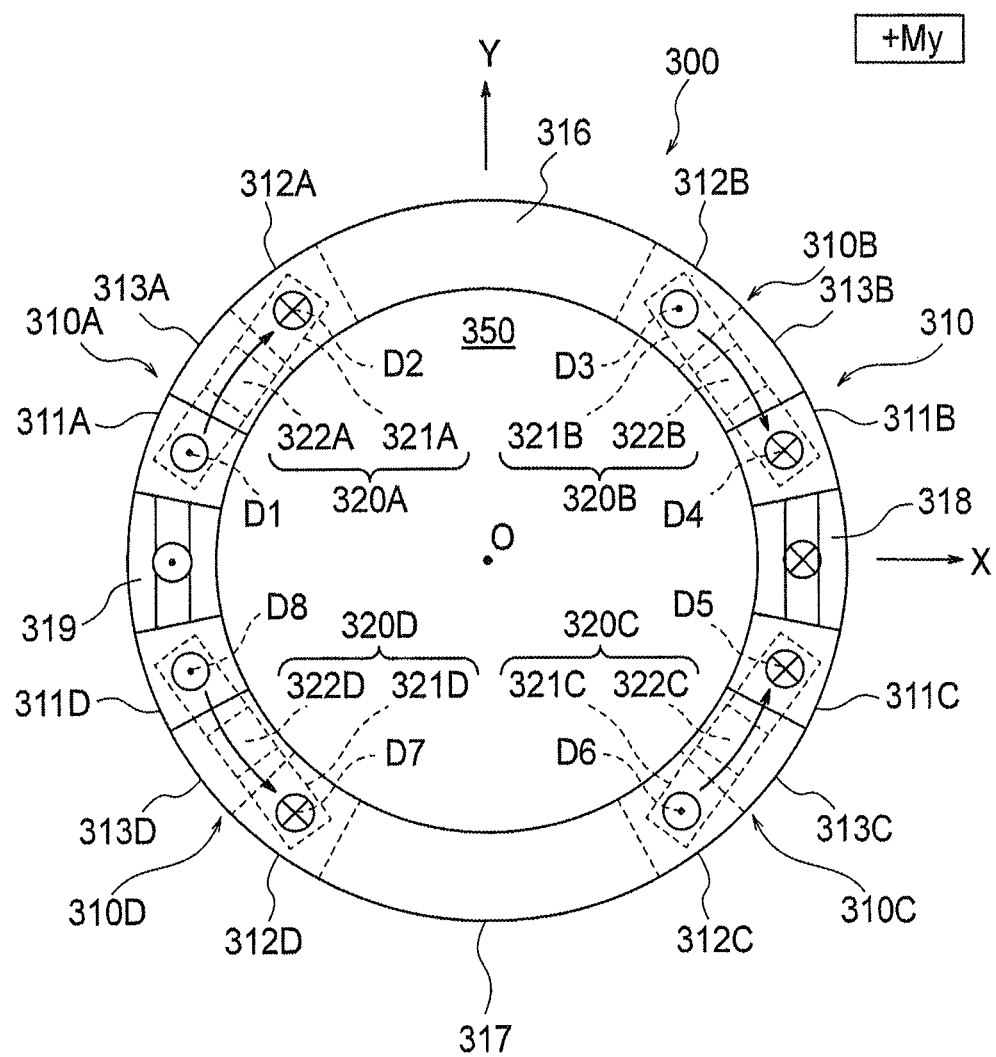
FIG. 24 is a diagram for illustrating the displacement generated at each of displacement bodies of the basic structure illustrated in FIG. 17 when a moment +My around the positive Y-axis is applied to the force receiving portion.

Next, FIG. 24 is a diagram for illustrating displacement generated at each of the displacement bodies 320A to 320D of the basic structure 300 in FIG. 17 when a moment +My around the positive Y-axis is applied to the force receiving portions 318 and 319.

When the moment +My around the positive Y-axis is applied to the force receiving portions 318 and 319 via the force receiving body 360, the force receiving portion 319 positioned on the negative side of the X-axis is displaced in the positive direction on the Z-axis (direction from the back to the front in FIG. 24), while the force receiving portion 318 positioned on the positive side on the X-axis is displaced in the negative direction on the Z-axis (direction from the front to the back in FIG. 24). That is, forces are applied to the first deformable element 310A and the fourth deformable element 310D in the same direction as the case of FIG. 22. Therefore, as described in 3-2-3, the first measurement site D1 is displaced in the positive direction on the Z-axis, the second measurement site D2 is displaced in the negative direction on the Z-axis, the seventh measurement site D7 is displaced in the negative direction on the Z-axis, and the eighth measurement site D8 is displaced in the positive direction on the Z-axis.

In contrast, as illustrated in FIG. 24, the second deformable element 310B and the third deformable element 310C receive a force in the negative direction on the Z-axis (refer to FIG. 5). Since the second tilting portion 313B tilts clockwise in the second deformable element 310B due to the application of this force, the second beam 321B also tilts clockwise. As a result, the third measurement site D3 is displaced in the positive direction on the Z-axis, and the fourth measurement site D4 is displaced in the negative direction on the Z-axis. In the third deformable element 310C, since the third tilting portion 313C tilts counterclockwise similarly to FIG. 23, the fifth measurement site D5 is displaced in the negative direction on the Z-axis, and the sixth measurement site D6 is displaced in the positive direction on the Z-axis.

(3-2-6. Case where Moment +Mz is Applied)

Figure 25:
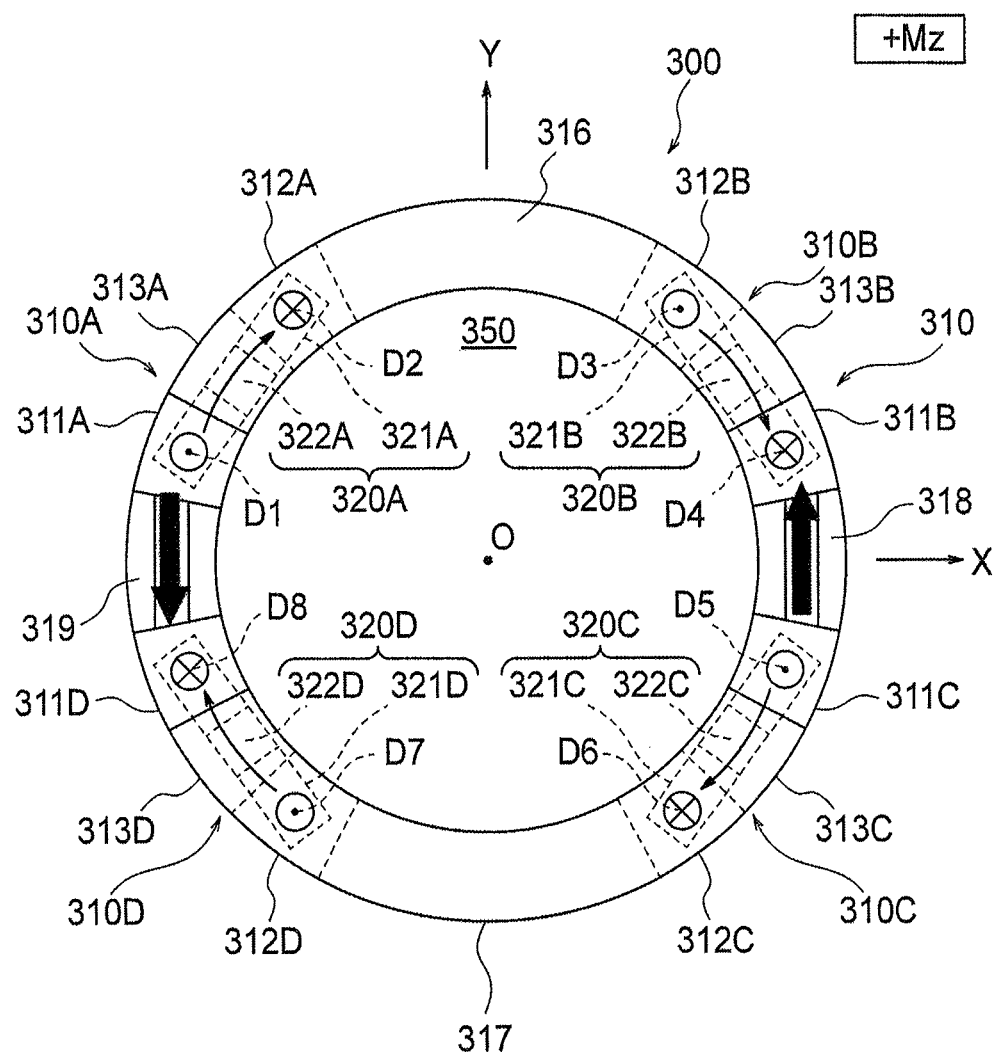
FIG. 25 is a diagram for illustrating the displacement generated at each of displacement bodies of the basic structure illustrated in FIG. 17 when a moment +Mz around the positive Z-axis is applied to the force receiving portion.

Next, FIG. 25 is a diagram for illustrating displacement generated at each of the displacement bodies 320A to 320D of the basic structure 300 in FIG. 17 when a moment +Mz around the positive Z-axis is applied to the force receiving portions 318 and 319.

When the moment +Mz around the positive Z-axis is applied to the force receiving portions 318 and 319 via the force receiving body 360, the force receiving portion 319 positioned on the negative side on the X-axis is displaced in the negative direction on the Y-axis, while the force receiving portion 318 positioned on the positive side on the X-axis is displaced in positive direction on the Y-axis. Since the displacement of the force receiving portion 318 positioned on the positive side on the X-axis has the same direction as the direction of a case where the force +Fy is applied (refer to FIG. 21), elastic deformation same as the case of FIG. 21 is generated in the second deformable element 310B and the third deformable element 310C arranged on the positive side on the X-axis. That is, the third measurement site D3 is displaced in the positive direction on the Z-axis, the fourth measurement site D4 is displaced in the negative direction on the Z-axis, the fifth measurement site D5 is displaced in the positive direction on the Z-axis, and the sixth measurement site D6 is displaced in the negative direction on the Z-axis.

In contrast, the first deformable element 310A receives application of a tensile force as illustrated in FIG. 4 by the displacement of the force receiving portion 319 in the negative direction on the Y-axis. In this case, since the first tilting portion 313A and the first beam 321A tilt clockwise, the first measurement site D1 is displaced in the positive direction on the Z-axis and the second measurement site D2 is displaced in the negative direction on the Z-axis.

Furthermore, the fourth deformable element 310D receives application of a compressive force as illustrated in FIG. 3 by the displacement of the force receiving portion 319 in the negative direction on the Y-axis. In this case, since the fourth tilting portion 313D and the fourth beam 321D tilt clockwise, the seventh measurement site D7 is displaced in the positive direction on the Z-axis and the eighth measurement site D8 is displaced in the negative direction on the Z-axis.

FIG. 26 summarizes the direction of tilting generated in each of the tilting portions 313A to 313D of the basic structure 300 of FIG. 17 when the forces +Fx, +Fy, and +Fz in the individual axial directions of the XYZ three-dimensional coordinate system and the moments +Mx, +My, +Mz around individual axes of the XYZ three-dimensional coordinate system are applied to the force receiving portions 318 and 319 and also summarizes the displacement generated in each of the measurement sites D1 to D8 of the displacement bodies 320A to 320B in a list. In FIG. 26, the direction of pivoting (clockwise/counterclockwise) written in the field of each of the tilting portions 313A to 313D is the direction observed from the origin O. In addition, the symbol "+" written in the field of each of the measurement sites D1 to D8 signifies an increase in a separation distance between the corresponding displacement portion and the support 350, while the symbol "−" signifies a decrease in a separation distance between the corresponding displacement portion and the support 350.

In a case where the forces and moments applied to the force receiving body 360 are in the negative direction or around the negative axis, the directions of tilting of the tilting portions 313A to 313D are all reversed in each of the above-described cases. As a result, the direction of displacement generated at each of the measurement sites D1 to D8 of the displacement bodies 320A to 320D is also reversed, leading to a reversed direction of the tilting listed in FIG. 26 and a reversed increase or decrease (+/−) in the separation distance between each of the measurement sites D1 to D8 and the support 350.

<3-3. Configuration of Force Sensor>

Next, a configuration of the force sensor 300c having the basic structure 300 described in 3-1 and 3-2 will be described.

Figure 27:
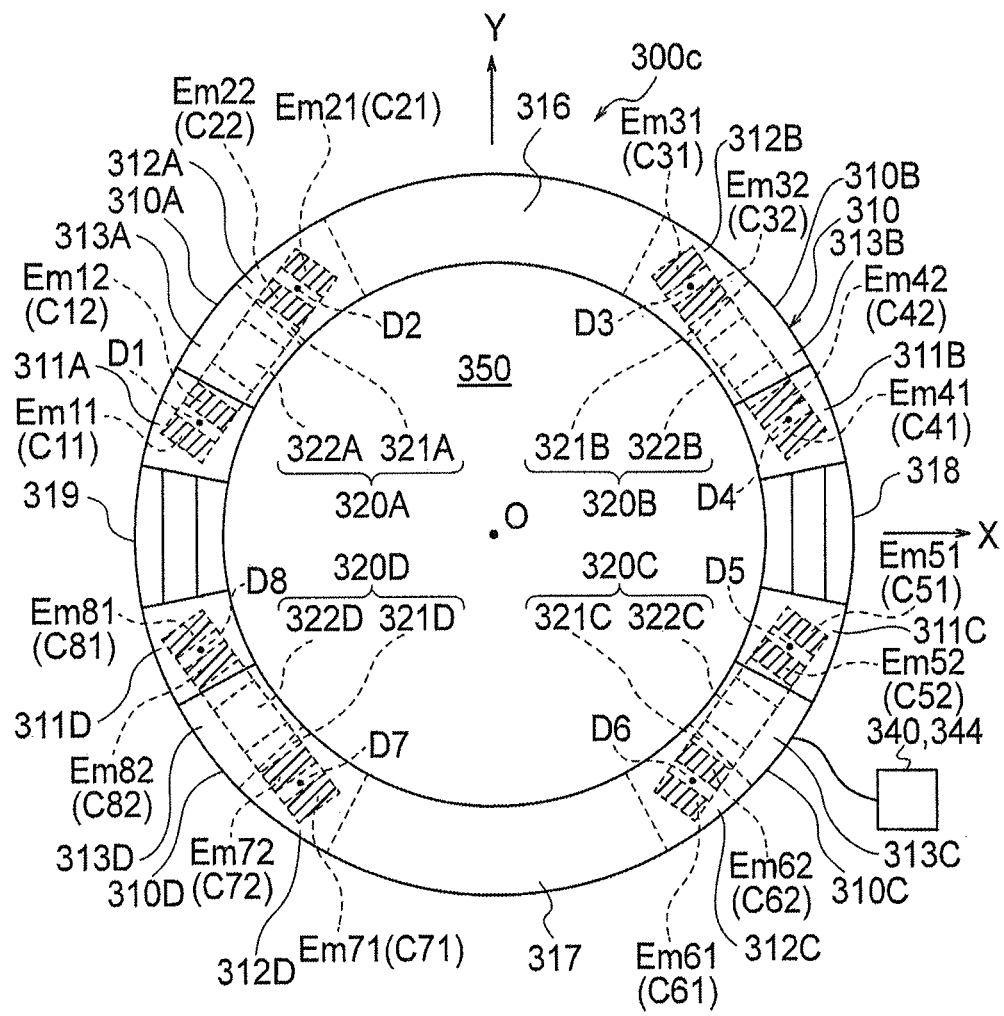
FIG. 27 is a schematic top view illustrating an example of a force sensor that adopts the basic structure illustrated in FIG. 17.
Figure 28:
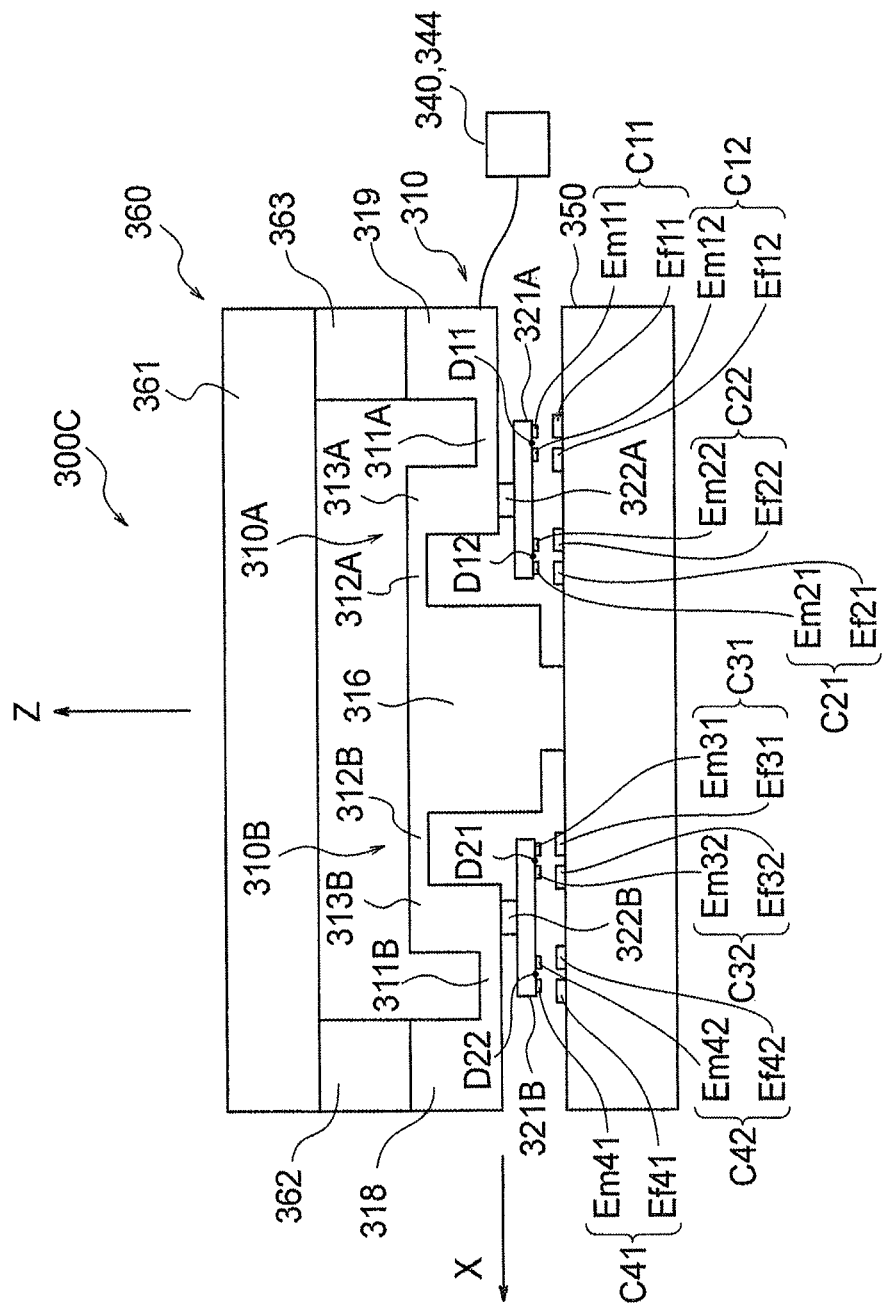
FIG. 28 is a schematic front view illustrating the force sensor illustrated in FIG. 27 as viewed from the positive side on the Y-axis.

FIG. 27 is a schematic top view illustrating an example of a force sensor 300c adopting the basic structure 300 illustrated in FIG. 17. FIG. 28 is a schematic front view illustrating the force sensor 300c of FIG. 27, as viewed from the positive side on the Y-axis.

As illustrated in FIGS. 27 and 28, the force sensor 300c includes the above-described basic structure 300, and a detection circuit 340 that detects the applied force and the moment on the basis of the displacement generated in each of the measurement sites D1 to D8 of the displacement bodies 320A to 320D of the basic structure 300. As illustrated in FIGS. 27 and 28, the detection circuit 340 according to the present embodiment includes a total of 16 capacitive elements C11 to C82, two elements being arranged at each of the measurement sites D1 to D8 of the displacement bodies 320A to 320D, and also includes a microcomputer 344 connected to the capacitive elements C11 to C82 to measure the applied force on the basis of the variation amount of the electrostatic capacitance values of the capacitive elements C11 to C82.

A specific arrangement of the capacitive elements C11 to C82 is as follows. That is, as illustrated in FIGS. 27 and 28, the 1-1 capacitive element C11 and the 2-1 capacitive element C21 are arranged symmetrically with respect to the connection site between the first beam 321A and the first connecting body 322A, while the 1-2 capacitive element C12 and the 2-2 capacitive element C22 are arranged between the 1-1 capacitive element C11 and the 2-1 capacitive element C21, symmetrically with respect to the connection site. The other capacitive elements are similarly arranged. That is, the 3-1 capacitive element C31 and the 4-1 capacitive element C41 are arranged symmetrically with respect to the connection site between the second beam 321B and the second connecting body 322B, while the 3-2 capacitive element C32 and 4-2 capacitive element C42 are arranged between the 3-1 capacitive element C31 and the 4-1 capacitive element C41, symmetrically with respect to the connection site. The 5-1 capacitive element C51 and the 6-1 capacitive element C61 are arranged symmetrically with respect to the connection site between the third beam 321C and the third connecting body 322C, while the 5-2 capacitive element C52 and the 6-2 capacitive element C62 are arranged between the 5-1 capacitive element C51 and the 6-1 capacitive element C61, symmetrically with respect to the connection site. Furthermore, the 7-1 capacitive element C71 and the 8-1 capacitive element C81 are arranged symmetrically with respect to the connection site between the fourth beam 321D and the fourth connecting body 322D, while the 7-2 capacitive element C72 and the 8-2 capacitive element C82 are arranged between the 7-1 capacitive element C71 and the 8-1 capacitive element C81, symmetrically with respect to the connection site.

As will be described below, eight capacitive elements Cn1 (n=1, 2, ..., 8) arranged outside the individual beams 321A to 321D are used to output, as the first displacement sensors, the first electric signal T1 indicating the applied forces and moments, while eight capacitive elements Cn2 (n=1, 2, ..., 8) arranged inside the individual beams 321A to 321D are used to measure, as the second displacement sensors, the second electric signal T2 indicating the applied forces and moments.

The specific configuration of each of the capacitive elements C11 to C82 is similar to each of the capacitive elements C11 to C22 of the force sensor 100c illustrated in FIG. 7. That is, the n–1 capacitive element Cn1 (n=1, 2, ..., 8) arranged in the n-th measurement site Dn (n=1, 2, ..., 8) includes: an n–1 displacement electrode Emn1 (n=1, 2, ..., 8) arranged on the n-th measurement site Dn via an insulator (not illustrated); and an n–1 fixed electrode Efn1 (n=1, 2, ..., 8) arranged on the support 350 so as to face the n–1 displacement electrode Emn1 via an insulator (not illustrated). In addition, the n–2 capacitive element Cn2 (n=1, 2, ..., 8) includes: an n–2 displacement electrode Emn2 (n=1, 2, ..., 8) arranged on the n-th measurement site Dn (n=1, 2, ..., 8) so as to be adjacent to the n–1 displacement electrode Emn1 via an insulator (not illustrated); and an n–2 fixed electrode Efn2 (n=1, 2, ..., 8) arranged on the support 250 so as to face the n–2 displacement electrode Emn2 via an insulator (not illustrated).

Although not specifically illustrated in FIGS. 27 and 28, these capacitive elements C11 to C82 are connected to the microcomputer 344 by a predetermined circuit, and thus, the electrostatic capacitance value of each of the capacitive elements C11 to C82 is to be supplied to the microcomputer 344.

<3-4. Application of Force Sensor>

Next, application of the force sensor 300c described in e-3 will be described with reference to FIG. 29.

FIG. 29 is a table listing an increase or decrease in electrostatic capacitance values of the capacitive elements C11 to C82 of the force sensor 300c illustrated in FIG. 27 when the forces Fx, Fy, and Fz in each of the axial directions and the moments Mx, My, and Mz around each of the axes, in the XYZ three-dimensional coordinate system, are applied to the force receiving portions 318 and 319. In this table, "+" represents that the electrostatic capacitance value increases, and "++" represents that the electrostatic capacitance value widely increases. In addition, "−" represents that the electrostatic capacitance value decreases, and "−−" represents that the electrostatic capacitance value widely decreases.

The sign (positive or negative) of the electrostatic capacitance value of each of the capacitive elements C11 to C82 illustrated in FIG. 29 is apparent from the displacement generated in each of the measurement sites D1 to D8 of the basic structure 300 illustrated in FIG. 26. In addition, the magnitude of the variation in the electrostatic capacitance value of each of the capacitive elements C11 to C82 can be observed from the connection site between the tilting portions 313A to 313D and the beams 321A to 321D, that is, the distance from the center of tilting of each of the beams 321A to 321D to each of the capacitive elements C11 to C22. That is, the variation of the electrostatic capacitance value is relatively large in the eight capacitive elements $Cn1$ ($n=1, 2, \ldots, 8$) (first displacement sensor) arranged relatively distant from the tilting center of each of the beams 321A to 321D, while the variation of the electrostatic capacitance value is relatively small in the eight capacitive elements $Cn2$ ($n=1, 2, \ldots, 8$) (second displacement sensor) arranged relatively in proximity to the tilting center.

From the above, in consideration similar to 1-4. described above, the forces Fx, Fy, and Fz in each of axial directions and the moments Mx, My, and Mz around each of axes, applied to the force receiving portions 318 and 319 are measured by any of the following [Expression 6] and [Expression 7]. The numerals "1" and "2" at the end of the left side of each of the expressions are signs to distinguish whether the force and the moment are measured from the capacitive element $Cn1$ ($n=1, 2, \ldots, 8$) (first displacement sensor) or from the capacitive element $Cn2$ ($n=1, 2, \ldots 8$) (second displacement sensor).

+Fx1=C11−C21−C31−C41−C51+C61−C71+C81

+Fy1=C11−C21−C31+C41−C51+C61+C71−C81

+Fz1=−C11+C21+C31−C41−C51+C61+C71−C81

+Mx1=−C11+C21+C31−C41+C51−C61−C71+C81

+My1=−C11+C21−C31+C41+C51−C61+C71−C81

+Mz1=−C11+C21−C31+C41+C51−C61−C71+C81    [Expression 6]

+Fx2=C12−C22+C32−C42−C52+C62−C72+C82

+Fy2=C12−C22−C32+C42−C52+C62+C72−C82

+Fz2=−C12+C22+C32−C42−C52+C62+C72−C82

+Mx2=−C12+C22+C32−C42+C52−C62−C72+C82

+My2=−C12+C22−C32+C42+C52−C62+C72−C82

+Mz2=−C12+C22−C32+C42−C52+C62−C72+C82    [Expression 7]

It is of course allowable to measure each of the forces Fx to Fz and the moments Mx, My, and Mz by the sum of [Expression 6] and [Expression 7], illustrated in the following [Expression 8]. "3" is added to the end of the expression obtained as the sum of [Expression 6] and [Expression 7] so as to distinguish the expressions [Expression 6] and [Expression 7]. Here, the electric signal corresponding to [Expression 6] from the detection circuit 340 is referred to as the first electric signal T1, the electric signal corresponding to [Expression 7] is referred to as the second electric signal T2, and the electric signal corresponding to [Expression 8] is referred to as the summation electric signal T3.

+Fx3=Fx1+Fx2

+Fy3=Fy1+Fy2

+Fz3=Fz1+Fz2

+Mx3=Mx1+Mx2

+My3=My1+My2

+Mz3=Mz1+Mz2    [Expression 8]

Note that in the case where the forces −Fx, −Fy, and −Fz in the negative direction, or the moments −Mx, −My, and −Mz around a negative axis are applied to the force receiving body 360 of the force sensor 300c, the increase or decrease of the separation distance between the electrodes of the capacitive elements C11 to C82 is opposite to that illustrated in FIG. 29 as described above. Therefore, in order to detect the forces −Fx, −Fy, and −Fz or the moments −Mx, −My, and −Mz, it is sufficient to invert the signs on the right and left sides of [Expression 6] to [Expression 8]. Eventually, even when a negative force and a negative moment are applied, the force and moment are measured by [Expression 6] to [Expression 8].

In measuring the forces Fx, Fy, and Fz and the moments Mx, My, and Mz, from the viewpoint of S/N, it is preferable to use the first electric signal T1 (corresponding to [Expression 6]) based on the capacitive element $C1n$ ($n=1, 2, \ldots, 8$) (first displacement sensor) located distant from the center of tilting of each of the beams 321A to 321D and having relatively a large variation amount of electrostatic capacitance values, or the summation electric signal T3 (corresponding to [Expression 8]) based on all the capacitive elements C11 to C82.

<3-5. Cross-axis Sensitivity of Force Sensor>

Next, cross-axis sensitivity of the force sensor 300c according to the present embodiment will be described with reference to FIG. 30. FIG. 30 is a table listing cross-axis sensitivities VFx to VMz of the forces Fx, Fy, and Fz in each of axial directions and the moments Mx, My, and Mz around each of axes in the force sensor 300c illustrated in FIG. 27.

The numbers given in the table of FIG. 30 are values obtained by substituting numbers in each of right sides of the above-described [Expression 6] or [Expression 7] when a capacitive element denoted by the symbol "+" is defined as +1 and the capacitive element denoted by the symbol "−" is defined as −1 for each of the forces Fx, Fy, and Fz and each of the moments Mx, My, and Mz in the table illustrated in FIG. 29. That is, the number "8" written in the cell at an intersection of the column Fx and the row VFx is a value obtained by C11=C31=C61=C81=+1, and C21=C41=C51=C71=−1, on the basis of the row of Fx in FIG. 29, in the Fx expression in [Expression 6]. Moreover, the number "0" written in the cell at an intersection of the columns Fx and VFy is a value obtained by C11=C41=C61=C71=+1, and C21=C31=C51=C82=−1, on the basis of the row of Fy in FIG. 29, in the expression indicating Fx of [Expression 6]. The similar applies to the numbers of the other cells.

According to FIG. 30, the cross-axis sensitivity of Fx and My and the cross-axis sensitivity of Fy and Mx are 100%. That is, the force sensor 300c has difficulty in distinguishing between Fx and My, and distinguishing between Fy and Mx. This can be observed from the relationship of the formulas of +Fx and +My having mutually different signs and the relationship of the formulas of +Fy and +Mx having mutually different signs, in [Expression 6] and [Expression 7]. Accordingly, the force sensor 300c cannot detect all of the forces Fx, Fy, and Fz in the individual axial directions and the moments Mx, My, and Mz around the individual axes. Still, the force sensor 300c can be effectively utilized by limiting use to cases not including application of Fx and Fy, or not including application of Mx and My.

<3-6. Failure Diagnosis>

The detection circuit 340 of the present embodiment also has a function of determining whether the force sensor 300c functions normally.

As described above, the microcomputer 344 of the detection circuit 340 of the present embodiment outputs the first electric signal T1 based on the right side of [Expression 6] and the second electric signal T2 based on the right side of [Expression 7]. For example, the first electric signal T1 and the second electric signal T2 can be written down with a focus on the force Fx as the following [Expression 9].

$T1=C11-C21+C31-C41-C51+C61-C71+C81$ $T2=C12-C22+C32-C42-C52+C62-C72+C82$ [Expression 9]

Meanwhile, as illustrated in FIG. 29, the variation amount of the electrostatic capacitance value of the capacitive element $C1n$ (n=1, 2, . . . , 8) (first displacement sensor) included in the right side of the first electric signal T1 in [Expression 9] s larger than the variation amount of the electrostatic capacitance value of the capacitive element $C2n$ (n=1, 2, . . . , 8) (second displacement sensor) included in the right side of the second electric signal T2. Therefore, output levels of the first electric signal T1 and the second electric signal T2 can be equalized by multiplying the second electric signal T2 by a predetermined correction coefficient k using the correction circuit of the microcomputer 344, for example.

Then, the comparison circuit included in the microcomputer 344 compares these two electric signals T1 and k·T2. This comparison is performed on the basis of a difference between the signals T1 and k·T2 (for example: T1−k·T2), or the proportion of individual signals T1 and k·T2 (for example: T1/(k·T2). Then, when the difference or proportion between T1 and k·T2 falls within a predetermined range as a result of the comparison of the two electric signals T1 and k·T2, the diagnosis circuit of the microcomputer 344 determines that the force sensor 300c functions normally. In contrast, when the difference between T1 and k·T2 does not fall within the predetermined range, the diagnosis circuit of the microcomputer 344 determines that the force sensor 300c is not functioning normally (failed), and outputs the determination result as a failure diagnosis signal. With the detection circuit like this, it is possible to detect an abnormality such as breakage of an electrode included in the capacitive elements C11 to C82, short circuit, and mixing of foreign matter by the single force sensor 300c.

Of course, it is also possible to diagnose the failure of the force sensor 300c by performing AD conversion of the variation amount of the electrostatic capacitance value of each of the capacitive elements C11 to C82 and comparing the electrostatic capacitance values by the microcomputer 344.

Note that while the above description defines the first electrical signal T1 and the second electrical signal T2 by focusing on the force Fx, the first electric signal T1 and the second electric signal T2 may be defined by focusing one or two or more of the other forces Fy and Fz and the moments Mx, My, and Mz.

According to the present embodiment as described above, it is possible to diagnose a failure of the force sensor 300c by comparison of the first electric signal T1 based on the variation amount of the electrostatic capacitance value of the capacitive element $C1n$ (n=1, 2, . . . , 8) (first displacement sensor) and the second electric signal T2 based on the variation amount of electrostatic capacitance value of the capacitive element $C2n$ (n=1, 2, . . . , 8) (second displacement sensor). Furthermore, the measurement sites D1 to D8 are displaced by the tilting of each of the tilting portions 313A to 313D, making, it possible to effectively amplify the tilting generated in each of the tilting portions 313A to 313D in the force sensor 300c. That is, according to the present embodiment, it is possible to provide a low-cost and highly sensitive force sensor 300c capable of performing self failure diagnosis by the single force sensor 300c.

Furthermore, according to the present embodiment, the detection circuit 340 measures the applied forces Fx, Fy, and Fz and the applied moments Mx, My, and Mz by the difference between the electrostatic capacitance values as expressed in [Expression 6] and [Expression 7], making it possible to provide the force sensor 300c insusceptible to the influence of a temperature change and common mode noise in the use environment.

In addition, the measurement sites D1, D3, D5, and D7 of one side of each of the displacement bodies 320A to 320D and the measurement sites D2, D4, D6, and D7 on the other side thereof are arranged symmetrically with respect to a connection site between the tilting portions 313A to 313D and the beams 321A to 321D. Therefore, the displacement generated in each of the measurement sites D1, D3, D5, and D7 on the one side and the displacement generated in each of the measurement sites D2, D4, D6, and D7 on the other side are equal in magnitude and are different in the sign, making it possible to detect the applied force and the moment by a simple calculation.

In addition, since the detection circuit 340 detects the applied force and moment on the basis of the first electric signal T1 corresponding to [Expression 6] or the summation electric signal T3 corresponding to [Expression 8], it is possible to perform measurement excellent in S/N.

<<<§ 4. Force Sensor According to Fourth Embodiment of the Present Invention and Modification>>>

<4-1. Force Sensor According to Fourth Embodiment of Present Invention>

The force sensor 300c described in § 3 is capable of detecting four components among the forces Fx, Fy, and Fz and moments Mx, My, and Mz in each of axial directions, and diagnosing a failure of the force sensor 300c by focusing on at least one component of the four components. Incidentally, in order to detect these four components, it is not always necessary to provide 16 capacitive elements C11 to C82 in the force sensor 300c. Here, as a modification of the above-described force sensor 300c, a force sensor 400c according to the fourth embodiment capable of detecting four components with fewer capacitive elements will be described.

Figure 31:
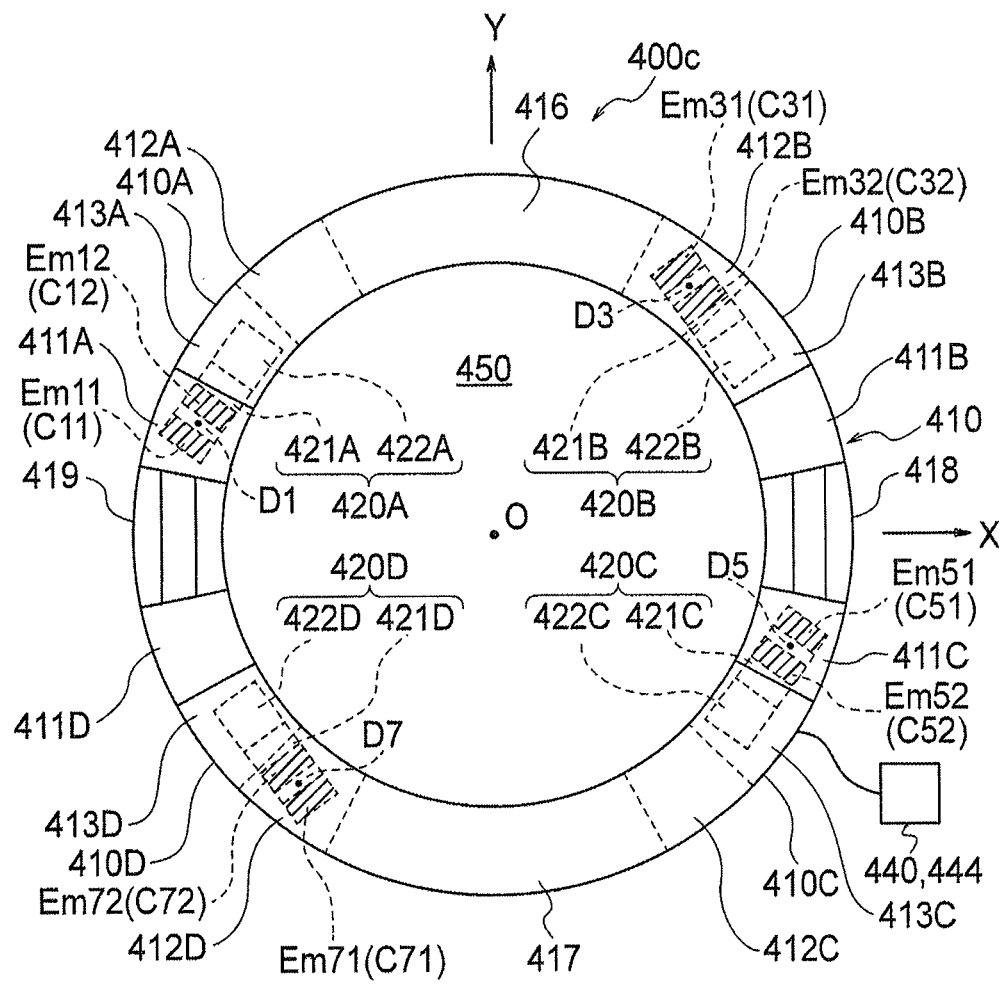
FIG. 31 is a schematic top view of a force sensor according to a fourth embodiment of the present invention.

FIG. 31 is a schematic top view of a force sensor 400c according to a fourth embodiment of the present invention.

As illustrated in FIG. 31, the force sensor 400c is different from the force sensor 300c according to the third embodiment in that the beams 421A to 421D are formed of cantilever beams. Specifically, each of the beams 421A to 421D of the force sensor 400c has a cantilevered beam structure that has eliminated the site positioned in the direction advanced clockwise in FIG. 27 from among the beams 321A to 321D of the force sensor 300c. Accordingly, in the force sensor 400c, one measurement site D1, D3, D5, or D7 is defined for each of the beams 421A to 421D. Then, two capacitive elements are arranged at each of the four measurement sites D1, D3, D5, and D7, that is, a total of eight capacitive elements C11, C12, C31, C32, C51, C52, C71, and C72 are arranged. The configuration of each of the capacitive elements is the same as that of the third embodiment.

Although not illustrated in FIG. 31, these eight capacitive elements are connected to a microcomputer 444 of a detection circuit 440 by a predetermined circuit, and thus, the electrostatic capacitance value of each of the capacitive elements are is be supplied to the microcomputer 444. As will be described below, the microcomputer 444 detects the force applied to the force sensor 400c on the basis of the variation amount of the electrostatic capacitance value of each of the capacitive elements.

The other configurations of the force sensor 400c are similar to the case of the third embodiment. For this reason, the substantially similar reference signs are assigned to components common to the third embodiment, and a detailed description thereof will be omitted.

Next, application of the force sensor 400c according to the present embodiment will be described. Here, a case of detecting four components Fz, Mx, My and Mz among the forces Fx, Fy, Fz in each of axial directions and the moments Mx, My, Mz around each of axes, in the XYZ three-dimensional coordinate system will be described. These four components are also the four components detectable by the force sensor 300c according to the third embodiment.

As described above, the force sensor 400c according to the present embodiment has a configuration common with the force sensor 300c according to the third embodiment, except that the beams 421A to 421D are formed with cantilever beams. Therefore, when a force or a moment is applied to the force receiving portions 418 and 419 via the force receiving body 460, the displacement same as the case of the corresponding measurement sites D1, D3, D5, and D7 of the force sensor 300c in the third embodiment is generated in each of the measurement sites D1, D3, D5, and D7 of each of the beams 421A to 421D.

From the above, when the four components Fz, Mx, My, and Mz of the forces and moments are applied to the force sensor 400c, the electrostatic capacitance values of the individual capacitive elements vary as illustrated in FIG. 32. The meanings of the symbols "+/++" and "−/−−" in the drawing are similar to the case of FIG. 29. Note that the table of FIG. 32 illustrates an increase or decrease that is same as the increase or decrease of the electrostatic capacitance values of the eight capacitive elements C11, C12, C31, C32, C51, C52, C71, and C72 when the force Fz and the moments Mx, My, and Mz are applied in FIG. 29.

The microcomputer 444 measures the applied force Fz and moments Mx, My, and Mz on the basis of the variation of the electrostatic capacitance value as described above by the following [Expression 10] and [Expression 11]. Each of the expressions is obtained by deleting C21, C22, C41, C42, C61, C62, C81 and C82 from the expressions of Fz, Mx, My and Mz in [Expression 6] and [Expression 7]. The numbers "1" and "2" at the end of the left side of each of the expressions are signs to distinguish whether the force and the moment are measured from the capacitive element Cn1 (n=1, 3, 5, and 7) (first displacement sensor) or from the capacitive element Cn2 (n=1, 3, 5, and 7) (second displacement sensor).

$$+Fz1=-C11+C31-C51+C71$$

$$+Mx1=-C11+C31+C51-C71$$

$$+My1=-C11-C31+C51+C71$$

$$+Mz1=-C11-C31-C51-C71 \qquad \text{[Expression 10]}$$

$$+Fz2=-C12+C32-C52+C72$$

$$+Mx2=-C12+C32+C52-C72$$

$$+My2=-C12-C32+C52+C72$$

$$+Mz2=-C12-C32-C52-C72 \qquad \text{[Expression 11]}$$

It is of course allowable to measure each of the force Fz and the moments Mx, My, and Mz by the summation electric signal obtained by the sum of [Expression 10] and [Expression 11], similarly to the third embodiment. Furthermore, as described in the third embodiment, [Expression 10] and [Expression 11] also hold even in a case where the force −Fz in the negative direction or moments −Mx, −My, and −Mz around the negative axis are applied to the force receiving body 460 of the force sensor 400c.

The cross-axis sensitivities of the force Fz and the moments Mx, My, and Mz obtained on the basis of [Expression 10] or [Expression 11] are listed in FIG. 33. Similarly to FIG. 30, the cross-axis sensitivities are values obtained by substituting numbers in each of right sides of the above-described [Expression 15] when a capacitive element denoted by the symbol "+" is defined as +1 and the capacitive element denoted by the symbol "−" is defined as −1 for the force Fz and the moments Mx, My, and Mz in the table illustrated in FIG. 32. As illustrated in FIG. 33, the cross-axis sensitivity of each of the force Fz and the moments Mx, My, and Mz is zero. With

[Expression 10] and [Expression 11], however, the moment Mz about the Z-axis is obtained by the sum of the electrostatic capacitance values. For this reason, it is necessary to pay attention to the fact that the moment Mz is susceptible to the influence of a temperature change and common mode noise in the use environment of the force sensor 400c.

This force sensor 400 determines whether the force sensor 400c functions normally as follows.

The microcomputer 444 of the detection circuit 440 is configured to output the first electric signal T1 based on the right side of [Expression 10] and the second electric signal T2 based on the right side of [Expression 11]. That is, the first electric signal T1 and the second electric signal T2 can be written down with a focus on the force Fz as the following [Expression 12].

$$T1=-C11+C31-C51+C71$$

$$T2=-C12+C32-C52+C72 \qquad \text{[Expression 12]}$$

Meanwhile, as illustrated in FIG. 32, the variation amount of the electrostatic capacitance value of the capacitive element C1$n$ (n=1, 3, 5, and 7) (first displacement sensor) included in the right side of the Expression T1 is larger than the variation amount of the electrostatic capacitance value of the capacitive element C2$n$ (n=1, 3, 5, and 7) (second displacement sensor) included in the right side of the Expression T2. Therefore, similarly to the third embodiment, output levels of the first electric signal T1 and the second electric signal T2 can be equalized by multiplying the second electric signal T2 by a predetermined correction coefficient k using the correction circuit of the microcomputer 444.

Then, the comparison circuit included in the microcomputer 444 compares these two electric signals T1 and k·T2. This comparison is performed on the basis of a difference between the individual signals T1 and k·T2 (for example, T1–k·T2), or the proportion of the individual signals T1 and k·T2 (for example, T1/(k·T2). Then, when the difference or proportion between T1 and k·T2 falls within a predetermined range as a result of the comparison of the two electric signals T1 and k·T2, the diagnosis circuit of the microcomputer 444 determines that the forte sensor 400c functions normally. In contrast, when the difference or ratio between T1 and k·T2 does not fall within the predetermined range, the diagnosis circuit of the microcomputer 444 determines that the force sensor 400c is not functioning normally (failed), and outputs the determination result as a failure diagnosis signal. With the detection circuit 440, it is possible to detect an abnormality such as breakage of an electrode included in each of the capacitive elements, short circuit, and mixing of foreign matter by the single force sensor 400c.

Of course, it is also possible to diagnose the failure of the force sensor 300c by performing AD conversion of the variation amount of the electrostatic capacitance value of each of the capacitive elements C11 to C82 and comparing the electrostatic capacitance values by the microcomputer 344.

Note that while the above description defines the first electrical signal T1 and the second electrical signal T2 by focusing on the force Fx, the first electric signal T1 and the second electric signal T2 may be defined by focusing one or two or more of the other forces Fy and Fz and the moments Mx, My, and Mz.

Even with the present embodiment as described above, the effects similar to the case of the third embodiment can be provided. Note that while the above description assumes that a specific beam is configured as a cantilever beam, it is of course allowable to use the force sensor 300c having the structure of a doubly supported beam illustrated in FIG. 27, so as to measure the force and moment applied to the force sensor 300c using a specific capacitive element alone.

<4-2. Force Sensor According to Modification>

As described above, the force sensor 400c is susceptible to the influence of a temperature change and common mode noise in the use environment in measuring the moment Mz about the Z-axis. Therefore, it would be more preferable that the force sensor 400c is less likely to be affected by these factors in measuring the moment Mz. Herein, a modification of this type of force sensor having six capacitive elements will be described.

Figure 34:
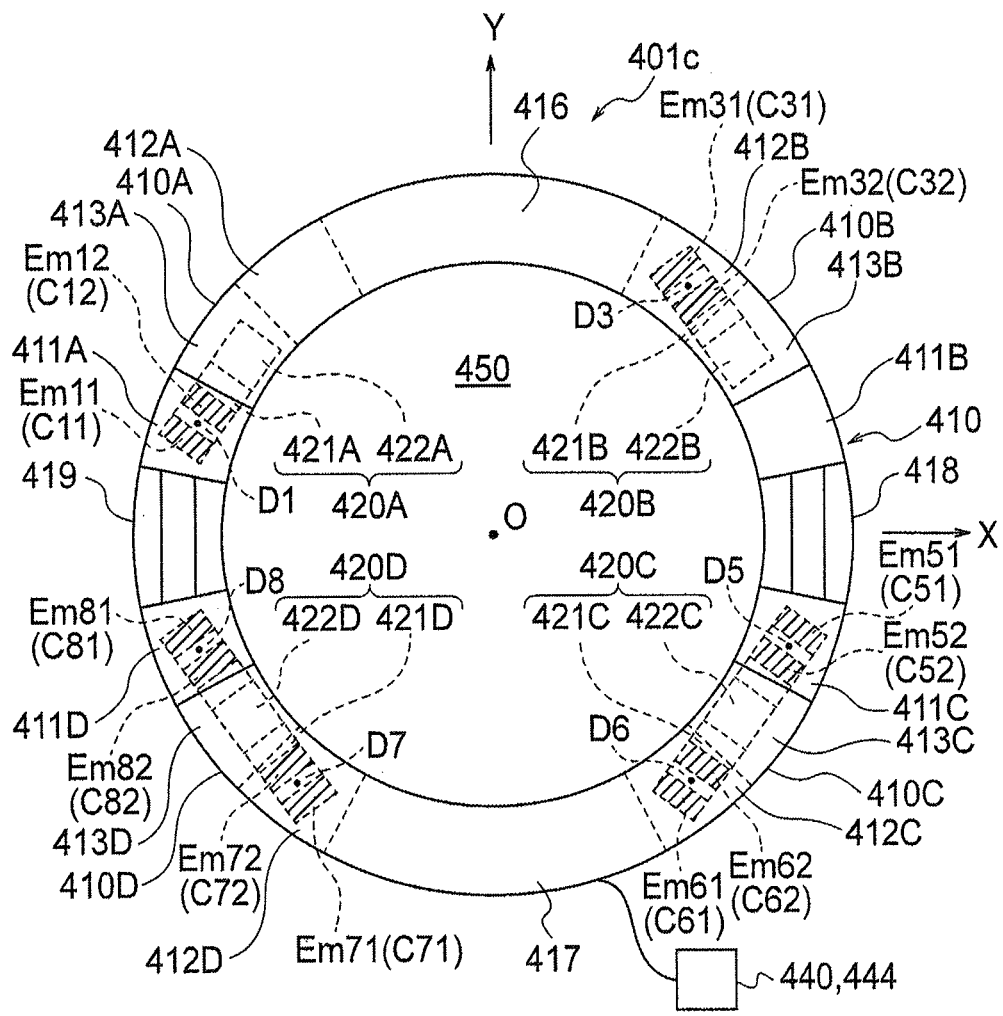
FIG. 34 is a schematic top view illustrating a force sensor according to a modification of FIG. 31.

FIG. 34 is a schematic top view of a force sensor 401c according to a modification of the fourth embodiment.

As illustrated in FIG. 34, the force sensor 401c is different from the force sensor 300c according to the third embodiment in that the first and second beams 421A and 421B are formed of cantilever beams. Specifically, the first and second beams 421A and 421B of the force sensor 401c according to the present modification are similar to the first and second beams 421A and 421B of the force sensor 400c according to the fourth embodiment, while the third and fourth beams 421C and 421D of the force sensor 401c are similar to the third and fourth beams 321C and 321D of the force sensor 300c according to the third embodiment illustrated in FIG. 27. Therefore, in the force sensor 401c, the first measurement site D1 is defined in the first beam 421A and the third measurement site D3 is defined in the second beam 421B, while the fifth measurement site D5 and the sixth measurement site D6 are defined in the third beam 421C, and the seventh measurement site D7 and the eighth measurement site D8 are defined in the fourth beam 421D. The arrangement of the fifth measurement site D5, the sixth measurement site D6, the seventh measurement site D7 and the eighth measurement site D8 is the same as the arrangement of the corresponding measurement sites D5 to D8 of the force sensor 300c according to the third embodiment. Then, each one of the capacitive elements C1$n$ (n=1, 3, 5, 6, 7, and 8) (first displacement sensor) and each one of the capacitive element C2$n$ (n=1, 3, 5, 6, 7, and 8) (second displacement sensor) are arranged at each of the six measurement sites. The configuration of each of the capacitive elements is the same as the case of the third embodiment.

Although not specifically illustrated in FIG. 34, these six capacitive elements are connected to the microcomputer 444 by a predetermined circuit, and thus, the electrostatic capacitance value of each of the capacitive elements is to be supplied to the microcomputer 444. As will be described below, the microcomputer 444 detects the force applied to the force sensor 401c on the basis of the variation amount of the electrostatic capacitance value of each of the capacitive elements.

The other configurations of the force sensor 401c are similar to the case of the third embodiment. For this reason, the substantially similar reference signs are assigned to components common to the third embodiment, and a detailed description thereof will be omitted.

Next, application of the force sensor 401c according to the present embodiment will be described. Here, similarly to the case of the fourth embodiment, a case of detecting four components Fz, Mx, My and Mz among the forces Fx, Fy, and Fz in each of axial directions and the moments Mx, My, and Mz around each of axes, in the XYZ three-dimensional coordinate system will be described.

In the force sensor 401c according to the present embodiment, when a force or moment is applied to the force receiving portions 418 and 419 via the force receiving body 460, displacement same as the case of the corresponding measurement sites D1, D3, D5 to D8 of the force sensor 300c according to the third embodiment is generated in six measurement sites D1, D3, D5 to D8.

Accordingly, when a force and a moment is applied to the force sensor 401c, the electrostatic capacitance value of each of the capacitive elements varies similarly to the corresponding capacitive element in FIG. 29. The microcomputer 444 measures the applied force Fz and moments Mx, My, and Mz on the basis of the variation of the electrostatic capacitance value like this by the following [Expression 13] and [Expression 14]. The expressions of Fz, Mx and My among the four expressions expressed in [Expression 13] and [Expression 14] are the same as the corresponding expressions of [Expression 10] and [Expression 11], respectively. Of course, the cross-axis sensitivities of the force Fz and the moments Mx, My, and Mz in [Expression 13] and [Expression 14] are both zero.

$$+Fz1=-C11+C31-C51+C71$$

$$+Mx1=-C11+C31+C51-C71$$

$$+My1=-C11-C31+C51+C71$$

$$+Mz1=-C11-C31+C61+C81 \qquad \text{[Expression 13]}$$

$$+Fz2=-C12+C32-C52+C72$$

$$+Mx2=-C12+C32+C52-C72$$

$$+My2=-C12-C32+C52+C72$$

$$+Mz2=-C12-C32+C62+C82 \qquad \text{[Expression 14]}$$

With the force sensor 401c as described above, it is also possible to provide the effects similar to the case of the third embodiment. Furthermore, with the force sensor 401c, the moment Mz around the Z-axis can be calculated by the difference, making it possible to eliminate the influence of the temperature change and the common mode noise in the use environment of the force sensor 401c, and measure the moment Mz with high accuracy.

The method of failure diagnosis in the force sensor 401c is similar to the case of the force sensor 400c according to the fourth embodiment described in 4-1, and thus the description thereof will be omitted here.

<4-3. Force Sensor According to Further Modification>
<4-3-1. First Modification>

While FIG. 31 illustrates the force sensor obtained by deleting eight capacitive elements C21, C22, C41, C42, C61, C62, C81, and C82 from the force sensor 300c illustrated in FIG. 27 as a force sensor for detecting the force Fz and the moments Mx, My, and Mz, the present invention is not limited to such a mode. As a force sensor (not illustrated) according to another example, it is conceivable to provide a sensor in which the eight capacitive elements C11, C12, C41, C42, C51, C52, C81, and C82 have been deleted from the force sensor 300c illustrated in FIG. 27. That is, this force sensor includes eight capacitive elements C21, C22, C31, C32, C61, C62, C71, and C72.

The increase and decrease of each of the capacitive elements when force and moment are applied to this force sensor are the same as the increase and decrease of the corresponding capacitive elements illustrated in FIG. 29.

Accordingly, the microcomputer 444 of the detection circuit 440 of this force sensor measures the applied force Fz and moments Mx, My, and Mz by the following [Expression 15] and [Expression 16]. [Expression 15] and [Expression 16] are obtained by extracting the corresponding capacitive elements alone from the expressions of Fz, Mx, My and Mz of [Expression 6] and [Expression 7].

$$+Fz1=C21+C31+C61+C71$$

$$+Mx1=C21+C31-C61-C71$$

$$+My1=C21-C31-C61+C71$$

$$+Mz1=C21-C31+C61-C71 \qquad \text{[Expression 15]}$$

$$+Fz2=C22+C32+C62+C72$$

$$+Mx2=C22+C32-C62-C72$$

$$+My2=C22-C32-C62+C72$$

$$+Mz2=C22-C32+C62-C72 \qquad \text{[Expression 16]}$$

The cross-axis sensitivities of the force Fz and the moments Mx, My, and Mz obtained on the basis of the increase or decrease of the electrostatic capacitance value of the corresponding capacitive element and the [Expression 15] or [Expression 16] illustrated in FIG. 29 are identical to the result illustrated in FIG. 33. Therefore, the cross-axis sensitivities of the force Fz and the moments Mx, My, and Mz are zero. With [Expression 15] and [Expression 16], however, the force Fz in the Z-axis direction is obtained by the sum of the electrostatic capacitance values. For this reason, it is necessary to pay attention to the fact that the force Fz is susceptible to the influence of a temperature change and common mode noise in the use environment of the force sensor.

(4-3-2. Second Modification)

Alternatively, it is conceivable to provide a force sensor obtained by deleting eight capacitive elements C21, C22, C31, C32, C61, C62, C71, and C72 from the force sensor 300c illustrated in FIG. 27 as a force sensor for detecting the force Fz and the moments Mx, My, and Mz. That is, this force sensor includes eight capacitive elements C11, C12, C41, C42, C51, C52, C81, and C82.

The increase and decrease of each of the capacitive elements when force and moment are applied to this force sensor are the same as the increase and decrease of the corresponding capacitive elements illustrated in FIG. 29. Accordingly, the microcomputer 444 of the detection circuit 440 of this force sensor measures the applied force Fz and moments Mx, My, and Mz by the following [Expression 17] and [Expression 18]. [Expression 17] and [Expression 18] are obtained by extracting the corresponding capacitive elements from the expressions of Fz, Mx, My and Mz of [Expression 6] and [Expression 7].

$$+Fz1=-C11-C41-C51-C81$$

$$+Mx1=-C11-C41+C51+C81$$

$$+My1=-C11+C41+C51-C81$$

$$+Mz1=-C11+C41-C51+C81 \qquad \text{[Expression 17]}$$

$$+Fz2=-C12-C42-C52-C82$$

$$+Mx2=-C12-C42+C52+C82$$

$$+My2=-C12+C42+C52-C82$$

$$+Mz2=-C12+C42-C52+C82 \qquad \text{[Expression 18]}$$

The cross-axis sensitivities of the force Fz and the moments Mx, My, and Mz obtained on the basis of the increase or decrease of the electrostatic capacitance value of the corresponding capacitive element and the [Expression 17] or [Expression 18] illustrated in FIG. 29 are identical to the result illustrated in FIG. 33. Therefore, the cross-axis sensitivities of the force Fz and the moments Mx, My, and Mz are zero. With [Expression 17] and [Expression 18], however, the force Fz in the Z-axis direction is obtained by the sum of the electrostatic capacitance values. For this reason, it is necessary to pay attention to the fact that the force Fz is susceptible to the influence of a temperature change and common mode noise in the use environment of the force sensor.

Note that from the viewpoint of S/N, it would be preferable to use an expression based on a capacitive element having a relatively large variation in the electrostatic capacitance value, that is, using [Expression 15] in the first modification and using [Expression 17] in the second modification so as to measure the applied force and moment, or it would preferable, in each of the modifications, to calculate a summation electric signal corresponding to Fz3, Mx3, My3 and Mz3 of [Expression 8] so as to measure the applied force and moment using this summation electric signal.

In both of the cases of the first and second modifications described above, the failure diagnosis method is similar to the case of the force sensor 400c according to the fourth embodiment. Therefore, a detailed description thereof will be omitted here.

<<<§ 5. Force Sensor According to Fifth Embodiment of Present Invention and Modification Thereof>>>

<5-1. Force Sensor According to Fifth Embodiment of Present Invention>

As a fourth embodiment and a modification thereof, § 4 describes a force sensor particularly suitable for intensively measuring the moments Mx, My, and Mz. Now, a force sensor suitable for intensively measuring the forces Fx, Fy, and Fz will be described.

Figure 35:
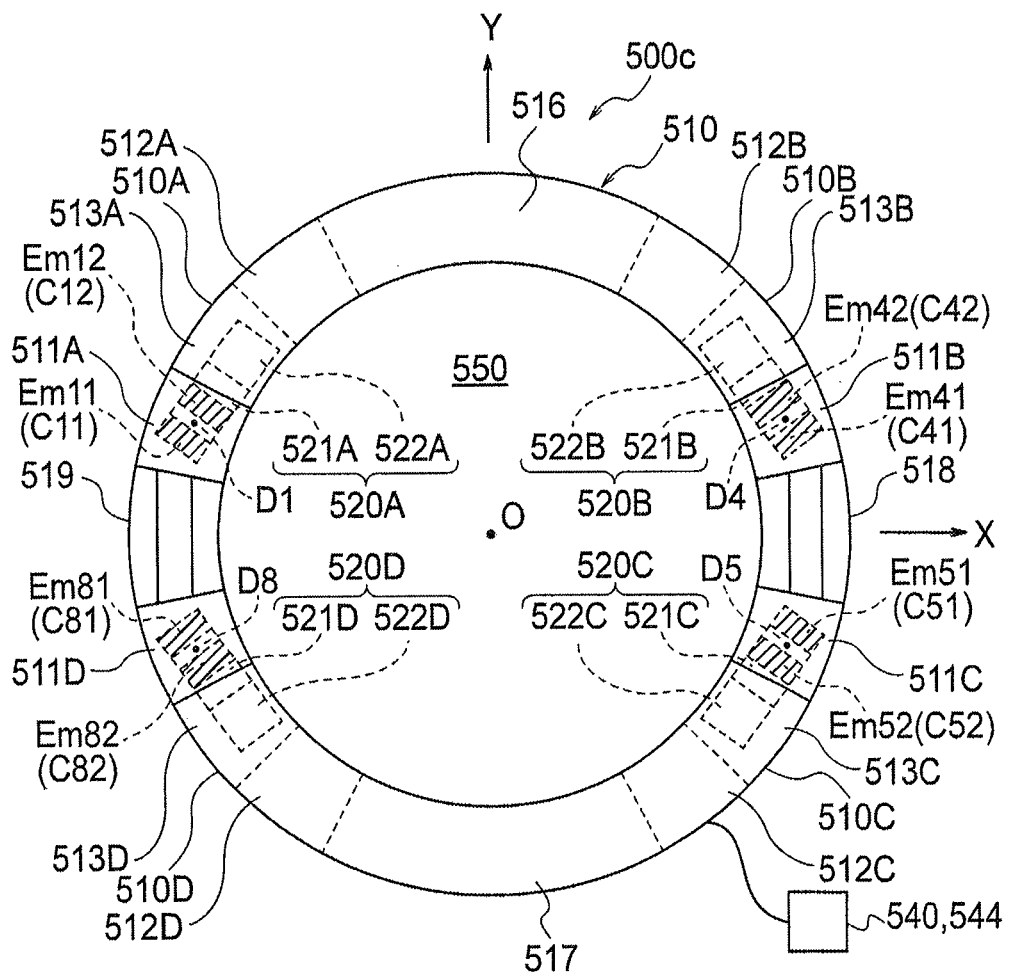
FIG. 35 is a schematic top view of a force sensor according to a fifth embodiment of the present invention.

FIG. 35 is a schematic top view of a force sensor 500c according to the fifth embodiment of the present invention. As illustrated in FIG. 5, while the force sensor 500c has eight capacitive elements similarly to the case of the fourth embodiment, their arrangement is different from that of the fourth embodiment. Specifically, each of beams 521A to 521D of the force sensor 500c has a cantilever beam structure that has deleted the sites on the fixed portions 316 and 317 sides among each of the beams 321A to 321D of the force sensor 300c. Accordingly, in the force sensor 500c, one measurement site D1, D4, D5, or D8 is defined for each of the beams 521A to 521D. Then, two capacitive elements are arranged at each of the four measurement sites D1, D4, D5, and D8, that is, the capacitive elements C11, C12, C41, C42, C51, C52, C81, and C82 are arranged. The configuration of each of the capacitive elements is the same as the case of the second embodiment.

Although not illustrated in FIG. 31, these eight capacitive elements are connected to a microcomputer 544 of a detection circuit 540 by a predetermined circuit, and thus, the electrostatic capacitance value of each of the capacitive elements is to be supplied to the microcomputer 544. As will be described below, the microcomputer 544 detects the force applied to the force sensor 500c on the basis of the variation amount of the electrostatic capacitance value of each of the capacitive elements.

The other configurations of the force sensor 500c are similar to the case of the third and fourth embodiments. For this reason, the substantially similar reference signs are assigned to components common to the third and fourth embodiments, and a detailed description thereof will be omitted.

Next, application of the force sensor 500c according to the present embodiment will be described. Here, a case of detecting four components Fx, Fy, Fz, and Mz among the forces Fx, Fy, and Fz in each of axial directions and the moments Mx, My, and Mz around each of axes, in the XYZ three-dimensional coordinate system will be described. These four components are also the four components detectable by the force sensor 300c according to the third embodiment.

FIG. 36 is a table listing variations of electrostatic capacitance value of each of capacitive elements when four force and moment components Fx, Fy, Fz, and Mz are applied to the force sensor 500c illustrated in FIG. 35. As described above, the force sensor 500c according to the present embodiment has a configuration common with the force sensor 300c according to the third embodiment, except that the beams 521A to 521D are formed with cantilever beams. Therefore, when a force or a moment is applied to the force receiving portions 518 and 519 via the force receiving body 560, the displacement same as the case of the corresponding detecting portion of the force sensor 300c according to the third embodiment is generated in each of the measurement sites D1, D4, D5, and D8 of each of the beams 521A to 521D.

Accordingly, the increase or decrease of each of the capacitive elements when the force and moment are applied to the force sensor 500c are the same as the increase or decrease of the corresponding capacitive elements illustrated in FIG. 29. Similarly to FIG. 29, the symbol "+" in the drawing indicates an increase in the electrostatic capacitance value, and the symbol "−" represents a decrease in the electrostatic capacitance value.

The microcomputer 544 measures the applied force Fx, Fy, and Fz and moments Mz on the basis of the variation of the electrostatic capacitance value like this by the following [Expression 19] and [Expression 20]. [Expression 19] and [Expression 20] are obtained by extracting the corresponding capacitive elements alone from the expressions of Fz, Mx, My and Mz of [Expression 6] and [Expression 7].

$$+Fx1=C11-C41-C51+C81$$

$$+Fy1=C11+C41-C51-C81$$

$$+Fz1=-C11-C41-C51-C81$$

$$+Mz1=-C11+C41-C51+C81 \qquad \text{[Expression 19]}$$

$$+Fx2=C12-C42-C52+C82$$

$$+Fy2=C12+C42-C52-C82$$

$$+Fz2=-C12-C42-C52-C82$$

$$+Mz2=-C12+C42-C52+C82 \qquad \text{[Expression 20]}$$

The cross-axis sensitivities of the forces Fx, Fy, and Fz and the moment Mz obtained on the basis of the increase or decrease of the electrostatic capacitance value of the corresponding capacitive element and the [Expression 19] or [Expression 20] illustrated in FIG. 36 are both zero. The method of calculating the cross-axis sensitivity is similar to the case of the other embodiments. With [Expression 19] and [Expression 20], however, the force Fz in the Z-axis direction is obtained by the sum of the electrostatic capacitance values. For this reason, it is necessary to pay attention to the fact that the force Fz is susceptible to the influence of a temperature change and common mode noise in the use environment of the force sensor 500c.

In the present embodiment, it would also be preferable, from the viewpoint of S/N, to measure the applied force and moment by [Expression 19] based on a capacitive element having a relatively large variation in the electrostatic capacitance value, or it would preferable to calculate a summation electric signal corresponding to Fx3, Fy3, Fz3, and Mz3 of

[Expression 8] on the basis of [Expression 19] and [Expression 20] so as to measure the applied force and moment using this summation electric signal.

The method of failure diagnosis according to the present embodiment as described above is similar to the force sensor 400c according to the fourth embodiment. Therefore, a detailed description thereof will be omitted here.

Even with this force sensor 500c, the effects similar to the case of the third embodiment can be provided. In particular, the present embodiment makes it possible to provide the force sensor 500c capable of detecting force in each of axial directions and capable of failure diagnosis.

<5-2. Force Sensor According to Modification>

As described above, the force sensor 500c is susceptible to the influence of the temperature change and the common mode noise in the use environment in measuring the force Fz in the Z-axis direction. Therefore, it would be more preferable the force sensor 500c is less likely to be affected by these factors in measuring the force Fz. Here, such a force sensor 501c will be described.

Figure 37:
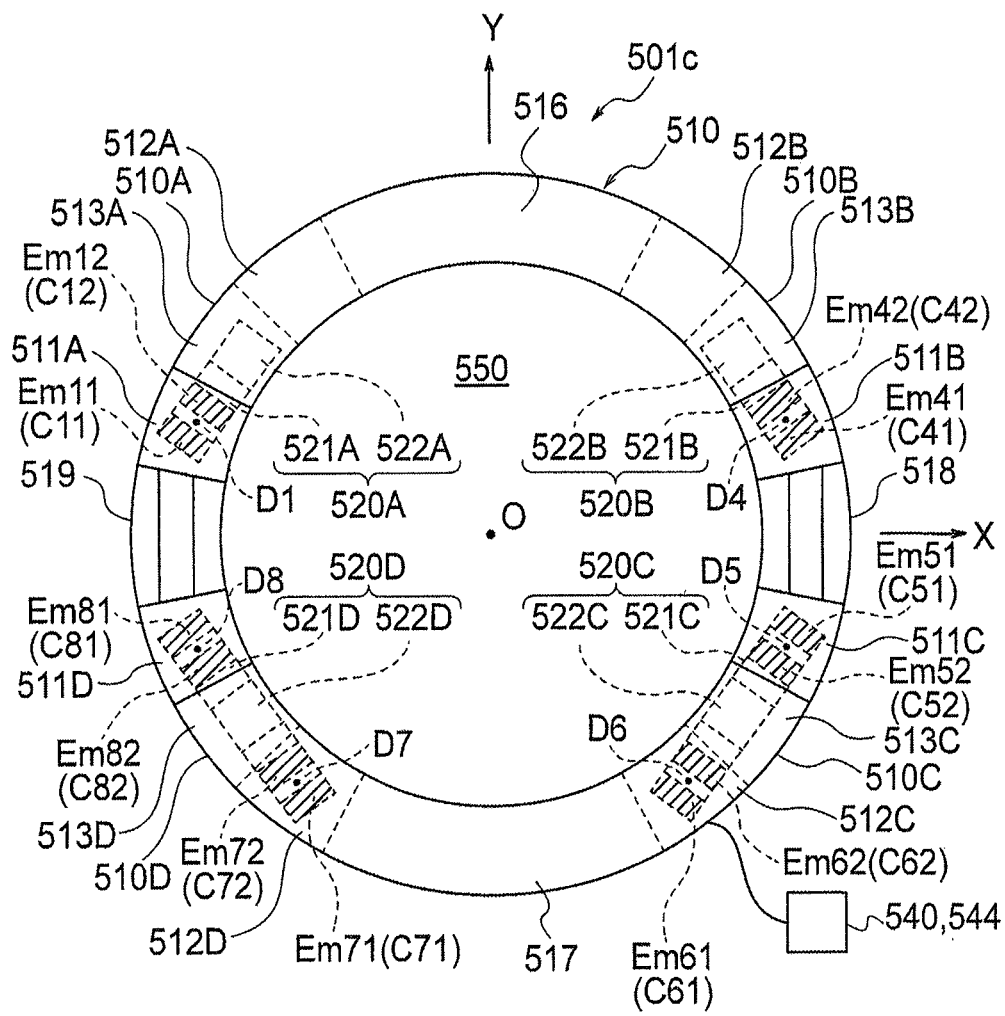
FIG. 37 is a schematic top view of a force sensor according to a modification of the fifth embodiment.

FIG. 37 is a schematic top view of the force sensor 501c according to a modification of the fifth embodiment. As illustrated in FIG. 37, a basic structure 501 and the capacitive elements of the force sensor 501c are arranged such that portions of the positive Y-coordinate (upper half of FIG. 37) are same as the force sensor 500c of FIG. 35, while portions of the negative Y-coordinate (lower half of FIG. 37) are same as the force sensor 300c illustrated in FIG. 27. Although not specifically illustrated in FIG. 37, each of the capacitive elements is connected to the microcomputer 544 by a predetermined circuit, and thus, the electrostatic capacitance value of each of the capacitive elements is to be supplied to the microcomputer 544. As will be described below, the microcomputer 544 detects the force applied to the force sensor 501c on the basis of the variation amount of the electrostatic capacitance value of each of the capacitive elements.

The other configurations of the force sensor 501c are similar to the case of the third embodiment. For this reason, the substantially similar reference signs are assigned to components common to the third embodiment, and a detailed description thereof will be omitted.

The increase or decrease of each of the capacitive elements when the force and moment is applied to the force sensor 501c are the same as the increase or decrease of the corresponding capacitive elements illustrated in FIG. 29. The microcomputer 544 measures the applied force Fx, Fy, and Fz and moment Mz on the basis of the variation of the electrostatic capacitance value like this by the following [Expression 21] or [Expression 22]. [Expression 21] and [Expression 22] are obtained by extracting the corresponding capacitive elements alone from the expressions of Fx, Fy, Fz, and Mz of [Expression 6] and [Expression 7]. The expressions of Fx, Fy, Fz, and Mz among the four expressions expressed in [Expression 21] and [Expression 22] are the same as the corresponding expressions of [Expression 19] and [Expression 20], respectively. Of course, the cross-axis sensitivities of the forces Fx, Fy, and Fz and the moment Mz in [Expression 21] and [Expression 21] are both zero.

$$+Fx1 = C11 - C41 - C51 + C81$$

$$+Fy1 = C11 + C41 - C51 - C81$$

$$+Fz1 = -C11 - C41 + C61 + C71$$

$$+Mz1 = -C11 + C41 - C51 + C81 \quad \text{[Expression 21]}$$

$$+Fx2 = C12 - C42 - C52 + C82$$

$$+Fy2 = C12 + C42 - C52 - C82$$

$$+Fz2 = -C12 - C42 + C62 + C72$$

$$+Mz2 = -C12 + C42 - C52 + C82 \quad \text{[Expression 22]}$$

In the present embodiment, it would also be preferable, from the viewpoint of S/N, to measure the applied force and moment by [Expression 21] based on a capacitive element having a relatively large variation in the electrostatic capacitance value, or it would preferable to calculate a summation electric signal corresponding to Fx3, Fy3, Fz3, and Mz3 of [Expression 8] on the basis of [Expression 21] and [Expression 22] so as to measure the applied force and moment using this summation electric signal.

The method of failure diagnosis according to the present modification is similar to the force sensor 500c according to the fifth embodiment. Therefore, a detailed description thereof will be omitted here.

Even with this force sensor 501c, the effects similar to the force sensor 500c of the fifth embodiment can be provided. In particular, all of four components can be calculated by the difference in the present embodiment, making it possible to eliminate the influence of the temperature change and the common mode noise in the use environment of the force sensor 501c, and measure the moment Mz with high accuracy.

From the above, as described in § 4 and § 5, with the four force sensors 100c illustrated in FIG. 1 arranged in a closed loop shape, it is possible to detect four force components (group of Fz, Mx, My, and Mz or group of Fx, Fy, Fz, and Mz). Of course, it is allowable to detect a certain component among these four components alone.

The force sensors 400c, 401c, 500c, and 501c according to the embodiments and their modifications described in § 4 and § 5 are described as models in which specific beams are replaced with cantilever beam structures. The present invention is not limited to such an example; however, and it is allowable to perform measurement of forces and moments by focusing on a specific capacitive element adopted in each of the force sensors alone while maintaining the structure of the doubly supported beam illustrated in FIG. 27.

<<<§ 6. Force Sensor According to Sixth Embodiment of Present Invention>>>

(6-1. Configuration of Force Sensor)

As described in § 1, the force sensor 100c of FIG. 7 has difficulty in detecting a failure of the force sensor 100c due to metal fatigue of the deformable body 10. For this reason, the similar applies to the force sensor 300c of § 3 constructed by coupling the four force sensors 100c illustrated in FIG. 7 in a closed loop shape.

In contrast, the force sensor 200c of § 2 can detect whether metal fatigue is generated in the deformable body 220. Accordingly, with a configuration including a new force sensor obtained by coupling four force sensors 200c in a closed loop shape, it is possible to detect the four components of force and moment and detect a failure of the force sensor due to metal fatigue. Here, such a force sensor 600c will be described as a sixth embodiment with reference to FIGS. 38 and 39.

Figure 38:
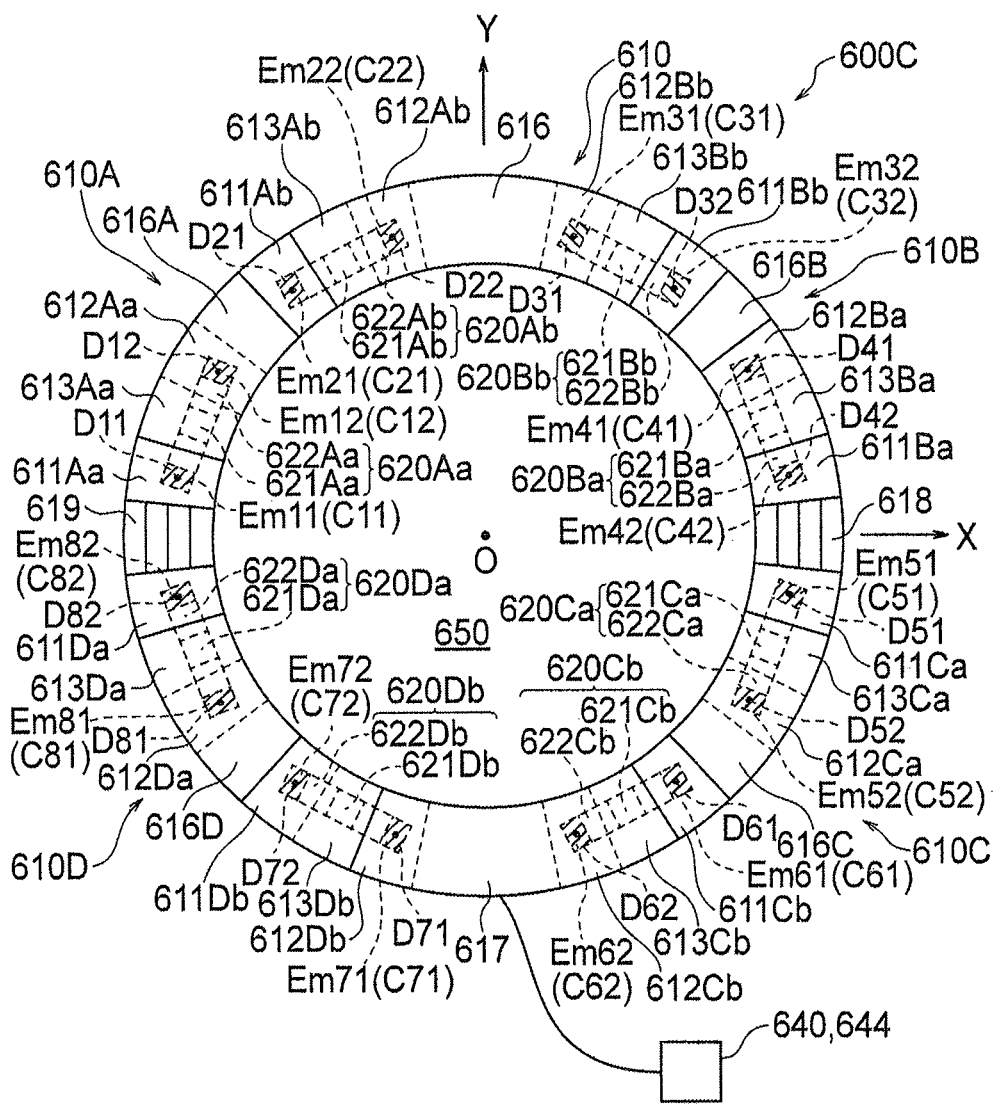
FIG. 38 is a schematic top view of a force sensor according to a sixth embodiment of the present invention.

FIG. 38 is a schematic top view illustrating the force sensor 600c according to the sixth embodiment of the present invention. FIG. 39 is a table listing the increase or decrease of electrostatic capacitance values of the capacitive elements C11 to C82 of the force sensor 600c illustrated in FIG. 38 when forces +Fx, +Fy, and +Fz in the positive direction on each of axes and moments +Mx, +My, and +Mz around each of positive axes, in the XYZ three-dimensional coordinate system, are applied.

As illustrated in FIG. 38, the force sensor 600c includes a deformable body 610, that is a closed loop shaped deformable body, including: two force receiving portions 618 and 619; two fixed portions 616 and 617 arranged alternately with the two force receiving portions 618 and 619 along a closed loop path; and four deformable elements 610A to 610D connecting the force receiving portions 618 and 619 with the fixed portions 616 and 617 adjacent to each other along the closed loop shaped path and configured to generate elastic deformation by one of a force and a moment applied to the force receiving portions 618 and 619.

Each of the four deformable elements 610A to 610D includes: first tilting portions 613Aa to 613Da and second tilting portions 613Ab to 613Db each having a longitudinal direction (direction perpendicular to the page surface of FIG. 38), and being sequentially arranged between the force receiving portions 618 and 619 and the fixed portions 616 and 617, in a direction from the force receiving portions 618 and 619 toward the fixed portions 616 and 617; and force transmitting portions 616A to 616D arranged between the first tilting portions 613Aa to 613Da and the second tilting portions 613Ab to 613Db. Then, the first tilting portions 613Aa to 613Da are connected with the corresponding force receiving portions 618 and 619 by 1-1 deformable portions 611Aa to 611Da, while the force transmitting portions 616A to 616D are connected with the first tilting portions 613Aa to 613Da by 1-2 deformable portions 612Aa to 612Da. Furthermore, the force transmitting portions 616A to 616D are connected with the second tilting portions 613Ab to 613Db by 2-1 deformable portions 611Ab to 611Db, while the second tilting portions 613Ab to 613Db are connected with the corresponding fixed portions 616 and 617 by 2-2 deformable portions 612Ab to 612Db.

Each of the deformable portions extends in a direction intersecting the longitudinal direction of the tilting portions 613Aa to 613Da and 613Ab to 613Db (in-plane direction of the page surface in FIG. 38). Then, similarly to the force sensor 200c illustrated in FIG. 10, the connection site between the 1-1 deformable portions 611Aa to 611Da and the first tilting portions 613Aa to 613Da is located at a position different from the position of the connection site between the 1-2 deformable portions 612Aa to 612Da and the first tilting portions 613Aa to 613Da in the longitudinal direction of the first tilting portions 613Aa to 613Da. Similarly, the connection site between the 2-1 deformable portions 611Ab to 611Db and the second tilting portions 613Ab to 613Db is located at a position different from the position of the connection site between the 2-2 deformable portions 612Ab to 612Db and the second tilting portions 613Ab to 613Db in the longitudinal direction of the second tilting portions 613Ab to 613Db.

Moreover, the deformable body 610 has a configuration in which the spring constant of the 1-1 deformable portions 611Aa to 611Da and the 1-2 deformable portions 612Aa to 612Da is different from the spring constant of the 2-1 deformable portions 611Ab to 611Db and the 2-2 deformable portions 612Ab to 612Db. Specifically, in the present embodiment, the spring constant of the 1-1 deformable portions 611Aa to 611Da and the 1-2 deformable portions 612Aa to 612Da is smaller than the spring constant of the 2-1 deformable portions 611Ab to 611Db and the 2-2 deformable portions 612Ab to 612Db.

As illustrated in FIG. 38, the deformable elements 610A to 610D are connected to displacement bodies 620Aa to 620Da and 620Ab to 620Db that generate displacement by elastic deformation generated in the deformable elements 610A to 610D. In the present embodiment, the displacement body is connected to each of tilting portions. Specifically, the displacement body includes: first displacement portions 640Aa to 620Da each separated from each of the fixed portions 616 and 617 and configured to be displaced by tilting of the first tilting portions 613Aa to 613Da; and second displacement portions 620Ab to 620Db each separated from the each of the fixed portions 616 and 617 and configured to be displaced by tilting of the second tilting portions 613Ab to 613Db.

The force sensor 600c further includes a detection circuit 640 that detects at least one of the applied force and moment on the basis of the displacement generated in the displacement bodies.

The detection circuit 640 includes a first displacement sensor arranged in each of the first displacement portions 620Aa to 620Da and a second displacement sensor arranged in each of the second displacement portions 620Ab to 620Db. In the example illustrated in FIG. 38, the first displacement sensor and the second displacement sensor are capacitive elements C11 to C82 as described below. The detection circuit 640 outputs the first electric signal T1 indicating the applied force on the basis of a detection value of the first displacement sensor, and outputs the second electric signal T2 indicating the applied force on the basis of a detection value of the second displacement sensor, and then, determines whether force detection is performed normally on the basis of a change in the ratio of the first electric signal T1 to the second electric signal T2.

As illustrated in FIG. 38, the first displacement portions 620Aa to 620Da include first beams 621Aa to 621Da extending in a direction intersecting the longitudinal direction of the first tilting portions 613Aa to 613Da, while the second displacement portions 620Ab to 620Db include second beams 621Ab to 621Db extending in a direction intersecting the longitudinal direction of the second tilting portions 613Ab to 613Db.

On the first beams 621Aa to 621Da, from one end portions (end portions on the side of the force receiving portions 618 and 619) of the first beams 621Aa to 621Da toward the other end portions (end portions on the fixed portions 616 and 617 side) thereof, 1-1 measurement sites D11, D42, D51, D82 and 1-2 measurement sites D12, D41, D52, D81 are defined in this order. Similarly, on the second beams 621Ab to 621Db, from one end portions (end portions on the force receiving portions 618 and 619 sides) of the second beams 621Ab to 621Db toward the other end portions (end portions on the fixed portions 616 and 617 sides) thereof, 2-1 measurement sites D21, D32, D61, and D72 and 2-2 measurement sites D22, D31, D62, and D71 are defined in this order.

As illustrated in FIG. 38, each of the first displacement portions 620Aa to 620Da includes first connecting bodies 622Aa to 622Da that connect the first tilting portions 613Aa to 613Da of the deformable body 610 with the first beams 621Aa to 621Da, while each of the second displacement portions 620Ab to 620Db includes second connecting bodies 622Ab to 622Db that connect the second tilting portions 613Ab to 613Db of the deformable body 610 with the second beams 621Ab to 621Db. Each of the measurement sites D11 to D82 are arranged symmetrically with respect to the connection site between the corresponding connecting bodies 622Aa to 622Da and 622Ab to 622Db and the beams 621Aa to 621Da and 621Ab to 621Db.

The detection circuit 640 outputs the first electric signal T1 on the basis of each of the detection values (electrostatic capacitance values) of the 1-1 displacement sensor and the 1-2 displacement sensor, that is, the eight capacitive elements C11, C12, C41, C42, C51, C52, C81, and C82, and outputs the second electric signal T2 on the basis of each of the detection values (electrostatic capacitance values) of the 2-1 displacement sensor and the 2-2 displacement sensor, that is, the remaining eight capacitive elements C21, C22, C31, C32, C61, C62, C71, and C72. Expressions representing the electric signals T1 and T2 will be described below.

In the present embodiment, similarly to the force sensor 300c illustrated in FIG. 27, a support 650 arranged opposite to the displacement body and not moving with respect to the fixed portions 616 and 617 is further provided. The first and second displacement sensors are capacitive elements including: displacement electrodes Em11 to Em82 respectively arranged in the displacement portions 420Aa to 420Db of the displacement body; and fixed electrodes Ef11 to Ef82 (not illustrated) arranged on the support 650 facing the displacement electrodes Em11 to Em82.

Furthermore, the configuration of the detection circuit 640 of the present embodiment is similar to the block diagram illustrated in FIG. 13, except that the input electrostatic capacitance value is increased to C11 to C82. Accordingly, the detection circuit 640 includes a storage to store the ratio between the first electric signal T1 and the second electric signal T2 when the force detection is performed normally, that is, when the metal fatigue is not generated in the deformable body 610, as a reference ratio Rs. Then, the detection circuit 640 determines whether the force detection is performed normally, in particular, whether metal fatigue is generated in the deformable body 610 on the basis of a difference between the ratio of the first electric signal T1 and the second electric signal T2 and the reference ratio Rs.

<6-2. Application of Force Sensor>

In the force sensor 600c described above, when a force in a certain direction is applied to the force receiving portions 618 and 619, the direction of the tilting (pivoting) generated in the first tilting portion 613Aa and the second tilting portion 613Ab of the first deformable element 610A positioned in the second quadrant is the same as the direction of the tilting (pivoting) generated in the tilting portion 313A of the first deformable element 310A when the force in the same direction is applied to the force sensor 300c (refer to FIG. 27) according to the third embodiment. That is, when the forces Fx, Fy, and Fz and the moments Mx, My, and Mz are applied, the direction of displacement of the first measurement site D1 of the force sensor 300c along the Z-axis direction according to the third embodiment is the same as the direction of the displacement of the 1-1 measurement site D11 and the 1-2 measurement site D12 of the force sensor 600c along the Z-axis direction according to the present embodiment. Similarly, the direction of displacement of the second measurement site D2 of the force sensor 300c along the Z-axis direction according to the third embodiment is the same as the direction of the displacement of the 2-1 measurement site D21 and the 2-2 measurement site D22 of the force sensor 600c along the Z-axis direction according to the present embodiment.

Such a correspondence relationship holds for the second to fourth deformable elements 610B to 610D in a similar manner. That is, when a force is applied to the force receiving portions 618 and 619, the behaviors of the 3-1 measurement site D31 and the 4-1 measurement site D41 correspond to the behavior of the third measurement site D3 of the force sensor 300 illustrated in FIG. 27, the behaviors of the 3-2 measurement site D32 and the 4-2 measurement site D42 correspond to the behavior of the fourth measurement site D4 of the force sensor 300 illustrated in FIG. 27, the behaviors of the 5-1 measurement site D51 and the 6-1 measurement site D61 correspond to the behavior of the fifth measurement site D5 of the force sensor 300 illustrated in FIG. 27, the behaviors of the 5-2 measurement site D52 and the 6-2 measurement site D62 correspond to the behavior of the sixth measurement site D6 of the force sensor 300 illustrated in FIG. 27, the behaviors of the 7-1 measurement site D71 and the 8-1 measurement site D81 correspond to the behavior of the seventh measurement region D7 of the force sensor 300 illustrated in FIG. 27, and the behaviors of the 7-2 measurement site D72 and the 8-2 measurement site D82 correspond to the behavior of the eighth measurement site D8 of the force sensor 300 illustrated in FIG. 27.

Furthermore, due to the difference in the spring constants of the deformable portions 611Aa to 611Da, 612Aa to 612Da, 611Ab to 611Db, and 612Ab to 612Db, the relative displacement in the Z-axis direction is larger in the measurement sites D11, D12, D41, D42, D51, D52, D81, and D82 defined in the displacement portions 620Aa to 620Da in proximity to the force receiving portions 618 and 619, among the two displacement portions 620Aa to 620Da and 620Ab to 620Ab included in each of the deformable elements 610A to 610D.

According to the correspondence relationship and the magnitude relationship of the displacements of the measurement sites D11 to D82 together with the table in FIG. 29, the increase and decrease of the electrostatic capacitance values of the capacitive elements C11 to C82 of the force sensor 600c are illustrated in FIG. 39. In this table, "+" represents that the electrostatic capacitance value increases, and "++" represents that the electrostatic capacitance value widely increases, in a similar manner. In addition, "−" represents that the electrostatic capacitance value decreases, and "−−" represents that the electrostatic capacitance value widely decreases.

With such a force sensor 600c, the force applied to the force receiving portions 618 and 619 can be measured on the basis of FIG. 39 and on the basis of the following [Expression 23] and [Expression 24]. [Expression 23] illustrates a case having the number at the end of the left side of each of the expressions being "1" indicating forces measured using capacitive elements associated with the first, the fourth, the fifth and the eighth tilting portions 613A, 613D, 613E, and 613H, supported by the deformable portion having a relatively small spring constant. Moreover, [Expression 24] illustrates a case having the number at the end of the left side of each of the expressions being "2" indicating forces measured using capacitive elements associated with the second, the third, the sixth and the seventh tilting portions 613B, 613C, 613F, and 613G, supported by the deformable portion having a relatively large spring constant.

$$Fx1 = C11 - C12 + C41 - C42 - C51 + C52 - C81 + C82$$

$$Fy1 = C11 - C12 - C41 + C42 - C51 + C52 + C81 - C82$$

$$Fz1 = -C11 + C12 + C41 - C42 - C51 + C52 + C81 - C82$$

$$Mx1 = -C11 + C12 + C41 - C42 + C51 - C52 - C81 + C82$$

$$My1 = -C11 + C12 - C41 + C42 + C51 - C52 + C81 - C82$$

$$Mz1 = -C11 + C12 - C41 + C42 - C51 + C52 - C81 + C82 \quad \text{[Expression 23]}$$

$Fx2=C21-C22+C31-C32-C61+C62-C71+C72$ $Fy2=C21-C22-C31+C32-C61+C62+C71-C72$ $Fz2=-C21+C22+C31-C32-C61+C62+C71-C72$ $Mx2=-C21+C22+C31-C32+C61-C62-C71+C72$ $My2=-C21+C22-C31+C32+C61-C62+C71-C72$ $Mz2=-C21+C22-C31+C32-C61+C62-C71+C72$ [Expression 24]

Meanwhile, in the force sensor 600c according to the present embodiment, the relationship of Fx1=My1, Fy1=Mx1, Fx2=My2, Fy2=Mx2 is satisfied. Therefore, the force sensor 600c cannot detect all of the six force components. That is, the force sensor 600c can measure individual components in a case where the components are any of four components Fz, Mx, My and Mz, and four components Fx, Fy, Fz and Mz. This is also apparent from the correspondence relationship between the force sensor 600c and the force sensor 300c according to the third embodiment.

<6-3. Failure Diagnosis>

As described above, the detection circuit 640 of the present embodiment also has a function of determining whether the force sensor 600c functions normally. Now, the function of this failure diagnosis will be described.

This failure diagnosis method is similar to the failure diagnosis method described in 2-5. That is, the first electric signal T1 and the second electric signal T2 can be written down, with a focus on the force Fx, for example, as the following [Expression 25].

$T1=C11-C12+C41-C42-C51+C52-C81+C82$ $T2=C21-C22+C31-C32-C61+C62-C71+C72$ [Expression 25]

Here, the relationship between the force +Fx in the positive direction on the X-axis applied to the force receiving portions 618 and 619 and the electric signals T1 and T2 when metal fatigue is not generated in the deformable body 610 of the force sensor 600c is illustrated in FIG. 15. Furthermore, the relationship between the force +Fx in the positive direction on the X-axis applied to the force receiving portions 618 and 619 and the electric signals T1 and T2 when metal fatigue is generated in the deformable body 610 of the force sensor 600c is illustrated in FIG. 16. That is, when metal fatigue is not generated in the deformable body 610 of the force sensor 600c, the proportion of the gradient of the graph T1a illustrating the first electric signal T1 to the gradient of the graph T2a illustrating the second electric signal T2 is four. Moreover, when metal fatigue is generated in the deformable body 610 of the force sensor 600c, the proportion of the gradient of the graph T1b illustrating the first electric signal T1 to the gradient of the graph T2b illustrating the second electric signal T2 is five.

Therefore, similarly to the force sensor 200c according to the second embodiment, the failure diagnosis of the force sensor 600c is performed also by using the change in the proportion of the gradient (T1/T2) of each of graphs also in the present embodiment. That is, the microcomputer 644 of the detection circuit 640 can determine whether the force sensor 600c functions normally by performing measurement of the applied force using the second electric signal T2 associated with the deformable portion having a relatively large spring constant, and by evaluating whether the difference between the ratio of the first electric signal T1 to the second electric signal T2 at the current state and the ratio of the first electric signal T1a to the second electric signal T2a in the initial state with no emergence of metal fatigue falls within a predetermined range.

Of course, the applied force may be measured on the basis of the first electric signal T1. In this case, since the capacitive element that supplies the first electric signal T1 is associated with the deformable portion having a relatively small spring constant, it is possible to perform force measurement with high sensitivity to the applied force and excellent S/N. Moreover, it is also possible to diagnose the failure of the force sensor 600c by performing AD conversion of the variation amount of the electrostatic capacitance value of each of the capacitive elements C11 to C82 and comparing the electrostatic capacitance values by the microcomputer 644.

The procedure for performing failure diagnosis is similar to the procedure described in 2-5, and thus, a detailed description thereof will be omitted here.

According to the present embodiment as described above, the failure diagnosis of the force sensor 600c is performed on the basis of the change in the ratio of the first electric signal T1 based on the capacitive element having a relatively large variation of the electrostatic capacitance value to the second electric signal T2 based on the capacitive element having a relatively small variation of the electrostatic capacitance value. This failure diagnosis can diagnose by itself a failure of the force sensor 600c due to metal fatigue generated in the deformable body 610 in addition to abnormality generated in the electrodes of the capacitive elements C11 to C82. Furthermore, the measurement sites D11 to D82 are displaced by the tilting of the tilting portions 213A and 213b, making it possible to effectively amplify the tilting generated in the tilting portions 213A and 213b in the force sensor 600c. That is, according to the present embodiment, it is possible to provide a low-cost and highly sensitive force sensor 600c capable of performing self failure diagnosis by the single force sensor 600c.

Moreover, according to the present embodiment, the detection circuit 640 also measures the applied forces Fx, Fy, and Fz and the applied moments Mx, My, and Mz by the difference between the electrostatic capacitance values, making it possible to provide the force sensor 600c insusceptible to the influence of temperature change and common mode noise in the use environment.

In addition, since the measurement sites D11 to D82 are arranged symmetrically with respect to the connection site between the corresponding connecting body and the beam, the applied force can be detected by a simple calculation.

<<<§ 7. Force Sensor According to Modification of the Present Invention>>>

<7-1. First Modification>

Figure 40:
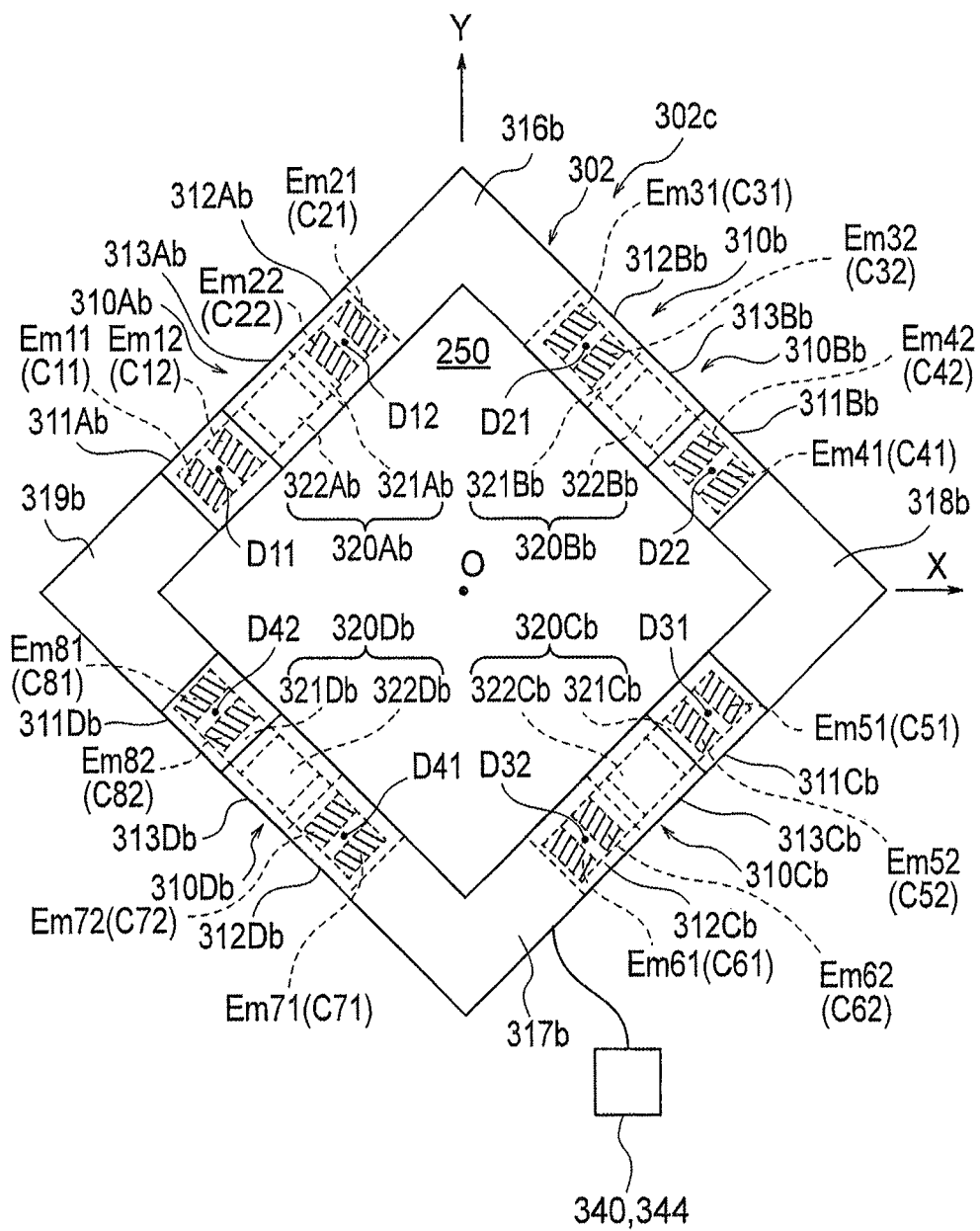
FIG. 40 is a schematic top view illustrating a force sensor according to a modification of FIG. 27.

FIG. 40 is a schematic top view illustrating a force sensor 302c according to a modification of FIG. 27. Note that, for the sake of convenience of description, illustration of the force receiving body is omitted also in this diagram.

As illustrated in FIG. 40, the force sensor 302c differs from the force sensor 300c illustrated in FIG. 27 in that the deformable body 310b has a rectangular shape. A deformable body 310b includes two force receiving portions 318b and 319b arranged symmetrically with the origin O on the X-axis and three fixed portions 316b and 317b arranged symmetrically with the origin O on the Y-axis. Then, the force receiving portions and the fixed portions adjacent to each other along a closed loop shaped path are coupled to each other by four straight deformable elements 310Ab to 310Db. Therefore, a basic structure 302 of the force sensor 302c has a rectangular shape with the two force receiving portions 318b and 319b and the two fixed portions 316b and 317b defined as four apexes, with the deformable elements 310Ab to 310Db being arranged, one for each of the four sides of this rectangle.

The other configurations are substantially similar to the force sensor 200c illustrated in FIG. 27. For this reason, in FIG. 40, substantially similar reference signs ("b" is appended to the end) are attached to the components corresponding to the force sensor 300c illustrated in FIG. 27, and a detailed description thereof will be omitted.

The force sensor 302c described above is after all has a configuration in which each of the deformable elements 310A to 310D of the force sensor 300c illustrated in FIG. 27 has a straight shape instead of an arcuate shape. Therefore, when a force and a moment are applied to the force sensor 302c illustrated in FIG. 40, the elastic deformation generated in each of the deformable elements 310Ab to 310Db is substantially similar to the case of the force sensor 300c illustrated in FIG. 27. That is, the electrostatic capacitance values of the capacitive elements C11 to C82 of the force sensor 302c according to the present modification vary with the applied force and moment as illustrated in FIG. 29.

Therefore, the force sensor 302c according to the present modification as described above can also provide the similar operational effect as the force sensor 300c illustrated in FIG. 27.

<7-2. Second Modification>

Figure 41:
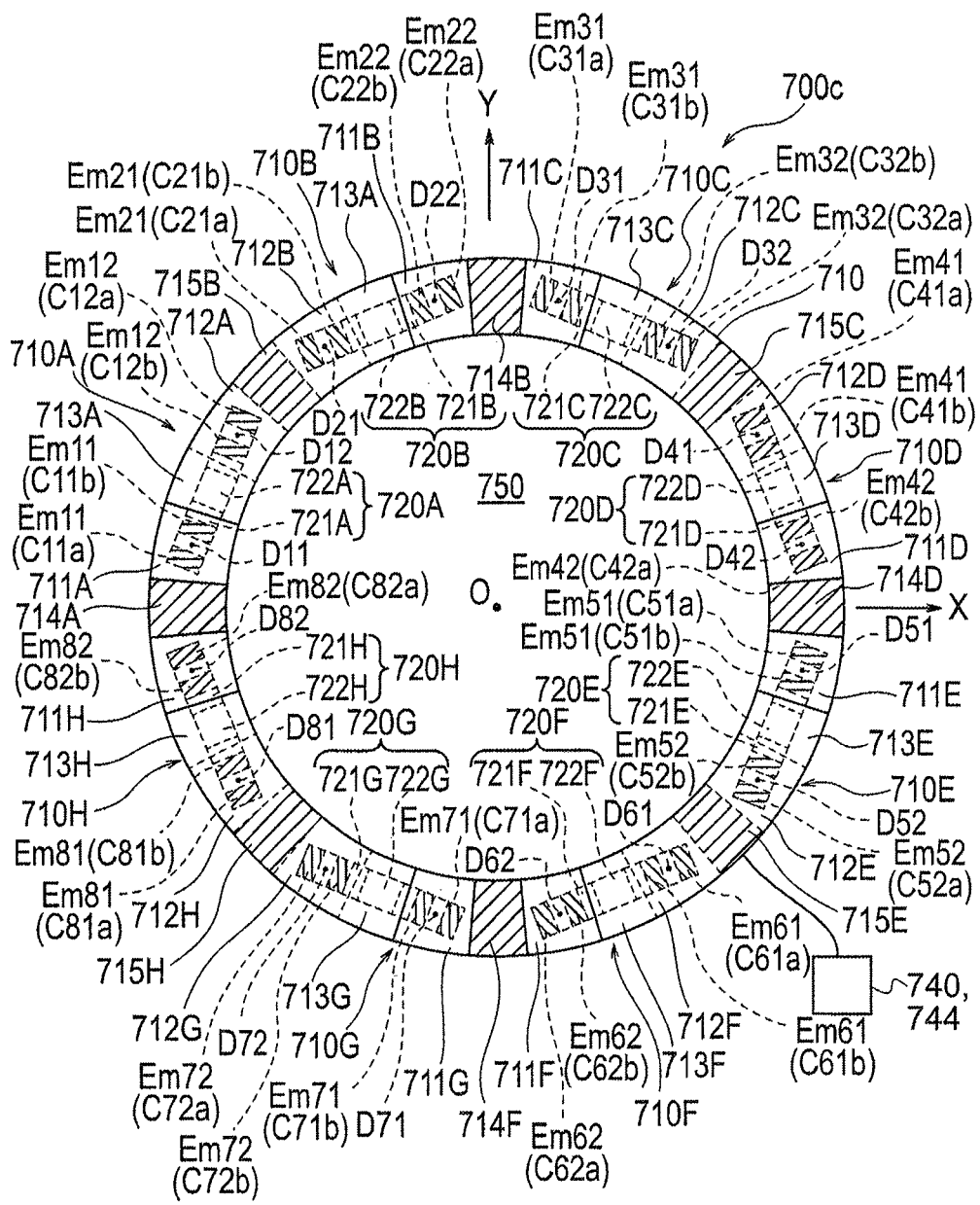
FIG. 41 is a schematic top view illustrating a force sensor according to another modification of FIG. 27.

Next, FIG. 41 is a schematic top view illustrating a force sensor 700c according to another modification of FIG. 27. Here again, the following description will be provided with definition of an XYZ three-dimensional coordinate system as illustrated in FIG. 41. Note that also in FIG. 41, for the sake of convenience of description, illustration of a force receiving body 760 is omitted.

As illustrated in FIG. 41, the force sensor 700c includes a closed loop shaped annular deformable body 710 about the origin O as a center, arranged on the XY plane. The annular deformable body 710 includes four force receiving portions 714A, 714B, 714D, and 714F; four fixed portions 715B, 715C, 715E, and 715H alternately arranged with the four force receiving portions 714A, 714B, 714D, and 714F along a closed loop path; and eight deformable elements 710A to 710H arranged one each in eight gaps sandwiched between the force receiving portions and the fixed portions adjacent to each other along a closed loop shaped path, and configured to generate elastic deformation by one of a force or a moment applied to the force receiving portions 714A, 714B, 714D, and 714F. Furthermore, the force sensor 700c includes eight displacement bodies 720A to 720H each connected to each of the deformable elements 710A to 710H and configured to generate displacement by elastic deformation generated in the deformable elements 710A to 710H.

As illustrated in FIG. 41, the four force receiving portions 714A, 714B, 714D, and 714F are arranged at equal distances from the origin O on the X-axis and the Y-axis. Moreover, the four fixed portions 715B, 715C, 715E, and 715H are arranged on a straight line passing through the origin O and forming an angle 45° counterclockwise with respect to the positive X-axis, and on a straight line passing through the origin O and forming an angle 45° counterclockwise with respect to the positive Y-axis, one for each of symmetrical positions with respect to the origin O.

The configuration of each of the deformable elements 710A to 710H according to the present embodiment is substantially similar to the case of the deformable elements 310A to 310D of the basic structure 300 according to the third embodiment described above. More specifically, the first deformable element 710A, the fourth deformable element 710D, the fifth deformable element 710E, and the eighth deformable element 710H illustrated in FIG. 41 each has a configuration similar to the configuration of each of the first deformable element 310A, the second deformable element 310B, the third deformable element 710C, and the fourth deformable element 710D, illustrated in FIG. 17. The remaining second deformable element 710B, the third deformable element 710C, the sixth deformable element 710F, and the seventh deformable element 710G are obtained by rotating the first deformable element 710A, the fourth deformable element 710D, the fifth deformable element 710E and the eighth deformable element 710H respectively by 90° about the Z-axis. The above correspondence relationship holds for the eight displacement bodies 720A to 720H of the present embodiment as well. Eventually, the basic structure 700 has a configuration in which eight basic structures 100 described in § 1 are arranged in an annular closed loop shape, as the first to eighth deformable elements 710A to 710H.

Each of the fixed portions 715B, 715C, 715E, and 715H of the basic structure 700 is connected at its lower end portion to a support 750 arranged opposite to the first to eighth beams 721A to 721H at a predetermined interval. Furthermore, a force receiving body 760 (not illustrated) for receiving a force to be detected is arranged on the positive side on the Z-axis of the annular deformable body 710. The relationships between the support 750 and the force receiving body 760, and between each of the fixed portions 715B, 715C, 715E, and 715H and each of the force receiving portions 714A, 714B, 714D, and 714F are similar to the third embodiment (refer to FIGS. 18 and 19), and thus, detailed description thereof will be omitted here.

Furthermore, the force sensor 700c according to the present modification includes a detection circuit 740 including a total of 32 capacitive elements C11a to C82b, two elements being arranged for each of the measurement sites D11 to D82 of the basic structure 700. The arrangement of the capacitive elements C11a to C81b in each of the beams 721A to 721H is similar to the case of the third embodiment (refer to FIG. 27), and thus, a detailed description thereof will be omitted.

Next, FIG. 42 is a table listing a direction of tilting generated in each of tilting portions 713A to 713H and displacements generated in each of displacement portions D11 to D82 of the force sensor of FIG. 41 when forces and moments Fx to Mz in each of axial directions on the XYZ three-dimensional coordinate system are applied to the force receiving portion 760.

In the table illustrated in FIG. 42, the signs in parenthesis indicating tilting direction and displacement are illustrated in fields corresponding to the tilting portion exhibiting relatively small tilting and the displacement portion exhibiting relatively small displacement, due to generation of relatively small elastic deformation in the deformable elements. Although not illustrated in the drawing, the variation of the electrostatic capacitance values generated in the capacitive elements C11 to C82 when the forces and moments Fx to Mz in each of axial directions on the XYZ three-dimensional coordinate system are applied can be obtained by inverting, in the table of FIG. 42, the signs of the displacements represented in the fields of the displacement portions. D11 to D82 corresponding to the capacitive elements C11 to C82. In this case, the sign "+" represents an increase in the electrostatic capacitance value, and the sign "−" represents a decrease in the electrostatic capacitance value.

Then, a microcomputer 744 of the detection circuit 740 measures the applied forces and moments Fx to Mz by the following [Expression 26] and [Expression 27]. The portion of [Expression 26] where the number at the end of the left side of each expression is "1" is based on the capacitive element relatively positioned on the end portion side of the beam and appended with "a" at the end. In contrast, the portion of [Expression 27] where the number at the end of the left side of each expression is "2" is based on the capacitive element relatively positioned on the inner side of the beam and appended with "b" at the end.

$+Fx1=C11a-C12a+C21a-C22a+C31a-C32a+C41a-C42a-C51a+C52a-C61a+C62a-C71a+C72a-C81a+C82a$ $+Fy1=C11a-C12a+C21a-C22a-C31a+C32a-C41a+C42a-C51a+C52a-C61a+C62a+C71a-C72a+C81a-C82a$ $+Fz1=-C11a+C12a+C21a-C22a-C31a+C32a+C41a-C42a-C51a+C52a+C61a-C62a-C71a+C72a+C81a-C82a$ $+Mx1=C21a-C22a-C31a+C32a-C61a+C62a+C71a-C72a$ $+My1=-C11a+C12a-C41a+C42a+C51a-C52a+C81a-C82a$ $+Mz1=-C11a+C12a-C21a+C22a-C31a+C32a-C41a+C42a-C51a+C52a-C61a+C62a-C71a+C72a-C81a+C82a$ [Expression 26]

$+Fx2=C11b-C12b+C21b-C22b+C31b-C32b+C41b-C42b-C51b+C52b-C61b+C62b-C71b+C72b-C81b+C82b$ $+Fy2=C11b-C12b+C21b-C22b-C31b+C32b-C41b+C42b-C51b+C52b-C61b+C62b+C71b-C72b+C81b-C82b$ $+Fz2=-C11b+C12b+C21b-C22b-C31b+C32b+C41b-C42b-C51b+C52b+C61b-C62b-C71b+C72b+C81b-C82b$ $+Mx2=C21b-C22b-C31b+C32b-C61b+C62b+C71b-C72b$ $+My2=-C11b+C12b-C41b+C42b+C51b-C52b+C81b-C82b$ $+Mz2=-C11b+C12b-C21b+C22b-C31b+C32b-C41b+C42b-C51b+C52b-C61b+C62b-C71b+C72b-C81b+C82b$ [Expression 27]

Note that in a case where the forces −Fx, −Fy, and −Fz in the negative direction on each of axes or the moments −Mx, −My, and −Mz about each of negative axes are applied to the force receiving body 760 of the force sensor 700*c*, the displacements of the displacement portions D11 to D82 in the Z-axis direction are opposite in direction to the case of FIG. 42, as described above. Therefore, in order to detect the forces −Fx, −Fy, and −Fz or the moments −Mx, −My, and −Mz, it is sufficient to invert all the signs of C11 to C82 on the right side of [Expression 29].

Furthermore, the force sensor 700*c* according to the present embodiment obtains the cross-axis sensitivity similarly to 3-5 above, so as to find the cross-axis sensitivities of all the forces Fx, Fy, and Fz in each of the axial directions and the moments Mx, My, and Mz is zero. Accordingly, the force sensor 700*c* illustrated in FIG. 41 can detect all of the forces Fx, Fy, and Fz in each of the axial directions and the moments Mx, My, and Mz around each of the axes.

Furthermore, the detection circuit 740 of the force sensor 700*c* has a function of determining whether the force sensor 700*c* functions normally. The process of this determination is described in 3-6 above. In this case, with the detection circuit 740 this, it is also possible to detect an abnormality such as breakage of an electrode included in the capacitive elements C11*a* to C82*b*, short circuit, and mixing of foreign matter by the single force sensor 700*c*.

<<<§ 8. Force Sensor with Stopper Mechanism>>>
<8-1. First Example>

Next, how the occurrence of a failure of the force sensor described in § 1 to § 7 by overload can be avoided will be described.

Figure 43:
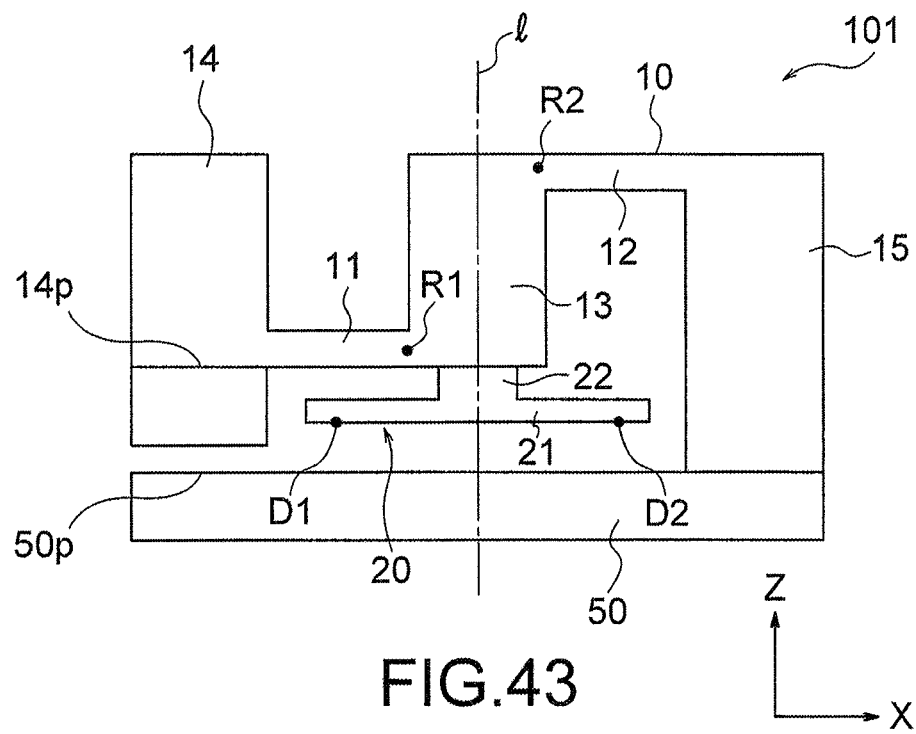
FIG. 43 is a schematic front view illustrating a basic structure including a stopper mechanism for preventing overload.

FIG. 43 is a schematic front view illustrating a basic structure 101 including a stopper mechanism for preventing overload. The basic structure 101 as a whole has a configuration similar to the basic structure 100 illustrated in FIG. 1. In FIG. 43, the same reference signs are given to the configurations common with FIG. 1.

In contrast, the basic structure 101 is different from the basic structure 100 illustrated in FIG. 1 in that an abutting portion 14*p* is provided at the lower end of the force receiving portion 14, and that a portion of the support 50 facing the abutting portion 14*p* is defined as an abutted portion 50*p* that is abutted by the abutting portion 14*p*. When no force is applied to the force receiving portion 14, the abutting portion 14*p* and the abutted portion 50*p* are separated from each other. The separation distance is set to a dimension that can avoid displacement of the force receiving portion 14 in the negative direction on the Z-axis beyond a range in which the basic structure 101 normally functions or a range in which the basic structure 101 would not fail or break.

Figure 44:
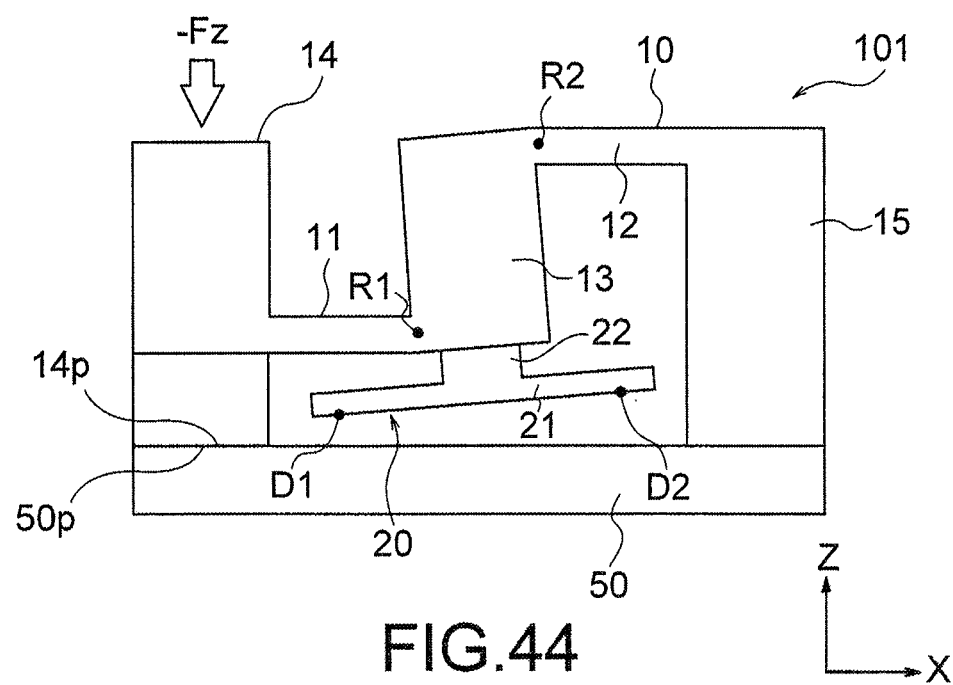
FIG. 44 is a schematic front view illustrating a deformed state of a basic structure illustrated in FIG. 43 when an excessive force −Fz in the negative direction on the Z-axis is applied to the force receiving portion.

Next, FIG. 44 is a schematic front view illustrating a deformed state of the basic structure 101 illustrated in FIG. 43 when an excessive force −Fz in the negative direction on the Z-axis is applied to the force receiving portion 14. When the excessive force −Fx in the negative direction on the Z-axis beyond the range in which the basic structure 101 normally functions is applied to the force receiving portion 14 with the above configuration, the force receiving portion 14 including the abutting portion 14*p* is displaced in the negative direction on the Z-axis and the abutting portion 14*p* abuts the abutted portion 50*p* in due course. This leads to regulation of further displacement of the abutting portion 14*p* in the negative direction on the Z-axis. This leads to suppression of transmission of an excessive load to the deformable body 10, making it possible to avoid failure (breakage) of the basic structure 101. Note that the elastic deformation generated in the deformable body 10 due to the force applied to the force receiving portion 14 and the displacement generated in the displacement body 20 by this elastic deformation are as described in § 1. Therefore, a detailed description thereof will be omitted here.

According to the basic structure 101 as described above, the separation distance between the abutting portion 14*p* and the abutted portion 50*p* is a predetermined value or less even when the excessive force −Fz is applied in the negative direction on the Z-axis. This makes it possible to limit the displacement of the force receiving portion 14 in the negative direction on the Z-axis to a level within a predetermined range. Therefore, it is possible to achieve the basic structure 101 insusceptible to the failure due to overload. Furthermore, the force sensor adopting the basic structure 101 would make it possible to achieve a force sensor insusceptible to the failure due to overload.

Note that FIG. 43 is a case where the lower end of the force receiving portion 14 is extended downward to form the abutting portion 14p in order to achieve the separation distance between the abutting portion 14p and the abutted portion 50p as a predetermined value or less, in the basic structure 100 illustrated in FIG. 1. On the contrary, however, it is allowable to form the abutted portion 50p by causing a portion of the support 50, the portion facing the force receiving portion 14, to project upwardly, so as to achieve the separation distance between the abutting portion 14p and the abutted portion 50p as a predetermined value or less. In this case, it is also possible to achieve the basic structure insusceptible to a failure due to overload.

The basic structure 101 having such a stopper mechanism can also be configured as a force sensor having the above-described failure diagnosis function as a matter of course.

In this case, since the method of failure diagnosis is described in § 1, the repetitive description will be omitted here. This also applies to each of the embodiments to be described below.

<8-2. Second Example>

Next, another example of the stopper mechanism will be described with reference to FIGS. 45 to 50.

Figure 45:
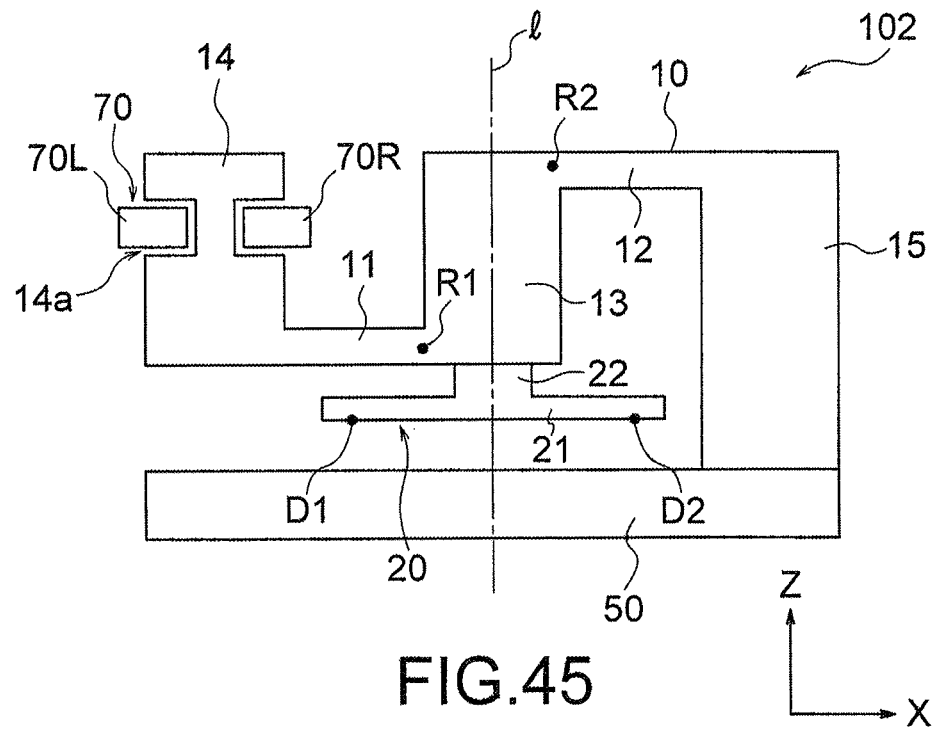
FIG. 45 is a schematic front view illustrating a basic structure including a stopper mechanism for preventing overload according to another example.
Figure 46:
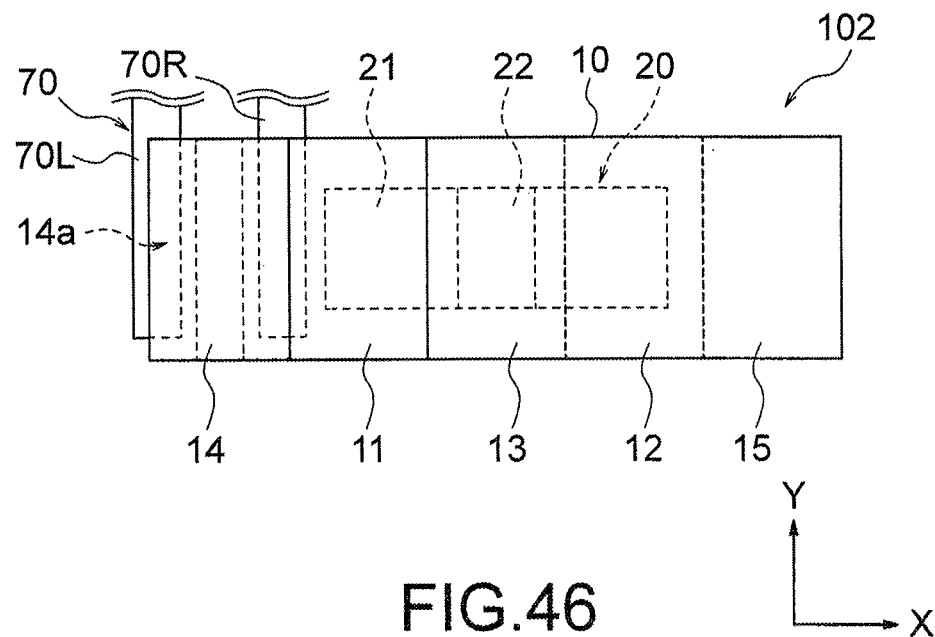
FIG. 46 is a schematic plan view of FIG. 45.

FIG. 45 is a schematic front view illustrating a basic structure 102 including a stopper mechanism for preventing overload according to another example. FIG. 46 is a schematic plan view of FIG. 45.

As illustrated in FIGS. 45 and 46, the basic structure 102 as a whole has a configuration similar to the basic structure 100 illustrated in FIGS. 1 and 2. In FIGS. 45 and 46, the same reference signs are given to the configurations common with FIG. 1.

However, the basic structure 102 includes a pair of recesses 14a extending along the Y-axis direction on a side surface on the positive side on the X-axis and on a side surface on the negative side on the X-axis of the force receiving portion 14. Furthermore, the basic structure 102 includes a pair of stoppers 70 connected to a fixed portion 15 of the deformable body 10 or to the support 50. Although not illustrated in detail, the stopper 70 is supported by a support portion extending to the proximity of the force receiving portion 14 without interfering with the deformable body 10 or the displacement body 20. The pair of stoppers 70 has the same shapes as viewed in the Y-axis direction and has the same Z coordinate.

As illustrated in FIG. 46, at least a portion of the stopper 70 is positioned within the pair of recesses 14a. The stopper 70 is not displaced with respect to the fixed portion 15 and the support 50. Therefore, the separation distance between the stopper 70 and the upper surface (surface facing in the negative direction on the Z-axis) of the recess 14a defines the displacement in the negative direction on the Z-axis permitted to the force receiving portion 14, while the separation distance between the stopper 70 and the lower surface (surface facing in the positive direction on the Z-axis) of the recess 14a defines the displacement in the positive direction on the Z-axis permitted to the force receiving portion 14. Furthermore, among the pair of stoppers 70, the stopper on the negative side on the X-axis is referred to as 70L and the stopper on the positive side on the X-axis as 70R. At this time, the separation distance between the stopper 70L and the side surface (surface facing in the negative direction on the X-axis) of the recess 14a defines the displacement in the negative direction on the X-axis permitted to the force receiving portion 14, while the separation distance between the stopper 70R and the side surface (surface facing in the positive direction on the X-axis) of the recess 14a defines the displacement in the positive direction on the X-axis permitted to the force receiving portion 14. In this manner, the pair of stoppers 70 is adapted to limit the relative movement of the force receiving portion 14 in the X-axis direction and the Z-axis direction with respect to the fixed portion 15 to a predetermined range.

Figure 47:
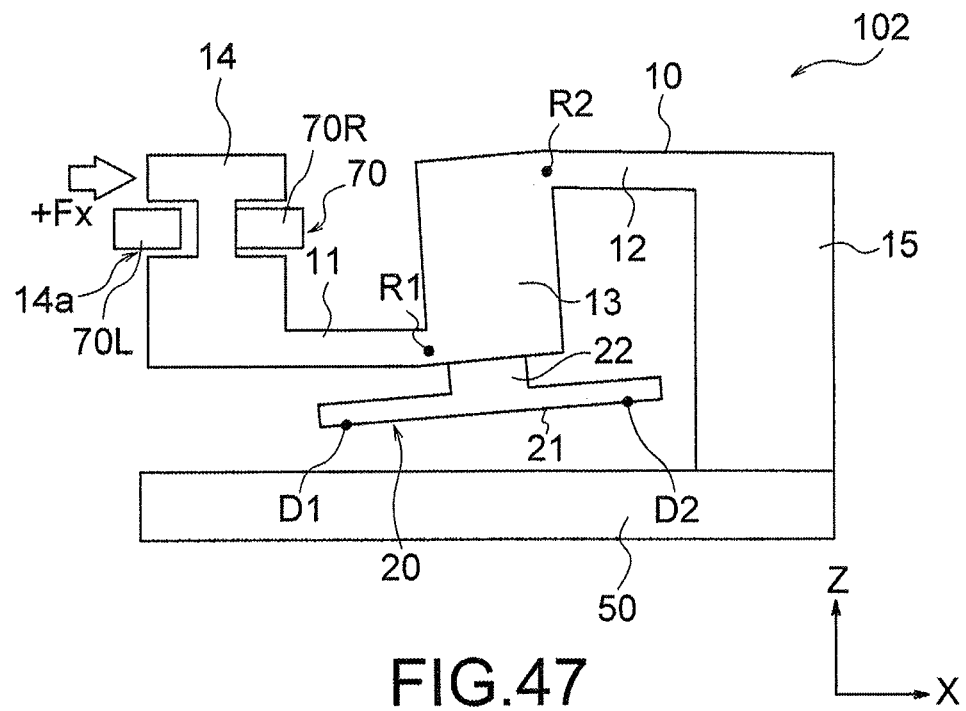
FIG. 47 is a schematic front view illustrating a deformed state of a basic structure illustrated in FIG. 45 when an excessive force +Fx in the positive direction on the X-axis is applied to the force receiving portion.
Figure 48:
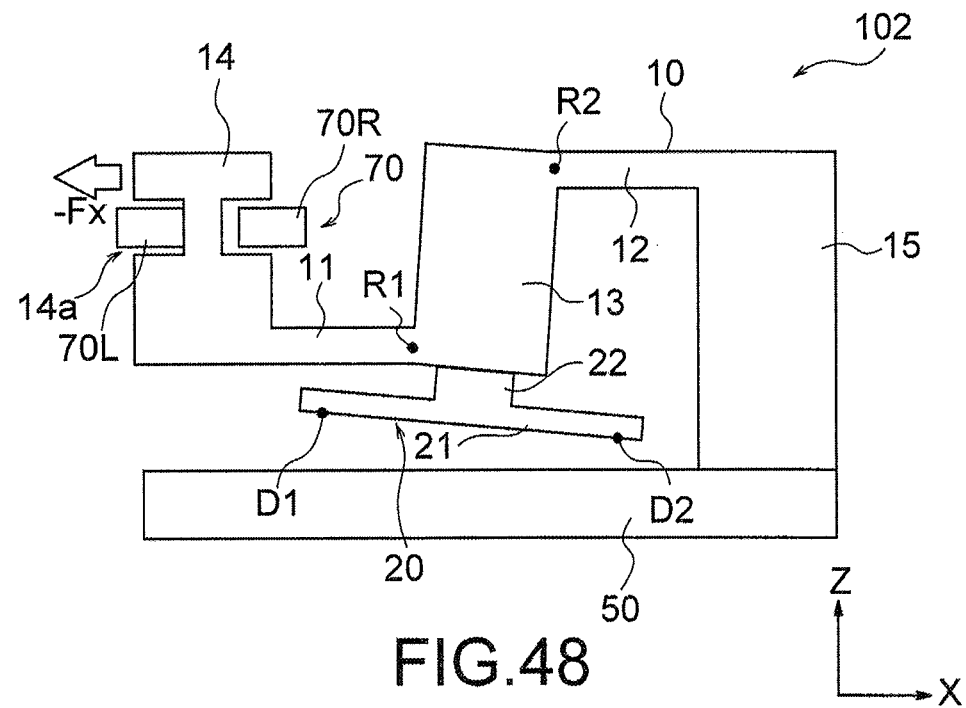
FIG. 48 is a schematic front view illustrating a deformed state of a basic structure illustrated in FIG. 45 when an excessive force −Fx in the negative direction on the X-axis is applied to the force receiving portion.
Figure 49:
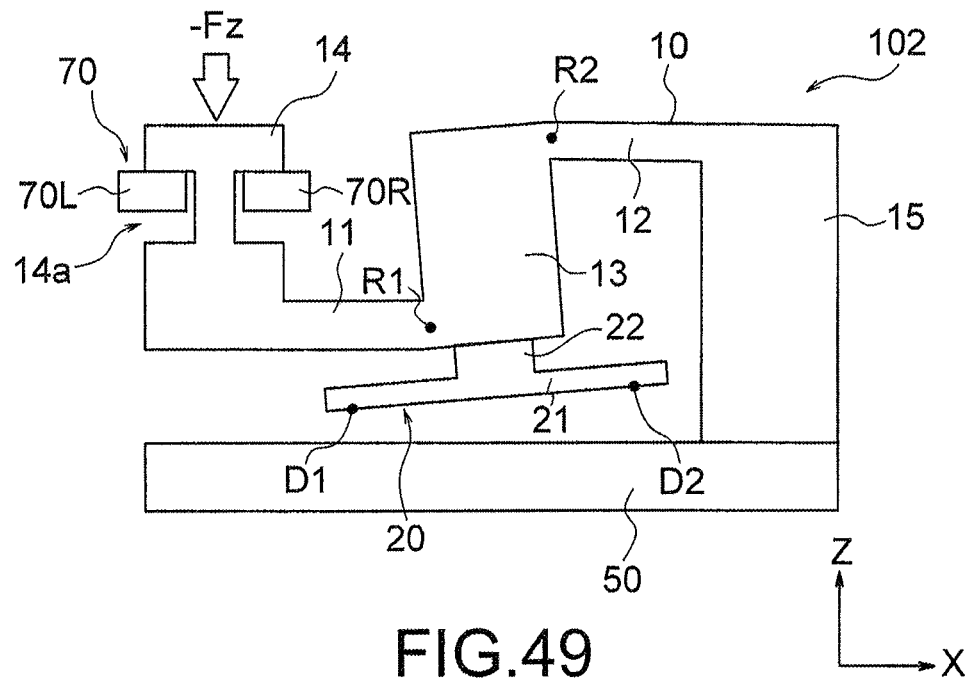
FIG. 49 is a schematic front view illustrating a deformed state of a basic structure illustrated in FIG. 45 when an excessive force −Fz in the negative direction on the Z-axis is applied to the force receiving portion.
Figure 50:
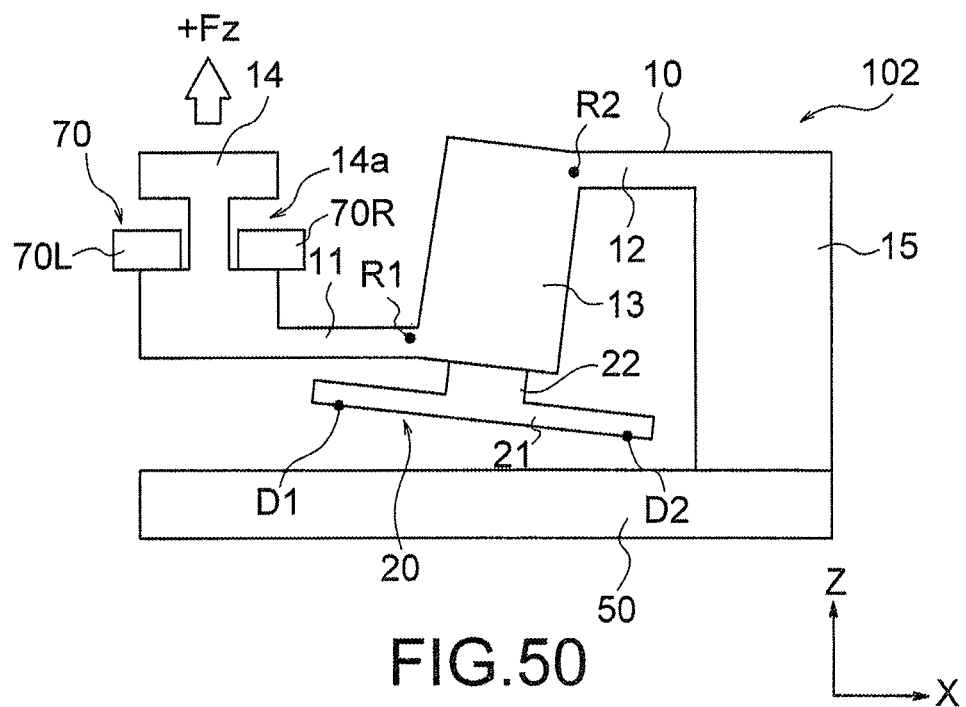
FIG. 50 is a schematic front view illustrating a deformed state of a basic structure illustrated in FIG. 45 when an excessive force +Fz in the positive direction on the Z-axis is applied to the force receiving portion.

Next, FIG. 47 is a schematic front view illustrating a deformed state of the basic structure 102 when an excessive force +Fx in the positive direction on the X-axis is applied to the force receiving portion 14. FIG. 48 is a schematic front view illustrating a deformed state of the basic structure 102 when an excessive force −Fx in the negative direction on the X-axis is applied to the force receiving portion 14. Moreover, FIG. 49 is a schematic front view illustrating a deformed state of the basic structure 102 when an excessive force −Fz in the negative direction on the Z-axis is applied to the force receiving portion 14. FIG. 50 is a schematic front view illustrating a deformed state of the basic structure 102 when an excessive force +Fz in the positive direction on the Z-axis is applied to the force receiving portion 14.

When the excessive force +Fx in the positive direction on the X-axis beyond the range in which the basic structure 102 normally functions is applied to the force receiving portion 14 with the above configuration, the force receiving portion 14 is displaced in the positive direction on the X-axis and the force receiving portion 14 abuts the stopper 70R in due course. As a result, further displacement of the force receiving portion 14 in the positive direction on the X-axis is regulated (refer to FIG. 47). Furthermore, when the excessive force −Fx in the negative direction on the X-axis beyond the range in which the basic structure 102 normally functions is applied to the force receiving portion 14, the force receiving portion 14 is displaced in the negative direction on the X-axis and the force receiving portion 14 abuts the stopper 70L in due course. As a result, further displacement of the force receiving portion 14 in the negative direction on the X-axis is regulated (refer to FIG. 48). From the above, even when an excessive force is applied to the force receiving portion 14 in the positive direction on the X-axis or negative direction on the X-axis, it is possible to avoid failure (breakage) of the basic structure 102.

Furthermore, when the excessive force +Fz in the positive direction on the Z-axis beyond the range in which the basic structure 102 normally functions is applied to the force receiving portion 14, the force receiving portion 14 is displaced in the positive direction on the Z-axis and the force receiving portion 14 abuts the pair of stoppers 70 in due course. As a result, further displacement of the force receiving portion 14 in the positive direction on the Z-axis is regulated (refer to FIG. 50). Furthermore, when the excessive force −Fz in the negative direction on the Z-axis beyond the range in which the basic structure 102 normally functions is applied to the force receiving portion 14, the force receiving portion 14 is displaced in the negative direction on the Z-axis and the force receiving portion 14 abuts the pair of stoppers 70 in due course. As a result, further displacement of the force receiving portion 14 in the negative direction on the Z-axis is regulated (refer to FIG. 49). From the above, even when an excessive force is applied to the force receiving portion 14 in the positive direction on the Z-axis or negative direction on the Z-axis, it is possible to avoid failure (breakage) of the basic structure 102. Note that the elastic deformation generated in the deformable body 10 due to the force applied to the force receiving portion 14 and the displacement generated in the displacement body 20 by this elastic deformation are as described in § 1. Therefore, a detailed description thereof will be omitted here.

According to the basic structure 102 as described above, even when excessive forces Fx and Fz are applied in the X-axis direction and the negative direction on the Z-axis, the displacement of the force receiving portion 14 in the X-axis and in the negative direction on the Z-axis is limited within a predetermined range by the presence of the pair of stoppers 70.

Therefore, it is possible to achieve the basic structure 102 insusceptible to the failure due to overload. Furthermore, the force sensor adopting the basic structure 102 would make it possible to achieve a force sensor insusceptible to the failure due to overload.

<8-3. Third Example>

Next, still another example of the stopper mechanism will be described with reference to FIGS. 51 to 57.

Figure 51:
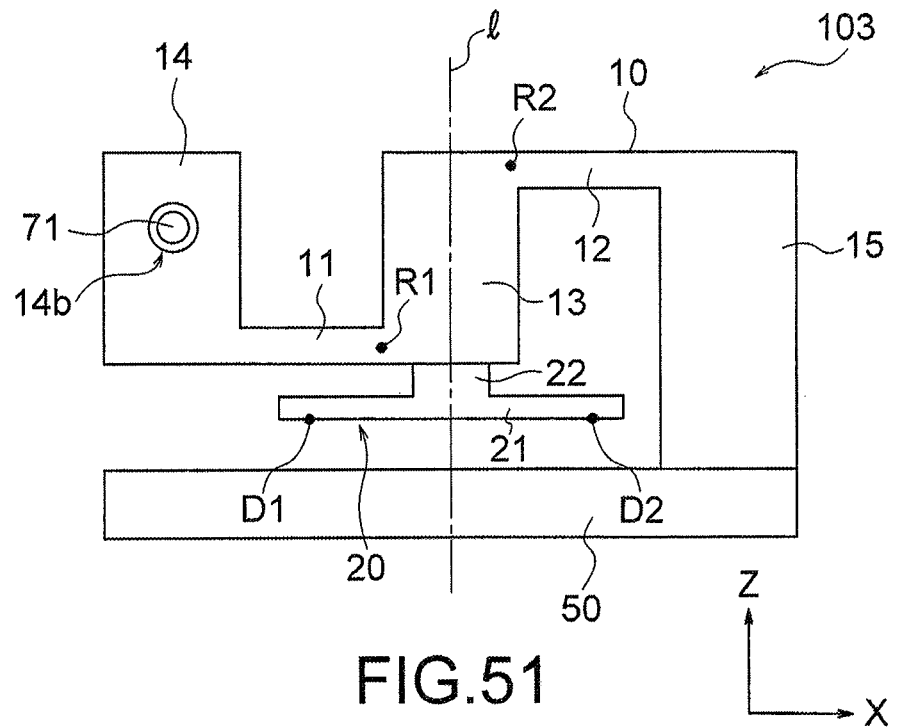
FIG. 51 is a schematic front view illustrating a basic structure including a stopper mechanism for preventing overload according to still another example.
Figure 52:
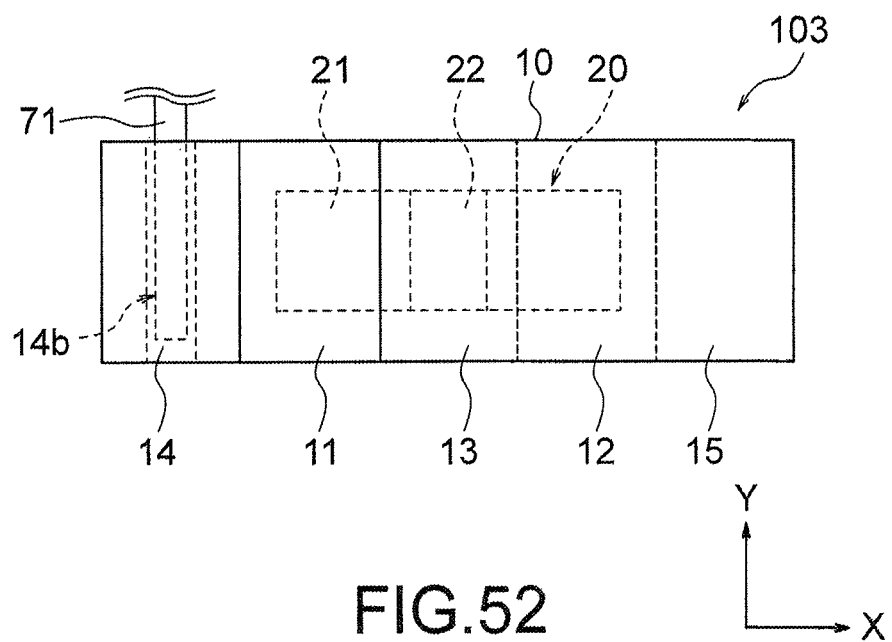
FIG. 52 is a schematic plan view of FIG. 51.

FIG. 51 is a schematic front view illustrating a basic structure 103 including a stopper mechanism for preventing overload according to still another example. FIG. 52 is a schematic plan view of FIG. 51.

As illustrated in FIGS. 51 and 52, the basic structure 103 as a whole has a configuration similar to the basic structure 100 illustrated in FIG. 1. In FIGS. 51 and 52, the same reference signs are given to the configurations common with FIGS. 1 and 2.

As illustrated in FIGS. 51 and 52, the basic structure 103 includes a through hole 14b extending in parallel to the Y-axis direction provided in the force receiving portion 14. The through hole 14b has a cylindrical shape having a center axis parallel to the Y-axis. Furthermore, the basic structure 103 includes a stopper 71 connected to the fixed portion 15 of the deformable body 10. Although not illustrated in detail, the stopper 71 is supported by a support portion extending to the proximity of the force receiving portion 14 without interfering with the deformable body 10 or the displacement body 20. The stopper 71 has a columnar shape having a center axis extending parallel to the Y-axis.

As illustrated in FIGS. 51 and 52, at least a portion of the stopper 71 is positioned concentrically within the through hole 14b of the force receiving portion 14. The stopper 71 is not displaced with respect to the fixed portion 15 and the support 50. Accordingly, the difference between the radius of the stopper 71 and the radius of the through hole 14b defines the displacement within the XZ plane permittable to the force receiving portion 14. With this configuration, the stopper 71 is adapted to limit the relative movement of the force receiving portion 14 in the X-axis direction and the Z-axis direction with respect to the fixed portion 15 to a predetermined range.

Figure 53:
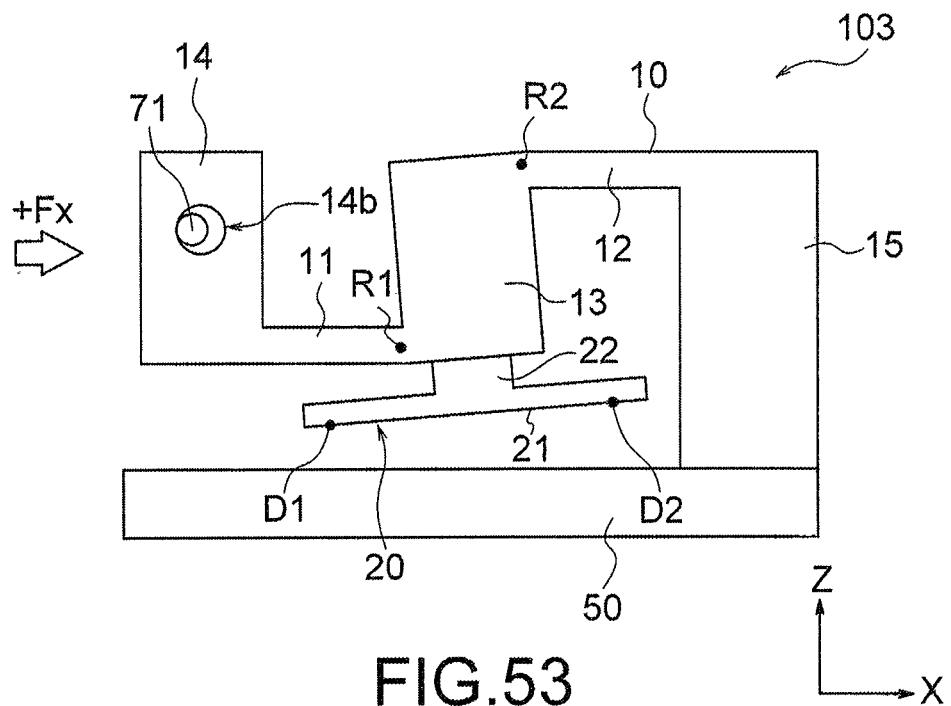
FIG. 53 is a schematic front view illustrating a deformed state of a basic structure illustrated in FIG. 51 when an excessive force +Fx in the positive direction on the X-axis is applied to the force receiving portion.
Figure 54:
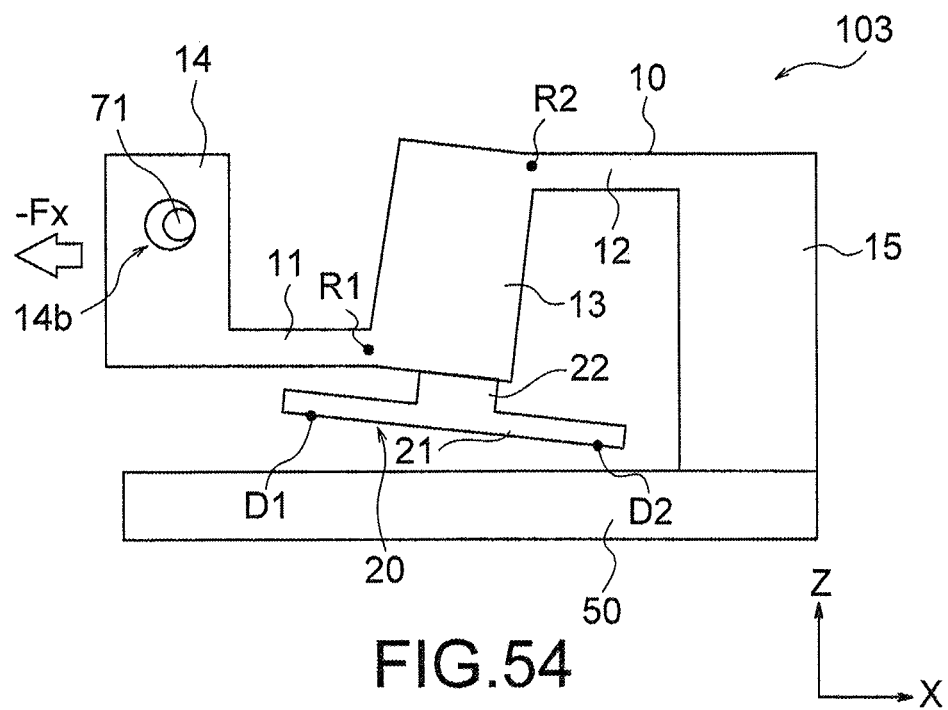
FIG. 54 is a schematic front view illustrating a deformed state of a basic structure illustrated in FIG. 51 when an excessive force −Fx in the negative direction on the X-axis is applied to the force receiving portion.
Figure 55:
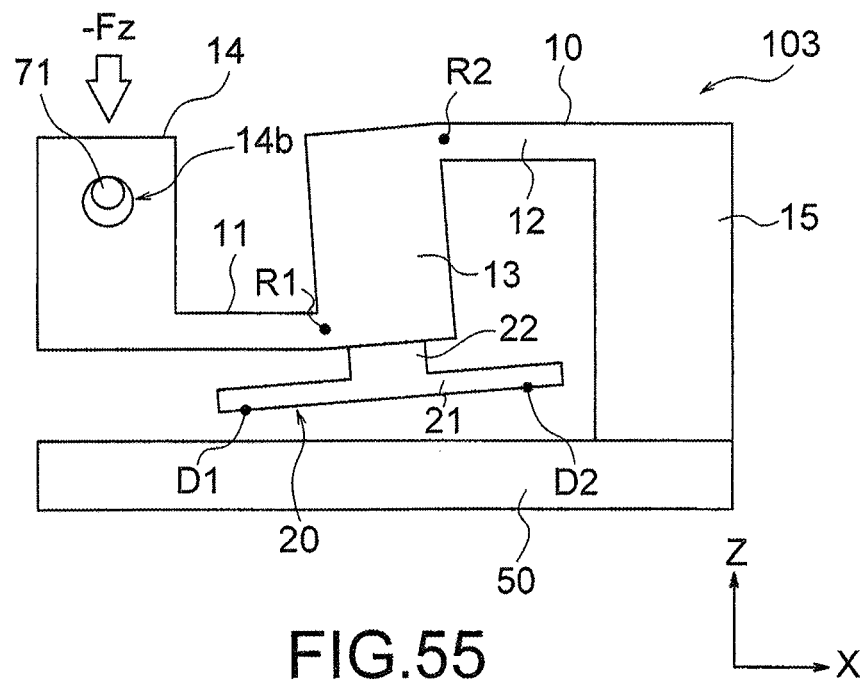
FIG. 55 is a schematic front view illustrating a deformed state of a basic structure illustrated in FIG. 51 when an excessive force −Fz in the negative direction on the Z-axis is applied to the force receiving portion.
Figure 56:
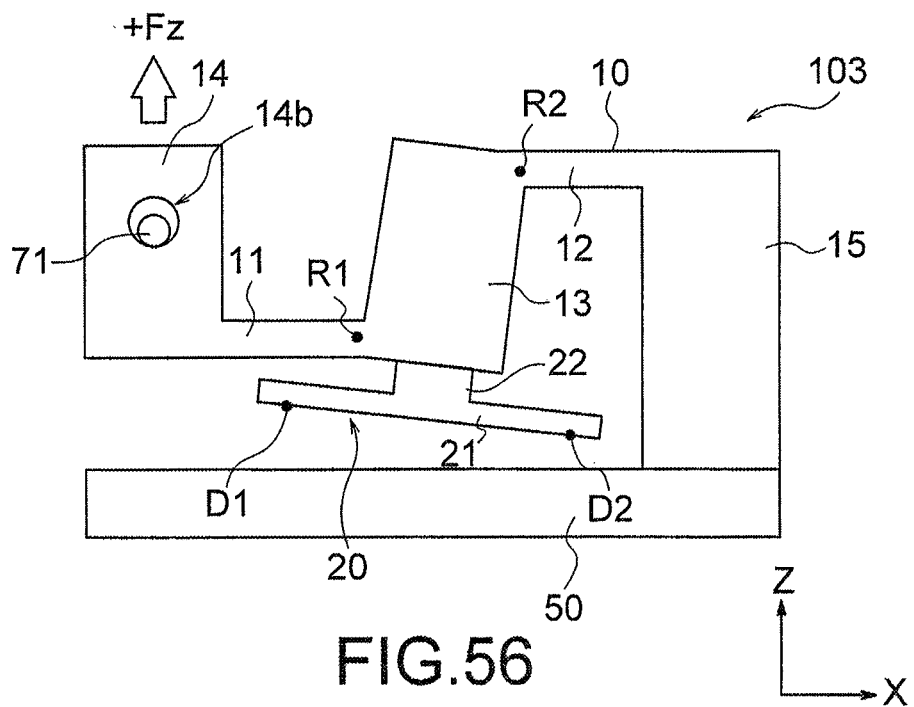
FIG. 56 is a schematic front view illustrating a deformed state of a basic structure illustrated in FIG. 51 when an excessive force +Fz in the positive direction on the Z-axis is applied to the force receiving portion.

Next, FIG. 53 is a schematic front view illustrating a deformed state of the basic structure 103 when an excessive force +Fx in the positive direction on the X-axis is applied to the force receiving portion 14. FIG. 54 is a schematic front view illustrating a deformed state of the basic structure 103 when an excessive force −Fx in the negative direction on the X-axis is applied to the force receiving portion 14. Moreover, FIG. 55 is a schematic front view illustrating a deformed state of the basic structure 103 when an excessive force −Fz in the negative direction on the Z-axis is applied to the force receiving portion 14. FIG. 56 is a schematic front view illustrating a deformed state of the basic structure 103 when an excessive force +Fz in the positive direction on the Z-axis is applied to the force receiving portion 14.

With the above configuration, as illustrated in FIGS. 53 to 56, when excessive forces Fx and Fz in the X-axis and Z-axis directions beyond the range in which the basic structure 103 normally functions are applied to the force receiving portion 14, the force portion 14 is displaced in the XZ plane and the force receiving portion 14 abuts the stopper 71 in due course. As a result, further displacement of the force receiving portion 14 in the XZ plane is regulated. In this manner, even when the excessive forces Fx and Fz in the X-axis and Z-axis directions are applied to the force receiving portion 14, it is possible to avoid failure (breakage) of the basic structure 103. Note that the elastic deformation generated in the deformable body 10 due to the force applied to the force receiving portion 14 and the displacement generated in the displacement body 20 by this elastic deformation are as described in § 1. Therefore, a detailed description thereof will be omitted here.

According to the basic structure 103 as described above, even when excessive forces Fx and Fz are applied in the X-axis direction and the negative direction on the Z-axis, the displacement of the force receiving portion 14 in the X-axis and in the negative direction on the Z-axis is limited within a predetermined range by the presence of the stopper 71. Therefore, it is possible to achieve the basic structure 103 insusceptible to the failure due to overload. Furthermore, the force sensor adopting the basic structure 103 would make it possible to achieve a force sensor insusceptible to the failure due to overload.

<8-4. Modification>

Figure 57:
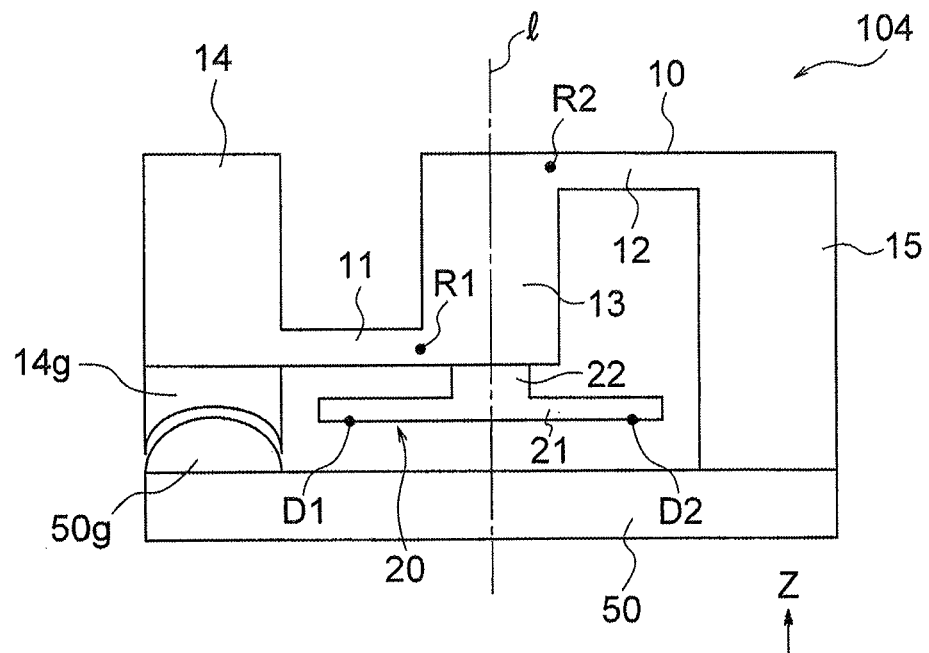
FIG. 57 is a schematic front view illustrating a basic structure according to a modification of FIG. 43.

Next, FIG. 57 is a schematic front view illustrating a basic structure 104 according to a modification of FIG. 43. In the basic structure 101 illustrated in FIG. 43, both the abutting portion 14p and the abutted portion 50p are defined as surfaces parallel to the XY plane. Therefore, when an excessive force Fx in the X-axis direction is applied to the force receiving portion 14, the displacement of the force receiving portion 14 would not be limited within the predetermined range. In contrast, in the basic structure 104 illustrated in FIG. 57, an abutting portion 14g of the force receiving portion 14 has a recess, and an abutted portion 50g to be abutted by the abutting portion 14p has a protrusion. The separation distances in the X-axis direction and the Z-axis direction between the recess of the abutting portion 14g and the protrusion of the abutted portion 50g are set to have dimensions capable of avoiding the displacement of the force receiving portion 14 in the X-axis direction and negative direction on the Z-axis beyond a range in which the basic structure 104 normally functions or a range not causing breakage or failure. Note that although FIG. 57 illustrates a case where the recess of the abutting portion 14g and the protrusion of the abutted portion 50g have curved surfaces curved in the positive direction on the Z-axis, the present invention is not limited to such a mode. As another example, a recess and a protrusion having a rectangular cross-sectional shape as observed from the Y-axis direction may be adopted as the recess of the abutting portion 14g and the protrusion of the abutted portion 50g, respectively.

According to such a configuration, it is possible to limit the displacement of the force receiving portion 14 in the X-axis direction within a predetermined range even when an excessive force Fx in the X-axis direction is applied, in addition to the case where an excessive force −Fz in the negative direction on the Z-axis is applied. With this configuration, it is possible to achieve the basic structure 104 insusceptible to the failure due to overload. Furthermore, the force sensor adopting the basic structure 104 would make it possible to achieve a force sensor insusceptible to the failure due to overload.

Furthermore, although not illustrated, the abutted portion 50g may be formed in an L shape or a T shape having a rod portion extending in the X-axis direction, for example, and the abutting portion 14g may be penetrated by the rod portion having the L shape or the T shape. In short, the support 50 is provided to function also as a stopper. In this case, it is possible to achieve the basic structure 104 insusceptible to the failure even when an excessive force +Fz in the positive direction on the Z-axis is applied.

Note that the stopper mechanisms described in the above 8-1 to 8-4 can also be adopted for the basic structures 200 to 700 and the force sensors 200c to 700c illustrated in § 2 to § 7, in addition to the basic structure 100 and the force sensor 100c illustrated in § 1. That is, each of the basic structures 200 to 700 illustrated in § 2 to § 7 can be regarded as a combination of two, four or eight basic structures 100 illustrated in § 1. For this reason, any of the above-described stopper mechanisms may be adopted in at least one, and preferably all of the components corresponding to the basic structure 100 illustrated in § 1 out of the basic structures 200 to 700. In this case, it is possible to suppress occurrence of failures and breakage in the basic structures 200 to 700 and the force sensors 200c to 700c illustrated in § 2 to § 7 even when an excessive force and/or moment is applied to the basic structures 200 to 700 and the force sensor 200c to 700c.

The invention claimed is:

1. A force sensor comprising:
a deformable body having a force receiving portion and a fixed portion and configured to generate elastic deformation by a force applied to the force receiving portion;
a displacement body connected to the deformable body and configured to generate displacement by elastic deformation generated in the deformable body; and
a detection circuit configured to detect an applied force on the basis of the displacement generated in the displacement body,
wherein the deformable body includes:
a tilting portion having a longitudinal direction and arranged between the force receiving portion and the fixed portion;
a first deformable portion that connects the force receiving portion and the tilting portion; and
a second deformable portion that connects the fixed portion and the tilting portion,
each of the deformable portions extends in a direction intersecting with the longitudinal direction of the tilting portion,
a connection site between the first deformable portion and the tilting portion is located at a position different from the position of a connection site between the second deformable portion and the tilting portion in the longitudinal direction of the tilting portion,
the displacement body includes a displacement portion connected to the tilting portion and separated from the fixed portion,
the detection circuit includes a first displacement sensor and a second displacement sensor arranged in the displacement portion, and
the detection circuit outputs a first electric signal indicating an applied force on the basis of a detection value of the first displacement sensor, outputs a second electric signal indicating an applied force on the basis of a detection value of the second displacement sensor, and determines whether force detection is performed normally on the basis of the first electric signal and the second electric signal.

2. The force sensor according to claim 1,
wherein the detection circuit outputs a summation electric signal being a sum of the first electric signal and the second electric signal, and
the detection circuit determines whether force detection is performed normally on the basis of the summation electric signal and at least one of the first electric signal and the second electric signal.

3. The force sensor according to claim 2, wherein the detection circuit determines whether force detection is performed normally on the basis of one of a difference and a proportion between the summation electric signal and at least one of the first electric signal and the second electric signal.

4. The force sensor according to claim 1,
further comprising a support arranged to face the displacement body and connected to the fixed portion,
wherein each of the displacement sensors is a capacitive element having a displacement electrode arranged in the displacement portion of the displacement body and a fixed electrode arranged on the support opposite to the displacement electrode.

5. The force sensor according to claim 4, wherein the relative movement of the force receiving portion with respect to at least one of the fixed portion and the support is limited to a position within a predetermined range.

6. The force sensor according to claim 5, wherein the predetermined range is defined by a separation distance between the support and the force receiving portion.

7. The force sensor according to claim 5, further comprising a stopper connected to at least one of the fixed portion and the support of the deformable body and configured to limit the relative movement of the force receiving portion with respect to at least one of the fixed portion and the support to a position within the predetermined range.

8. The force sensor according to claim 7,
wherein the force receiving portion includes one of a recess and a through hole, and
at least a portion of the stopper is located inside of one of the recess and the through hole.

9. The force sensor according to claim 1, wherein the displacement portion includes a beam extending in a direction intersecting the longitudinal direction of the tilting portion.

10. The force sensor according to claim 9,
wherein a first measurement site is defined in the beam,
the detection circuit includes a 1-1 displacement sensor and a 1-2 displacement sensor that measure a displacement of the first measurement site, and
the detection circuit outputs the first electric signal on the basis of a detection value of the 1-1 displacement sensor, and outputs the second electric signal on the basis of a detection value of the 1-2 displacement sensor.

11. The force sensor according to claim 9,
wherein a first measurement site and a second measurement site are defined in the beam,
the detection circuit includes a 1-1 displacement sensor and a 1-2 displacement sensor that measure a displacement of the first measurement site and includes a 2-1 displacement sensor and a 2-2 displacement sensor that measure a displacement of the second measurement site, and
the detection circuit outputs the first electric signal on the basis of a detection value of each of the 1-1 displacement sensor and the 1-2 displacement sensor, and outputs the second electric signal on the basis of a detection value of each of the 2-1 displacement sensor and the 2-2 displacement sensor.

12. The force sensor according to claim 11,
wherein the displacement portion includes a connecting body that connects the tilting portion of the deformable body and the beam,
the first measurement site and the second measurement site of the displacement body are defined symmetrically with respect to a connection site between the connecting body and the beam, and
the detection circuit outputs the first electric signal on the basis of a difference between a detection value of the 1-1 displacement sensor and a detection value of the 2-2 displacement sensor, and outputs the second electric signal on the basis of a difference between a detection value of the 1-2 displacement sensor and a detection value of the 2-1 displacement sensor.

13. The force sensor according to claim 1, wherein the detection circuit detects an applied force on the basis of the first electric signal, or a summation electric signal being a sum of the first electric signal and the second electric signal.

14. The force sensor according to claim 1, wherein the relative movement of the force receiving portion with respect to the fixed portion is limited to a position within a predetermined range.

15. A force sensor comprising:
a closed loop shaped deformable body including two force receiving portions, two fixed portions arranged alternately with the two force receiving portions along a closed loop shaped path, and four deformable elements configured to connect the force receiving portion and the fixed portion adjacent to each other along the closed loop shaped path and generate elastic deformation by one of a force and a moment applied to the force receiving portion;
four displacement bodies each connected to each of the deformable elements and configured to generate displacement by elastic deformation generated in the deformable element; and
a detection circuit that detects at least one of the applied force and the moment on the basis of a displacement generated in the four displacement bodies,
wherein each of the four deformable elements includes:
a tilting portion having a longitudinal direction and arranged between the force receiving portion and the fixed portion;
a first deformable portion that connects the corresponding force receiving portion and the tilting portion; and
a second deformable portion that connects the corresponding fixed portion and the tilting portion,
the first deformable portion and the second deformable portion extend in a direction intersecting the longitudinal direction of the tilting portion,
a connection site between the first deformable portion and the tilting portion is located at a position different from the position of a connection site between the second deformable portion and the tilting portion in the longitudinal direction of the tilting portion,
each of the four displacement bodies includes a displacement portion connected to the corresponding tilting portion and separated from the corresponding fixed portion,
the detection circuit includes at least four first displacement sensors and at least four second displacement sensors, at least one of the at least four first displacement sensors and the at least four second displacement sensors is arranged in each of the displacement portions, and
the detection circuit outputs a first electric signal indicating an applied force on the basis of a detection value of each of the first displacement sensors, outputs a second electric signal indicating an applied force on the basis of a detection value of each of the second displacement sensors, and determines whether force detection is performed normally on the basis of the first electric signal and the second electric signal.

16. The force sensor according to claim 15,
wherein the detection circuit outputs a summation electric signal being a sum of the first electric signal and the second electric signal, and
the detection circuit determines whether force detection is performed normally on the basis of the summation electric signal and at least one of the first electric signal and the second electric signal.

17. The force sensor according to claim 15,
further comprising a support arranged to face the four displacement bodies and connected to the fixed portion,
wherein each of the displacement sensors is a capacitive element having a displacement electrode arranged in the displacement portion of the displacement body and a fixed electrode arranged on the support opposite to each of the displacement electrodes.

18. The force sensor according to claim 15, wherein each of the four displacement bodies includes a beam extending in a direction intersecting the longitudinal direction of the corresponding tilting portion.

19. The force sensor according to claim 18,
wherein a first measurement site is defined in each of the beams,
the detection circuit includes a 1-1 displacement sensor and a 1-2 displacement sensor that measure a displacement of each of the first measurement sites, and
the detection circuit outputs the first electric signal on the basis of a detection value of each of the 1-1 displacement sensors, and outputs the second electric signal on the basis of a detection value of each of the 1-2 displacement sensors.

20. The force sensor according to claim 18,
wherein a first measurement site and a second measurement site are defined in each of the beams,
the detection circuit includes a 1-1 displacement sensor and a 1-2 displacement sensor that measure a displacement of each of the first measurement sites and includes a 2-1 displacement sensor and a 2-2 displacement sensor that measure a displacement of each of the second measurement sites, and
the detection circuit outputs the first electric signal on the basis of each of detection values of each of the 1-1 displacement sensors and each of the 2-1 displacement sensors, and outputs the second electric signal on the basis of each of detection values of each of the 1-2 displacement sensors and each of the 2-2 displacement sensors.

21. The force sensor according to claim 20,
wherein each of the displacement portions includes a connecting body that connects the tilting portion of the deformable body and the beam,
the first measurement site and the second measurement site of each of the displacement bodies are defined symmetrically with respect to a connection site between the connecting body and the beam, each of the 1-1 displacement sensors, each of the 1-2 displacement sensors, each of the 2-2 displacement sensors, and each of the 2-1 displacement sensors are arranged in this order along the longitudinal direction of the corresponding beam, and the detection circuit outputs the first electric signal on the basis of a difference between a detection value of the 1-1 displacement sensor and a detection value of the 2-1 displacement sensor, and outputs the second electric signal on the basis of a difference between a detection value of the 1-2 displacement sensor and a detection value of the 2-2 displacement sensor.

22. The force sensor according to claim 15, wherein the detection circuit detects an applied force on the basis of the first electric signal, or a summation electric signal being a sum of the first electric signal and the second electric signal.

23. A force sensor comprising:
a deformable body having a force receiving portion and a fixed portion and configured to generate elastic deformation by a force applied to the force receiving portion,
a displacement body connected to the deformable body and configured to generate displacement by elastic deformation generated in the deformable body; and
a detection circuit that detects an applied force on the basis of the displacement generated in the displacement body,
wherein the deformable body includes:
a first tilting portion and a second tilting portion having a longitudinal direction and sequentially arranged from the force receiving portion toward the fixed portion between the force receiving portion and the fixed portion;
a force transmitting portion arranged between the first tilting portion and the second tilting portion;
a 1-1 deformable portion that connects the force receiving portion and the first tilting portion; a 1-2 deformable portion that connects the force transmitting portion and the first tilting portion; a 2-1 deformable portion that connects the force transmitting portion and the second tilting portion; and a 2-2 deformable portion that connects the fixed portion and the second tilting portion,
each of the deformable portions extends in a direction intersecting with the longitudinal direction of each of the tilting portions,
a connection site between the 1-1 deformable portion and the first tilting portion is located at a position different from a position of a connection site between the 1-2 deformable portion and the first tilting portion in the longitudinal direction of the first tilting portion,
a connection site between the 2-1 deformable portion and the second tilting portion is located at a position different from a position of a connection site between the 2-2 deformable portion and the second tilting portion in the longitudinal direction of the second tilting portion,
a spring constant of the 1-1 deformable portion and the 1-2 deformable portion is different from a spring constant of the 2-1 deformable portion and the 2-2 deformable portion,
the displacement body includes a first displacement portion connected to the first tilting portion and separated from the fixed portion and includes a second displacement portion connected to the second tilting portion and separated from the fixed portion,
the detection circuit includes a first displacement sensor that measures displacement of the first displacement portion and a second displacement sensor that measures displacement of the second displacement portion, and the detection circuit outputs a first electric signal indicating an applied force on the basis of a detection value of the first displacement sensor, outputs a second electric signal indicating an applied force on the basis of a detection value of the second displacement sensor, and determines whether force detection is performed normally on the basis of a change in a ratio of the first electric signal to the second electric signal.

24. The force sensor according to claim 23,
further comprising a support arranged to face the displacement body and connected to the fixed portion,
wherein each of the displacement sensors is a capacitive element having a displacement electrode arranged in each of the displacement portions of the displacement body and a fixed electrode arranged on the support opposite to the displacement electrode.

25. The force sensor according to claim 23,
wherein the first displacement portion includes a first beam extending in a direction intersecting the longitudinal direction of the first tilting portion, and
the second displacement portion includes a second beam extending in a direction intersecting the longitudinal direction of the second tilting portion.

26. The force sensor according to claim 25,
wherein a 1-1 measurement site is defined in the first beam,
a 2-1 measurement site is defined in the second beam,
the detection circuit includes a 1-1 displacement sensor that measures a displacement of the 1-1 measurement site and a 2-1 displacement sensor that measures a displacement of the 2-1 measurement site, and
the detection circuit outputs the first electric signal on the basis of a detection value of the 1-1 displacement sensor and outputs the second electric signal on the basis of a detection value of the 2-1 displacement sensor.

27. The force sensor according to claim 25,
wherein a 1-1 measurement site and a 1-2 measurement site are defined in the first beam,
a 2-1 measurement site and a 2-2 measurement site are defined in the second beam,
the detection circuit includes a 1-1 displacement sensor that measures a displacement of the 1-1 measurement site, a 1-2 displacement sensor that measures a displacement of the 1-2 measurement site, a 2-1 displacement sensor that measures a displacement of the 2-1 measurement site, and a 2-2 displacement sensor that measures a displacement of the 2-2 measurement site, and
the detection circuit outputs the first electric signal on the basis of each of detection values of the 1-1 displacement sensor and the 1-2 displacement sensor, and outputs the second electric signal on the basis of each of detection values of the 2-1 displacement sensor and the 2-2 displacement sensor.

28. The force sensor according to claim 27,
wherein the first displacement portion includes a first connecting body that connects the first tilting portion and the first beam,
the second displacement portion includes a second connecting body that connects the second tilting portion and the second beam,
the 1-1 measurement site and the 1-2 measurement site of the first displacement portion are defined symmetrically with respect to a connection site between the first connecting body and the first beam, the 2-1 measurement site and the 2-2 measurement site of the second displacement portion are defined symmetrically with respect to a connection site between the second connecting body and the second beam, and the detection circuit outputs the first electric signal on the basis of a difference between a detection value of the 1-1 displacement sensor and a detection value of the 1-2 displacement sensor, and outputs the second electric signal on the basis of a difference between a detection value of the 2-1 displacement sensor and a detection value of the 2-2 displacement sensor.

29. The force sensor according to claim 23, wherein the detection circuit stores a ratio of the first electric signal to the second electric signal in a state where the force detection is performed normally as a reference ratio, and determines whether the force detection is performed normally on the basis of a difference between the ratio of the first electric signal to the second electric signal and the reference ratio.

30. A force sensor comprising:

a closed loop shaped deformable body including two force receiving portions, two fixed portions arranged alternately with the two force receiving portions along a closed loop shaped path, and four deformable elements configured to connect the force receiving portion and the fixed portion adjacent to each other along the closed loop shaped path and generate elastic deformation by one of a force and a moment applied to the force receiving portion;

a displacement body connected to each of the deformable elements and configured to generate displacement by elastic deformation generated in the deformable element; and a detection circuit that detects at least one of an applied force and a moment on the basis of the displacement generated in the displacement body, wherein each of the four deformable elements includes:

a first tilting portion and a second tilting portion having a longitudinal direction and sequentially arranged from the force receiving portion toward the fixed portion between the force receiving portion and the fixed portion;

a force transmitting portion arranged between the first tilting portion and the second tilting portion;

a 1-1 deformable portion that connects the first tilting portion and the corresponding force receiving portion; a 1-2 deformable portion that connects the force transmitting portion and the first tilting portion; a 2-1 deformable portion that connects the force transmitting portion and the second tilting portion; and a 2-2 deformable portion that connects the second tilting portion and the corresponding fixed portion, and each of the 1-1 deformable portion, the 1-2 deformable portion, the 2-1 deformable portion, and the 2-2 deformable portion extends in a direction intersecting with the longitudinal direction of each of the tilting portions, a connection site between the 1-1 deformable portion and the first tilting portion is located at a position different from a position of a connection site between the 1-2 deformable portion and the first tilting portion in the longitudinal direction of the first tilting portion, a connection site between the 2-1 deformable portion and the second tilting portion is located at a position different from a position of a connection site between the 2-2 deformable portion and the second tilting portion in the longitudinal direction of the second tilting portion, a spring constant of the 1-1 deformable portion and the 1-2 deformable portion is different from a spring constant of the 2-1 deformable portion and the 2-2 deformable portion, each of the displacement bodies includes a first displacement portion connected to the corresponding first tilting portion and separated from each of the fixed portions and includes a second displacement portion connected to the corresponding second tilting portion and separated from each of the fixed portions, the detection circuit includes at least four first displacement sensors that measure a displacement of each of the first displacement portions and at least four second displacement sensors that measure a displacement of each of the second displacement portions, and the detection circuit outputs a first electric signal indicating an applied force on the basis of a detection value of each of the first displacement sensors, outputs a second electric signal indicating an applied force on the basis of a detection value of each of the second displacement sensors, and determines whether force detection is performed normally on the basis of a change in a ratio of the first electric signal to the second electric signal.

31. The force sensor according to claim 30, further comprising a support arranged to face the first displacement portion and the second displacement portion and connected to the fixed portion, and each of the displacement sensors is a capacitive element having a displacement electrode arranged in each of the displacement portions of the displacement body and a fixed electrode arranged on the support opposite to the displacement electrode.

32. The force sensor according to claim 30, wherein the first displacement portion includes a first beam extending in a direction intersecting the longitudinal direction of the corresponding first tilting portion, and the second displacement portion includes a second beam extending in a direction intersecting the longitudinal direction of the corresponding second tilting portion.

33. The force sensor according to claim 32, wherein a 1-1 measurement site is defined in each of the first beams, a 2-1 measurement site is defined in each of the second beams, the detection circuit includes a 1-1 displacement sensor that measures a displacement of each of the 1-1 measurement sites and a 2-1 displacement sensor that measures a displacement of each of the 2-1 measurement sites, and the detection circuit outputs the first electric signal on the basis of a detection value of each of the 1-1 displacement sensors, and outputs the second electric signal on the basis of a detection value of each of the 2-1 displacement sensors.

34. The force sensor according to claim 32, wherein a 1-1 measurement site and a 1-2 measurement site are defined in each of the first beams, a 2-1 measurement site and a 2-2 measurement site are defined in each of the second beams, the detection circuit includes a 1-1 displacement sensor that measures a displacement of each of the 1-1 measurement sites, a 1-2 displacement sensor that measures a displacement of each of the 1-2 measurement sites, a 2-1 displacement sensor that measures a displacement of each of the 2-1 measurement sites, and a 2-2 displacement sensor that measures a displacement of each of the 2-2 measurement sites, and the detection circuit outputs the first electric signal on the basis of each of detection values of each of the 1-1 displacement sensors and each of the 1-2 displacement sensors, and outputs the second electric signal on the basis of each of detection values of each of the 2-1 displacement sensors and each of the 2-2 displacement sensors.

35. The force sensor according to claim 34, wherein the first displacement portion includes a first connecting body that connects the first tilting portion and the first beam, the second displacement portion includes a second connecting body that connects the second tilting portion and the second beam, the 1-1 measurement site and the 1-2 measurement site of the first displacement portion are defined symmetrically with respect to a connection site between the first connecting body and the first beam, the 2-1 measurement site and the 2-2 measurement site of the second displacement portion are defined symmetrically with respect to a connection site between the second connecting body and the second beam, and the detection circuit outputs the first electric signal on the basis of a difference between a detection value of the 1-1 displacement sensor and a detection value of the 1-2 displacement sensor, and outputs the second electric signal on the basis of a difference between a detection value of the 2-1 displacement sensor and a detection value of the 2-2 displacement sensor.

36. A force sensor comprising:

a deformable body having a force receiving portion and a fixed portion and configured to generate elastic deformation by a force applied to the force receiving portion;

a displacement body connected to the deformable body and configured to generate displacement by elastic deformation generated in the deformable body;

a detection circuit configured to detect an applied force on the basis of the displacement generated in the displacement body, and a support connected to the fixed portion, wherein the deformable body includes:

a tilting portion having a longitudinal direction and arranged between the force receiving portion and the fixed portion;

a first deformable portion that connects the force receiving portion and the tilting portion; and a second deformable portion that connects the fixed portion and the tilting portion, each of the deformable portions extends in a direction intersecting with the longitudinal direction of the tilting portion, a connection site between the first deformable portion and the tilting portion is located at a position different from the position of a connection site between the second deformable portion and the tilting portion in the longitudinal direction of the tilting portion, the displacement body includes a displacement portion connected to the tilting portion and separated from the fixed portion, and the relative movement of the force receiving portion with respect to at least one of the fixed portion and the support is limited to a position within a predetermined range.

* * * * *